(12) United States Patent
Freydel et al.

(10) Patent No.: US 10,229,016 B2
(45) Date of Patent: Mar. 12, 2019

(54) REDUNDANT COMPUTER SYSTEM UTILIZING COMPARISON DIAGNOSTICS AND VOTING TECHNIQUES

(71) Applicants: Lev Raphaelovich Freydel, Akron, OH (US); Nathan Ida, Akron, OH (US)

(72) Inventors: Lev Raphaelovich Freydel, Akron, OH (US); Nathan Ida, Akron, OH (US)

(73) Assignee: The University of Akron, Akron, OH (US)

(*) Notice: Subject to any disclaimer, the term of this patent is extended or adjusted under 35 U.S.C. 154(b) by 0 days.

(21) Appl. No.: 15/966,775

(22) Filed: Apr. 30, 2018

(65) Prior Publication Data

US 2018/0349235 A1 Dec. 6, 2018

Related U.S. Application Data

(60) Provisional application No. 62/513,468, filed on Jun. 1, 2017, provisional application No. 62/531,557, filed on Jul. 12, 2017.

(51) Int. Cl.
| | |
|---|---|
| *G06F 11/00* | (2006.01) |
| *G06F 11/18* | (2006.01) |
| *G06F 11/16* | (2006.01) |
| *G06F 11/20* | (2006.01) |

(52) U.S. Cl.
CPC ........ *G06F 11/187* (2013.01); *G06F 11/1633* (2013.01); *G06F 11/182* (2013.01); *G06F 11/184* (2013.01); *G06F 11/2028* (2013.01); *G06F 11/2033* (2013.01); *G06F 2201/82* (2013.01)

(58) Field of Classification Search
CPC .............. G06F 11/1633; G06F 11/182; G06F 11/2028; G06F 11/184; G06F 11/2005; G06F 11/2033; G06F 11/187
See application file for complete search history.

(56) References Cited

U.S. PATENT DOCUMENTS

| | | | | |
|---|---|---|---|---|
| 6,449,732 | B1 * | 9/2002 | Rasmussen | G05B 9/03 713/400 |
| 7,877,627 | B1 * | 1/2011 | Freydel | G06F 11/182 714/11 |
| 8,121,707 | B2 * | 2/2012 | Karaffa | G05B 9/03 700/19 |

(Continued)

*Primary Examiner* — Charles Ehne
(74) *Attorney, Agent, or Firm* — Renner Kenner Greive Bobak Taylor and Weber; Ray L. Weber; Timothy A. Hodgkiss

(57) ABSTRACT

A redundant computer system utilizing comparison diagnostics and voting techniques includes a plurality of redundant channels. Each pair of the processors receives/obtains process information from I/O modules via dual redundant sensors (DRS). The processors execute an application program, whereby output module is utilized for comparing output data of the two processors. Output module receives output data from neighboring modules, if there is a deviation or other disparity in the output data. Each pair of processors, a voter and an improper sequence detector component disables the output module, if a majority of signals vote that output module fails. In addition, the system uses 2-of-3 voting, the system remains operational in the presence of up two transient or hard failures.

6 Claims, 22 Drawing Sheets

(56) References Cited

U.S. PATENT DOCUMENTS

| | | | | |
|---|---|---|---|---|
| 8,175,759 B2* | 5/2012 | Fletcher | ............. | G05B 19/0428 |
| | | | | 701/29.7 |
| 8,726,372 B2* | 5/2014 | Sahoo | ..................... | G06F 21/45 |
| | | | | 709/217 |
| 9,690,678 B2* | 6/2017 | Perez | .................. | G06F 11/2028 |
| 9,873,505 B2* | 1/2018 | Bara | ..................... | B64C 13/503 |
| 2007/0174687 A1* | 7/2007 | Graham | ............. | G06F 11/1658 |
| | | | | 714/13 |

* cited by examiner

REDUNDANT COMPUTER SYSTEM UTILIZING COMPARISON DIAGNOSTICS AND VOTING TECHNIQUES

CROSS-REFERENCE TO RELATED APPLICATIONS

This application claims the benefit of U.S. provisional patent application No. 62/531,557 filed on Jul. 12, 2017, and U.S. provisional patent application No. 62/513,468 filed on Jun. 1, 2017, the contents of which are incorporated herein by reference.

TECHNICAL FIELD

The embodiments disclosed herein generally relate to redundant computer systems. Particularly, the embodiments disclosed herein relate to redundant computer systems that utilize a combination of comparison diagnostics and voting techniques. More particularly, the embodiments disclosed herein relate to redundant computer systems that utilize a combination of comparison diagnostics and majority voting techniques to achieve enhanced fault tolerance.

BACKGROUND

Computer systems for use in critical applications, such as those used in safety systems, and process control systems, are susceptible to system failures. In some circumstances, failures of these critical systems may expose entities to a potentially fatal event, as well as to significant economic loss. For example, such safety-critical control systems are utilized to provide control in critical applications, such as high-integrity pressure protection pipe line systems, emergency stop systems, such as those utilized on drilling platforms, nuclear control systems, oil refinery safety and control systems, boiler control systems, turbo-machinery control systems, and off-shore fire and gas protection systems. To avoid failure, such critical systems monitor various operational processes, such that if a selected value that is associated with a particular process exceeds a predetermined threshold that is indicative of a dangerous operational state, the system takes the necessary action to avoid the occurrence of a complete failure, such as by halting the process or placing the process in a "safe" state. However, in some circumstances, a critical system may perform a "safe" failure of a process, whereby the system mistakenly performs a shutdown process when a shutdown is, in fact, not required. Furthermore, unplanned shut downs resulting from such "safe" failures require a subsequent re-start of the critical process, which leads to lost production and time, which is not desirable. However, if the monitoring systems fail to identify the hazardous or dangerous system parameters or conditions of a critical computing system, a dangerous system failure may occur, which may result in the loss of human life or substantial damage to the operating components or machinery controlled by the process.

In order to avoid the failure of critical computer systems that are responsible for controlling these critical processes, various standards or protocols are utilized to allow such critical computer system to achieve high levels of fault tolerance. Such standards and protocols that may be utilized by these critical computer systems. For example, such critical computer systems may utilize safety integrity level 4 (SIL 4) fault tolerance, as is provided by IEC-61508 and IEC-61511 standards. In addition, such critical computer systems may utilize the Planar 4 system. Planar 4 is based on a hard wired modular electronic circuit, which incorporates fail safe logic that is built into each circuit. The Planar 4 system is certified in accordance with IEC 61508 to a SIL of ¾. Current fault-tolerant systems, such as that provided by Planar 4, utilize a hard-wired computing architecture, which cannot be easily changed or adapted for use in different applications or processes where fault-tolerant control is desired. For example, U.S. Pat. No. 7,877,627 describes a computing system that withstands multiple failures, while still maintaining safety. This system includes three primary processor modules that operate in parallel on a cyclical basis. This computer system further includes three redundant processor modules that also operate cyclically in parallel. A first, second, and third primary processor module are respectively connected to associated first, second and third primary input modules to receive input data therefrom and to use this data as an input for an application program that is executed by each primary processor module. A first, second and third redundant processor module are respectively connected to associated first, second and third redundant input modules to receive input data therefrom and to use this data as an input for an application program that is executed by each redundant processor module. The system further includes an output module that includes first, second and third output module or circuits, which may comprise any suitable output interface electronics that enables the output of data therefrom. Each output module houses a first and a second interface for receiving output data from the primary and redundant processor modules respectively. The primary processor module (PPM) is connected to the associated redundant processor module (RPM) and sends a command to the RPM in order to initiate the execution of one instance of the application program at the same time that the PPM begins execution of another instance of the application program. The PPM and the RPM, therefore, synchronously execute the application program. The output module receives output data from both the associated PPM and RPM close in time during each cycle of the system operation. During normal system operation, each output module generates output data that is produced by the associated PPM and RPM that are equal, and the output module uses output data that is received from the PPM. In the event that the PPM fails permanently, the associated output module uses the output data produced by the RPM. In the event a disparity between the output data that is produced by the PPM and the RPM for some controlled points in a process is discovered, the result of one of the PPM or associated RPM is identified as producing erroneous output data, which is the result of the occurrence of a transient fault in the fault-tolerant computer system. Each output module compares output data that is received from the PPM and the associated RPM to identify whether a possible disparity exists among output data for each controlled point. In the event that a disparity is discovered, the output module disables its own output data for controlled points where a disparity has been identified. The output module communicates with each other during each cycle of the computing system operation in order to receive output data of neighboring output module. During normal system operation, each output module has its own output data, and each output module operates to calculate a logical sum of the output data that it receives from the neighboring output module. The output module further includes a voting network that receives output data directly from the output module and output data that output module received from neighboring output modules. Each voting network includes three electronic switches, such as transistors, that are connected in series. Three of the voting networks are controlled by output data produced by an associated output module based on a first output, and by output data that is the aforementioned logical sum of the electronic valves of different voting networks, that are connected in parallel. Such a configuration provides a system output, which is the result of 2-of-3 majority voting among the output data that the associated output module has received from the associated primary processor module (PPM) or from the redundant processor module (RPM).

The fault-tolerant computer system of the '627 patent may be configured to be operational in the presence of up to two faults. However, the '627 system utilizes a simple watchdog timer (WDT) as its only diagnostic system. The WDT periodically monitors an associated output module of the computer system, and disconnects the output module from participation in the computer system output when the output module fails. Unfortunately, it is difficult to configure the WDT to detect faults with a probability that is greater than about 90%. Accordingly, the WDT is unable to effectively discover failures that may occur in the output module of the fault-tolerant computer system. Thus, in some circumstances, if the output controller in the output module fails due to a hard failure, and this failure is not discovered by the WDT, the system performs a "false trip". A false trip may lead to substantial financial losses, as well as significant harm to property or to the individual. Another disadvantage of such system is that it has about double the number of input modules, which increases the overall cost of the system. Furthermore, this fault-tolerant computer system unfortunately does not include variants to allow it to operate with input/output (I/O) modules that are located in close proximity to a controlled process, but that are also far away from a central computing unit or processor.

A safety instrumented system (SIS) includes two identical channels having a read-back diagnostic, which enables the system to operate in the presence of any single failure. Such SIS systems, unfortunately, are not able to tolerate the occurrence of two concurrent faults. Accordingly, the various embodiments of the system discussed herein provide a dual-channel SIS that includes a diagnostic that allows the system to remain operational after the occurrence of some kinds of two concurrent faults.

U.S. Patent No. 2016/0283426 describes a control system comprising a first and a second controller module, where each controller module includes management circuitry that identifies which controller module operates in a master mode or a slave mode. This control system operates with the first controller module, but switches to a second controller module when the first controller module fails. Unfortunately, such system has no means for determining which controller module is the first or second by default after power up. In contrast, the various embodiments of the redundant computer system disclosed herein include a primary and a secondary processor module, with each processor module including hardware and software means that define which processor module is by default the primary or secondary processor module. In addition, such hardware and software means of the various embodiments of the redundant computer system also continuously enables each processor module to change from a primary status to a secondary status in the event that the primary processor module fails.

Therefore, there is a need for a fault-tolerant computer system that overcomes the deficiencies of the current systems, including that of the '627 patent and the '426 publication, discussed above, and that provides, in some embodiments, uninterrupted system operation that is capable of attaining safety levels in accordance with one or more standards/protocols, such as SIL 4/IEC 61508 for example.

SUMMARY

The various embodiments of the redundant computer system provide a highly reliable system, which utilizes the same basic components, but in different numbers, to allow a vendor of the redundant computer system and an end user to configure a system that has an effective combination of reliability/availability and cost in order to meet desired operating requirements. In various embodiments, the system utilizes comparison diagnostics and voting techniques that allow the system to remain operational in the presence of multiple permanent and/or transient faults. At least one embodiment is designed to allow an industrial control system to provide a high level of fault tolerance and safety, such as up to SIL 4 for example, which is required for extremely critical applications. It should be appreciated that the system can be implemented in additional embodiments, and may be adopted for use in a variety of applications, including railroad safety, aircraft safety, vehicle safety, as well as many other safety responsible applications.

One embodiment, referred to as an ultra-reliable computer system (URS), includes three identical channels operating in parallel. Each channel includes two processor modules; each containing one pair of primary (PPM) and secondary (SPM) processor modules, one or more input and output modules, each output module includes an output controller, a logic circuit and a voting network. The primary processor modules are connected to each other through a first communication bus to synchronize their operation. Secondary processor modules are also connected to each other through a second communication bus to enable their synchronized operation. In addition, the primary and secondary processor modules in each channel are connected together through a third communication bus for synchronization between the PPM and the associated SPM. Each input module includes a first and a second interface that are respectively connected to the associated PPM and SPM through a first and a second I/O bus. Each pair of primary (PP) processors is separately coupled to an associated input module so that it receives information via the dual redundant sensors (DRS) that are used to monitor operating parameters data of a controlled point of a controlled process. Each DRS integrates a first and a second section in a single hardware package that measures the same parameter for each desired point in the controlled process. The system performs safety and control functions on a cyclical basis, whereby the operation cycle period of the system is defined by a scan time, which includes, but is not limited to: the time required for input data polling, the time required for application program execution, and the time required for the transfer of output data to the output modules. In some embodiments, the application program execution and input data polling may be overlapped. Input and output modules and corresponded redundant sensors can be digital or analog.

During normal operation of the redundant computer system, the output data that is produced by the associated PPM and SPM in each channel are equal, and the output controller by default uses output data that is received from the PPM. In addition, the output controller (OC) compares the output data that is received from the associated PPM and SPM to identify whether a possible disparity exists between the output data for some controlled point of the controlled process. The OC in each channel is connected with the output controllers in neighboring channels over a read-only bus for receiving/sending output data to/from the output controllers in the neighboring channels. If both the PPM and SPM are healthy, but a disparity exists between their output data, this condition is interpreted to indicate that either the PPM or SPM is producing erroneous data. Such deviation in data may, in some circumstances, be due to a deviation between input data produced by a first and a second section of the DRS, or due to occurrence of transient faults. The output data with disparity is counted as "doubtful", and because of that, the output controller activates a disparity signal D indicating that the system is not utilizing this doubtful data. Next, the output controller receives output data from neighboring output controllers to substitute the doubtful output data and sends these data to the associated logic circuit. As described above, this comparison diagnostic allows the system to discover the occurrence of any disparity, and to reconfigure the system to allow it to overcome the effect of the disparity on the operation of the system in a more efficient and effective manner than that of current systems.

Each logic circuit performs a certain logic operation with the associated voting network (VN). For example, the outputs of the VN in each channel are configured by using three electronic switches, such as transistors or relays for example, that are connected in series between an associated power supply and a load of the system for each controlled point. The three electronic switches are connected in parallel, with their outputs in different channels, and connected together to provide the system output to be a result of two-out-of-three (2-of-3) voting among the output data that is produced by three channels during normal system operation. Such configuration of the VN continues to be operational in the presence up to two points of failure. The system, thereby, continues to perform 2-of-3 voting in the event that up to three PPMs or up to three SPMs fail concurrently. The system, therefore, provides a very high level of fault tolerance with respect to hard faults, which may occur in the PPM or in the SPM. The system continues operate in the presence of disparity in one or two channels, the system may perform a safe shutdown for the process, if the disparity occurs in all channels concurrently. If only a single output controller has the disparity, the system performs 2-of-2 voting among the output data that is produced by two neighboring channels. The system performs 1-of-1 voting if the disparity occurs in two channels for the same controlled points in the process.

The redundant computer system further includes a triple redundant diagnostic system in each channel, whereby the diagnostic system includes a 2-of-3 voter component that is coupled with the output of an improper sequence detector (ISD) and is coupled with the separate communication lines of the PPM and SPM. The improper sequence detector (ISD) monitors the associated output controller to verify the time-based, logical program that the output controller performs. The PPM and SPM in each channel uses the associated I/O bus to verify the condition of the associated output controller and uses separate communication lines to control output of the 2-of-3 voter component (VC).

The VC includes at least three parallel voting groups, with each group including at least two small power electronic switches, such as transistors, connected in series. This configuration of the 2-of-3 VC is able continues to be operational in the presence of a fault in any one switch and may to be operational in the presence of some kind of two faults in two switches. The VC receives three input signals from the PPM, SPM, and the ISD. The VC produces an output signal on inputs of the logic circuits in each channel, as the result of majority voting among signals of the associated PPM, SPM, and ISD. If at least two components among the PPM, the SPM, and the ISD vote that the output controller fails, the logic circuit drives the electronic switches of the associated channel to an OFF state, so as to de-energize output of the associated channel. This triple redundant diagnostic process allows the system to operate with one working output controller in the event that two output controllers concurrently fail in two channels. Furthermore, this triple redundant diagnostic system, which has no single point of failure, is considerably more effective than diagnostic systems that are currently used.

Continuing, the impact of the occurrence of faults in the logic circuit (LC) and in the output voting network (VN) are considered. The VN in each of the three channels performs 2-of-3 voting by using three series connected electronic switches, such as transistors or relays, which are provided in each channel. Each of the electronic switches is normally in an ON state, so as to energize a load of the system. The VN uses one electronic switch in each channel as a fault recovery valve (FRV). As such, if any two electronic switches in different channels are stuck or fixed in an OFF state due to a permanent failure, the system will remain operable with the one channel that continues to energize the load. If two electronic switches in the same channel are stuck or fixed in the ON state due to a permanent failure, such condition can lead to a dangerous system failure, since the load cannot be de-energized when the controlled process requires it. Furthermore, each output controller checks the condition of the three electronic switches by using conventional ongoing diagnostics, and sets a signal on the input of the FRV, which drives this switch to an OFF state, so as to de-energize the output of the associated channel. This allows the system to avoid a dangerous failure in the event that two electronic switches in series are stuck in an ON state. The system, therefore, continues to remain operational in the presence of up two faults of the electronic switches in two channels. Each logic circuit has no single point for a dangerous failure, but due to a single fault, it can set the associated electronic switch to an OFF state. In the event that two neighboring logic circuits concurrently fail in two associated channels, the system continues to remain operational using a third channel in the presence of two such faults. In some embodiments, the system in generally able to tolerate up to two fault occurrences in any combination of the logic circuit and the output controller. The system also performs a shutdown process to provide a safety condition to the controlled process if all system channels concurrently fail. As previously discussed, the system is able to remain operational in the presence of up to two hard or transient faults, and may operate properly on the occurrence of some types of three faults.

In another embodiment, a dual duplicated computing system (DDS) is provided, which is similar to the ultra-reliable computer system (URS) previously discussed. Accordingly, the DDS system includes two duplicated channels A and B, with each channel including a primary and a secondary processor module (PPM and SPM) that operate together in parallel. As such, the DDS system has the same primary functional components as the URS system, but the total number of components of the DDS system is 1.5 times less than in the URS system. Thus, the DDS system is substantially less expensive as compared to the URS system. As well as the URS, the DDS utilizes an effective fault diagnostic process that has no single point of failure. During normal operation, the DDS performs 2-of-2 voting between the output data that is produced by the PPM and the SPM in two channels. The output controller uses an embedded watchdog timer to verify whether the associated PPM and SPM have delivered output data on time or not. If the output data has not been delivered on time, the watchdog sends signal to the logic circuit that, in-turn, disables the outputs of this channel in the event that both the PPM and the SPM in the same channel concurrently fail. When a disparity occurs, the output controller (OC) excludes doubtful output data from a system output, and this output data is substituted by the output data that the OC received from neighboring output controller. The outputs of the logic circuit are connected with the inputs of the voting network (VN). The output controller sends signals to the logic circuit that, in-turn, disables the outputs of this channel, but the DDS continues to operate with a single healthy channel. In addition, conventional technology, such as SEC-DED, may be used in each channel for the detection/correction of faults, such as transient faults. The system continues to perform 2-of-2 voting in the event that up to two PPMs or up to two SPMs located in different channels fail concurrently due to the occurrence of hard (permanent) faults. This system also provides a decreased cost factor, as compared to the URS system, without sacrificing operational reliability. The DDS is also capable of achieving certification of up to SIL 3 in accordance with standards 61508 and 61511.

In another embodiment, a dual channel computing system (DCS) is provided, which includes two channels A and B that are similar in structure and operation to the dual channels of the DDS system. That is, the DCS system has the same primary functional components that the DDS utilizes, but the total number of DCS components is about 2 times less than that used in the DDS. In comparison to the ultra-reliable computer system (URS), the DCS has about 3 times less components, and due to this, the DCS is less costly than the URS system. During normal system operation, the DCS performs two-out-of-two (2-of-2) voting between the output data that is produced by the central processors CP A and CP B in channels A and B respectively. The output controller (OC) in each channel is connected with the output controller in neighboring channel over a read-only bus for receiving/sending output data to/from the output controller in the neighboring channel. The output controller uses an embedded watchdog timer to verify if the associated CP A and CP B have delivered output data on time or not. If the output data has not been delivered on time, the watchdog sends signal to the logic circuit that, in-turn, disables the outputs of this channel in the event that both the PPM and the SPM in the same channel concurrently fail.

In addition, the DCS introduces a new configuration that allows the CP A and the CP B to send output data to both the output controllers A and B at the same time to increase the reliability and availability of the system. For example, if the CP A and the output controller, which are located in different channels concurrently fail, the DCS continues to remain operational with the healthy CP B in channel B and with the healthy output controller in channel A. If the CP B and the output controller, which are located in different channels concurrently fail, the DCS continues to remain operational with the healthy CP A in channel A and with the healthy output controller in channel B. If both the PPM and the SPM in the same channel are healthy, but a disparity exists between their output data, such a condition is interpreted to indicate that the PPM or SPM is producing erroneous data due to occurrence of transient faults. The output data with disparity is counted as "doubtful", and because of that, the output controller activates a disparity signal D, which indicates that the system is not utilizing this doubtful data. The output controller then receives output data from neighboring output controller to substitute the doubtful output data and sends these data to the associated logic circuit.

The redundant computer system further includes a triple redundant diagnostic system in each channel, whereby the diagnostic system includes a 2-of-3 voter component that is coupled with the output of an improper sequence detector (ISD) and is coupled with the separate communication lines of the PPM and SPM. The improper sequence detector (ISD) monitors the associated output controller to verify the time-based, logical program that the output controller performs. The PPM and SPM in each channel uses the associated I/O bus to verify the condition of the associated output controller and uses separate communication lines to control output of the 2-of-3 voter component (VC).

The VC includes at least three parallel voting groups, with each group including at least two small power electronic switches, such as transistors, connected in series. This configuration of the 2-of-3 VC is able continues to be operational in the presence a fault in any one switch and may to be operational in the presence of some kind of two faults in two switches. The VC receives three input signals from the CP A, CP B, and the ISD. The VC produces an output signal on inputs of the logic circuits in each channel, as the result of majority voting among signals of the associated CP A, CP B, and ISD. If at least two components among the CP A, the CP B, and the ISD vote that the output controller fails, the logic circuit drives the electronic switches of the associated channel to an OFF state, so as to de-energize output of the associated channel. This triple redundant diagnostic process allows the system to operate with one working output controller in the event that two output controllers concurrently fail in two channels. Furthermore, this triple redundant diagnostic system, which has no single point of failure, is considerably more effective than diagnostic systems that are currently used. This feature allows the DCS to tolerate two faults, which significantly increases the reliability and operational availability of the system. In general, the DCS provides fault tolerance to any single point of failure stemming or resulting from either a permanent or a transient fault and continues to operate in the presence of some type of two faults. The DCS is also capable of achieving certification of up to SIL 3 in accordance with standards 61508 and 61511.

Another embodiment of the redundant computing system that includes a computer system 14 that integrates a safety section 14a and control section 14b that provides separate safety and control functionality. The safety section 14a and the control section 14b operate independently and have physical separation protection layers. Considering first the safety section 14a, it is includes a main chassis housing two redundant central processors, CP A and CP B, that operate in parallel, and include multiple remote chassis to provide safety control for up to four or more processes at the same time. CP A and the CP B have an embedded communication module for enabling communication between the CP A and CP B, and are connected to an isolated bus to provide communication between the safety and control sections of the integrated system. In the event that the physical parameters measured by the safety section deviate away from the safety range, the safety section informs the PC A and the SC B that the controlled process may be in a dangerous condition. If the safety and control sections cannot overcome the dangerous condition, the safety section brings the controlled process into a safety state.

In addition, the CP A and the CP B use this bus for communication with external devices, such as a host device and an operator interface. Each central processor further includes at least one embedded ETHERNET port, or other network communication interface, that consistently communicates with multiple remote chassis via external ETHERNET switches. Each remote chassis (FIGS. 9A-B) includes at least two input/output controllers (IOC) that are connected over a corresponding I/O (input/output) bus to I/O (input/output) modules for receiving/sending input/output data. Input module in each channel receives process information from a single sensor for each controlled point and sends this information to the associated central processor via IOC, which, in turn, transfers it over a long distance data bus. Each CP A and CP B uses an embedded ETHERNET port and an ETHERNET switch for scanning the IOC over a long distance data bus, which may be a fiber optic or copper cable, as well as any other communication medium for example. The safety section performs safety functions on a cyclical basis, whereby the operation cycle period is defined by the scan time. During each scan, the CP A and the CP B receive input data from the associated IOC that obtained it from the corresponding input module, then the CP A and the CP B synchronously execute an application program, whereupon and they send output data to the associated IOC.

In general, the safety section operations are similar to the operation of the dual channel system (DCS) previously discussed, but the safety section additionally uses two IOCs for managing the I/O function in the remote chassis, which is absent in other embodiments. Each remote chassis further includes at least two input modules, each of which receives input data that is produced by a single sensor for each controlled point. In the event that the input data exceeds the second limit, the CP A and the CP B section sends an alarm signal to the control section, thereby notifying the occurrence a dangerous failure. Furthermore, conventional technologies, such as SEC-DED, may be used in each channel for the detection/correction of faults, such as transient faults. It should be appreciated that the safety section may operate in the presence of any single hard (permanent) failure and may operate in the presence of some kinds of two transient faults. After the occurrence of two hard failures, the system output is de-energized, whereupon a safety shutdown of the process is performed.

In still another embodiment, the control section 14b of the ISC system includes two identical process controllers, such as a primary controller (PC A) and a secondary controller (SC B), which are arranged in a back-up redundant configuration that is located on a main chassis. The PC A and the SC B operate in a commonly used mode, whereby the PC A operates in an active mode providing all communications with input/output devices and with other devices, while the SC B is placed in a hot standby mode. The control section further includes a multiple remote chassis, each of which housing at least two input/output controllers (IOC). Each IOC operatively communicates over I/O bus with the associated input modules 1–N for receiving input data from control inputs. These control inputs can be, for example, from flow and pressure sensors, although other inputs can be used. Specifically, each IOC makes two copies of the input data and send them respectively to the PC and SC. Only the PC A is selected, however, for sending the results of the application program execution to the associated IOC. Each process controller further includes at least one embedded ETHERNET port that consistently scanning the associated IOC in multiple remote chassis via external ETHERNET switches through long distance buses that can be fiber optic or copper cables, as well as any other communication medium for example. Such that in each scan, the PC A and the SC B receive input data from the associated IOC that obtained it from corresponding input module; PC A and the PC B then synchronously execute an application program. The control section performs control functionality on a cyclical basis, whereby the operation cycle period is defined by the scan time. A result of the application program execution is sending as output data back to associated IOC only by primary controller. In the event that primary controller fails, the secondary controller automatically obtains primary status. In the event that secondary process controller fails, the primary process controller holds the primary status. Faulty process controller should be replacing online by a new one that immediately obtains the secondary status.

The firmware and hardware of the control section of the redundant computer system may include a self and mutual diagnostic system that PC A and SC B perform periodically with each scan of the operating cycle. This diagnostic allows the status of PC A and SC B to be determined, while allowing their statuses to be changed from PC to SC and from SC to PC in the event that the PC or the SC fails (FIGS. 10, 11AA-AC, 11BA-BC). In the event that the PC fails, the secondary controller operates in a stand-alone mode changing secondary status to primary. In the event that the SC fails, the primary controller operates in a stand-alone mode, while retaining primary status. In addition, the PC A and SC B use this diagnostic process for synchronized operation of the PC A and SC B. Furthermore, the diagnostic process is able to define, by default, what status PC A and SC B have, based on their location on the main chassis. The diagnostic process contains a method to manage all control section operations that include the change in PC and SC status in the event that the PC or the SC fails. The control section and the safety section operate independently, and have physical separation protection layers. The safety section, thereby, further increases the safety level of the control system section. Because of such configuration, the integrated systems is capable of meeting up to SIL 3 requirements in accordance with standards IEC 61511-1 11.2.4.

A redundant computer system comprising a first channel, a second channel, and a third channel each channel comprising primary processor; a secondary processor, wherein said primary processor is in operative communication with said secondary processor, said primary and secondary processor operate in parallel redundancy; said primary processor in the first channel, said primary processor in the second channel, and said primary processor in the third channel are in operative communication with each other; said secondary processor in the first channel, said secondary processor in the second channel, and said secondary processor in the third channel are in operative communication with each other; an input module includes in each channel a first and a second interface to provide operative communication of said input module with said primary and secondary processor, wherein said input module in each channel is in operative communication with a first and a second section of a dual redundant sensor (DRS) for each controlled point that delivers input data to said input module; said input module including means for calculating a deviation between values of said input data produced by said first and second section of the DRS for each controlled point to indicate whether said deviation is within a predetermined limit; said input module can be digital or analog; said primary processor and said secondary processor in each channel configured to receive said input data from said input module to synchronously execute an application program and to transfer output data as a result of said application program execution to an output module via a first and a second interface; said output module in each channel includes an output controller that is in operative communication with said PPM and with said SPM for receiving said output data from the PPM and from the SPM; said output module further includes a voter component and an improper sequence detector (ISD) component; said output module can be digital or analog; said voter component is in operative communication with said PPM and said SPM, said ISD component is in operative communication with said voter component and with said output controller; means in said improper sequence detector that verifies an absence or presence a fault in timetable and verifies consistency of program operations in said output controller; a comparing diagnostic in said primary processor module (PPM) and said secondary processor module (SPM) in each channel for monitoring a condition of said output module, said comparing diagnostic includes a voter component and includes an improper sequence detector (ISD) component; said comparison diagnostic allows the system to disable said output module if at least two elements among the PPM, the SPM, and the ISD vote that said output controller has failed; said comparison diagnostic having no single point of failure to allow the system to operate with one operational output module in the event that two neighboring output modules fail concurrently; said output controller connected via a read only bus with a neighboring output controller to receive or send said output data from or to said neighboring output controllers; means wherein said output controller includes for activating a disparity signal on an input of said logic circuit for some controlled points if the associated PPM and SPM produce said output data that are different due to occurrence of transient faults, or due to said deviation that is out of said predetermined limits for said controlled points; said disparity signal being activated as a result of an exclusive NOR (XNOR) operation between single-bit output data that said output controller receives from the associated PPM and SPM; said output data is substituted by the output data produced by neighboring output controllers for some controlled points if said disparity signal is activated for said controlled points; said logic circuit includes in each channel an arrangement of a plurality of logic gates that are coupled through isolated drivers with inputs of said voting network for each controlled point; said logic circuit in said first channel providing the outputs of the associated voting network as a product of said output data that is received from said output controller in the first channel and a sum of said output data received from output controllers in said second and third channels; said logic circuit in said second channel providing outputs of the associated voting network as a product of said output data that is received from said output controller in said second channel and a sum of said output data received from said output controllers in said first and third channels; said logic circuit in said third channel providing outputs of the associated voting network as a product of said output data that is received from said output controller in said third channel and a sum of said output data received from said output controllers in said first and second channels; said logic circuit and voting network performing a logic operation with said output data to provide 2-of-3 voting among output data produced by said first, second, and third channel; said voting network including a fault recovery valve for each controlled point to allow said voting network to remain operational in the presence of up two faults; the system continuing to perform 2-of-3 voting even though three PPMs or three SPMs concurrently fail, thereby, allowing the system to continue to remain operational in the presence of multiple faults in the PPM and in the SPM; the system energizes a controlled process in the fault free operation when a majority of system channels operate properly and de-energizes said process in the presence of multiple dangerous failures in the system; the system continues to operate in the presence of any two faults in one or two channels, the system providing a safe shutdown for the process if hard faults occurs in all channels; each PPM uses same hardware and same software, which are different with hardware and software that each SPM uses, said hardware and software diversity allows the system decreasing the probability of common cause failure.

The redundant computer system of claim 1, wherein said voter component includes a plurality of parallel voting groups that are coupled between a voltage source and a ground node, with each voting group including at least two low power switches, such as a MOSFET or any other suitable transistor or relay for example, connected in series; said primary and secondary processor in each channel continually controlling said switches in two groups by the associated lines, while the switches in the third group is controlled by said ISD; said voter component produces an output signal as a result of a majority of two-out-of-three voting among signals, which the primary and a secondary processor and the ISD produce on the inputs of said voter component; said output signal in each channel is connected to a corresponding input of said logic circuit that disconnects output of the associated channel from output of the system if said majority of two-out-of-three signals vote that said output controller fails; a logic circuit in each channel includes an arrangement of plurality of a logic gates, the inputs of said arrangement is in operative communication with said output controller; outputs of said arrangement is in operative communication with inputs of said voting network via an isolation drivers; said logic circuit is in operative communication with said output controller and in operative communication with said voting network, said voting network includes three switches in series for each controlled point that is in operative communication with said logic circuit, said three switches in said first, second, and third channels are coupled in parallel for each controlled point for providing an output of the system; in normal operation, the system performs 2-of-3 voting among output data produced by said first, second, and third channel; a single output controller excludes an own output data from outputs of said logic circuit and uses output data received from the neighboring output controllers, the system then performs the 2-of-2 voting instead of 2-of-3 voting if said disparity signal is activated in said single output controller for some controlled points; said output controllers in two channels excludes an own output data from outputs of said associated logic circuits and uses output data received from the neighboring output controllers, the system then performs the 1-of-2 voting instead of 2-of-3 voting if said disparity signal activates in said two channels of the system for some controlled points; the system, continues to operate in the presence of said disparity in one or two channels, the system may perform a safe shutdown for the process, if said disparity occurs in all channels concurrently.

A redundant computer system comprising a first channel, and a second channel, each channel comprising a primary processor; a secondary processor, wherein said primary processor is in operative communication with said secondary processor; said primary and secondary processor operate in parallel redundancy; said primary processor in the first channel and said primary processor in the second channel are in operative communication with each other; said secondary processor in the first channel and said secondary processor in the second channel are in operative communication with each other; an input module includes in each channel a first and a second interface to provide operative communication of said input module with said primary and secondary processor, said input module can be digital or analog module; said input module in each channel is in operative communication with a first and a second section of a dual redundant sensor (DRS) for each controlled point that deliver an input data to said input module; means in said input module for calculating a deviation between values of said input data produced by said first and in second section of the DRS for each controlled point to indicate whether said deviation is within predetermined limits or not; said primary processor and said secondary processor in each channel receive said input data for synchronously execute an application program and for transfer an output data as a result of said application program execution to an output module via a first and a second interface; said output module can be digital or analog; said output module in each channel includes an output controller, said voter and improper sequence components, a logic circuit and a voting network; said output module can be digital or analog; said voter component is in operative communication with said PPM and said SPM, said ISD component is in operative communication with said voter component and with said output controller; said comparison diagnostic in said primary processor (PPM) and said secondary processor (SPM) in each channel for monitoring condition of said output module, said diagnostic includes a voter component and includes an improper sequence detector (ISD) component; said comparison diagnostic allows the system for disabling said output module if at least two elements among the PPM, the SPM, and the ISD vote that the output controller fails; means in said improper sequence detector that verify absence or presence a fault in timetable and verify consistency of program operations in an output module, said output module in operative communication with said primary processor and said secondary processor and with said ISD component; said output controller connected via a read only bus with a neighboring output controller for receiving/sending said output data from/to said neighboring output controller; means in said output controller for activating a disparity signal on input of said logic circuit for some controlled points if the associated primary and secondary processor produce said output data that are different due to occurrence of transient faults, or due to said deviation that is out of said predetermined limits for said controlled points; said disparity signal is activated as a result of an Exclusive NOR (XNOR) operation between single-bit output data that said output controller receives from the associated PPM and SPM; the primary processor and the secondary processor in each channel use said input data for synchronously execute an application program and for transfer an output data as a result of said application program execution to said output controller in said output module; said logic circuit and voting network perform a logic operation with said output data to provide 2-of-2 voting among output data produced by said first and second channel of the system, said voting network includes a fault recovery valve for each controlled point to provide no single point of failure of said voting network; said voting networks includes plurality switches in series, said switches in said first and second channels connected in parallel to provide output of the system; the system performs said 2-of-2 voting even though only two PPM or two SPM are operational; the system, thereby, continues to be operational in the presence of any two faults in said PPM and said SPM; said output controller connected via a read only buses with neighboring output controller for receiving/sending said output data from/to said neighboring output controller; said output controller excludes an own output data from inputs of said logic circuit and uses output data receiving from the neighboring output controller, the system then performs the 1-of-2 voting instead of 2-of-2 voting if said disparity signal activates in said output controller for some controlled points; the system, thereby, continues operate in the presence of said disparity in one channel, the system may perform a safe shutdown for the process, if said disparity occurs in first and second channel concurrently; said logic circuit is in operative communication with said output controller and in operative communication with said voting network, which contains multiple switches in series for each controlled points, said switches in said first and second channels connected in parallel; said logic circuit in said first channel provides outputs of the associated voting network as a product of said output data received from said output controller in said first channel and a sum of said output data receiving from output controllers in said first and second channel; said logic circuit in said second channel provides outputs of the associated voting network as a product of said output data received from said output controller in said second channel and a sum of said output data receiving from output controllers in said second and first channel.

A redundant computer system comprising a first channel, a second channel each channel comprising a first central processor and a second central processor that operate in parallel redundancy; said first central processor is in operative communication with said secondary central processor; a first input module and a second input module is in operative communication with said first central processor and with said second central processor via the associated interfaces; said first input module and said second input module is coupled with a single sensor for each controlled point for delivering an input data of the process to the first processor and to the second processor respectively; said first and second control processor use said input data for synchronously execute an application program and for transfer an output data as a result of said application program execution to said output module in normal system operation; said output module includes an output controller, a voter and an improper sequence components, a logic circuit, and a voting network; said first output controller is in operative communication with said first central processor via said first interface and is in operative communication with said second central processor via said second interface; said second output controller is in operative communication with said second central processor via said first interface and is in operative communication with said first central processor via said second interface; a first voter component and a second voter component that is in operative communication with said primary central processor and with secondary central processor; an improper sequence detector that verify absence or presence a fault in timetable and verify a consistency of program operations of said output controller; said output controller is in operative communication with the associated logic circuit in said first and second channel; a comparing diagnostic in said first central processor (FCP) and said second central processor (SCP) in each channel for monitoring condition of said output module, said comparing diagnostic includes a voter component and includes an improper sequence detector (ISD) component; said comparison diagnostic allows the system for disabling said output module if at least two elements among the FCP, the SCP, and the ISD vote that said output controller fails; said comparison diagnostic having no single point of failure allows the system to operate with one working output controller in the event that neighboring output controller fails; said output controller connected via a read only bus with a neighboring output controller for receiving/sending said output data from/to said neighboring output controller; said output controller activates a disparity signal on inputs of said logic circuit for some controlled points if said output controller receive different data from said first and second control processor due to occurrence of some transient faults; said disparity signal is activated as a result of an Exclusive NOR (XNOR) operation between output data that said output controller receives from said first and second central processors;

said output data is substitutes by the output data produced by neighboring output controller for some controlled points if said disparity signal is activated for said controlled points; the system continues operate if said disparity occurs in only one output controller, the system performs a safe shutdown for the process, if said disparity occurs in output controllers in said first a second channels concurrently; said logic circuit is in operative communication with said output controller and in operative communication with a voting network, which contains multiple switches in series; said switches in said first a second channels connected in parallel for each controlled point; each logic circuit and each voting network receives said output data from said first and second central processor via said output controller, said logic circuit and voting network perform a certain logic operation with said output data to provide said 2-of-2 voting among output data that produced by said first and second central processor; means in said first and second central processor to use an additional separate buses that provide operative communication with both first and second output controllers; said means provide the system continues to be operational in the presence of two faults: in first control processor and in second output controller, or in second central processor and in first output controller; the system continues to be operational in the presence of any single fault and may operate in the presence of some kind of two faults; the system energizes controlled process in the fault free operation when both first and second central processor and associating components operating properly and de-energizes said process in the presence of two dangerous failures in the system.

A computer system integrating safety and control functionality comprising a computer system integrating safety section and a control section that provide the system safety and control functionality respectively; a safety section includes at least one main chassis housing a first and a second channel, each channel comprising a first central processor and a second central processor that operate in parallel redundancy; said first and second central processor are located in a main chassis, means in said first and second central processors for communicating with said control section and with an external devices over separated buses in redundant configuration; said first and second central processors are in operative communication through a redundant bus for synchronizing their operation; said first and second central processor has at least one ETHERNET port and at least one ETHERNET switch for operative communicating with one or multiple remote chassis via a first and a second input/output controller located on said remote chassis; said remote chassis may be located far away from the main chassis to be nearer to controlled process; said communicating are cooper or fiber cables or can be wireless; each said remote chassis includes a first and a second input/output controller that is in operative communication with said first central processor and with said second central processor, a first and a second input module that is in operative communication with said first and second input/output controller, said first input module and said second input module is coupled with said single sensor per controlled point for delivering an input data of the process to said first and second central processor respectively via the associated input/output controllers (IOC); said first and second central processor uses said input data for synchronously execute an application program and transfer said output data as a result of said application program execution to said first and second IOC under normal system operation; said IOC, in turn, transfers said output data to said output module that includes an output controller, said voter and improper sequence components, a logic circuit, and a voting network; an improper sequence detector that verify absence or presence a fault in timetable and verify a consistency of program operations of said output controller; the output controller is in operative communication with the associated voter component and with the associated logic circuits in said first and second channel; a diagnostic in said first central processor (FCP) and said second central processor (SCP) in each channel for monitoring condition of said output module, said diagnostic includes in each channel a voter component and includes an improper sequence detector (ISD) component; said diagnostic allows the system for disabling said output module if at least two elements among the FCP, the SCP, and the ISD vote that said output controller fails; said diagnostic having no single point of failure allows the system to operate with one working output controller in the event that neighboring output controller fails; a logic circuit is in operative communication with said output controller and in operative communication with said voting network, which contains multiple switches in series; said switches in different voting networks connected in parallel for providing an output of the system for each controlled point; said logic circuit and said voting network perform a certain logic operation with said output data to provide 2-of-2 voting among output data that said first and second IOC receive from said first and second central processor; means in the first and second central processor for energizing the process in the fault free operation when two input/output controllers and all associating modules and components operating properly and de-energizing said process in the presence of two dangerous failures in the system; said control section housing at least two process controllers arranged in back-up redundant configuration, said process controllers perform control functions without interrupts from said safety section until a critical parameters of controlled process are in the safe range; said control section includes at least one main chassis housing a primary and a secondary process controller, that are in operative communication each to other through a first and a second interface and a redundant bus; means in said first and secondary process controller for communicating with said safety section and with an external devices over separated buses; said primary and secondary central processor has at least one ETHERNET port and at least one ETHERNET switch for operative communicating with one or multiple remote chassis via the associated input/output controller located on said remote chassis; said remote chassis may be located far away from the main chassis to be nearer to controlled process; said communicating are cooper or fiber cables, or can be wireless; each said remote chassis includes a multiple input and output modules that are in operative communicate with said first and second input/output controllers; said primary and secondary central processor obtains an input data from said input modules via said input/output controllers and uses said input data for synchronously execute an application program; means in said process controller to select one process controller as a primary process controller, while identify the neighboring process controller as a secondary process controller; said first and second interface include a self-diagnostic and a mutual diagnostic for discovering possible faults occurrence in said primary and in said secondary process controller respectively and for disabling said first or second process controller when it fails; method in hardware and software in each process controller to use said first and second interface for providing said process controller to obtain a primary status or a secondary status depends on location in said backplane; select only said primary process controller for sending output data as result of said control program execution to the system control outputs, for allowing said primary process controller to hold said primary status and operating in a stand-alone mode in the event that said neighboring process controller fails; said secondary process controller changes a secondary status to said primary status and performs control function in said stand-alone mode in the event that said primary process controller fails; said faulty process controller can be online removing and replacing by a new process controller, status of said new process controller is automatically setting up as a new status after inserting said new process controller into a backplane, and then automatically changed from new status to secondary status during a current cycle of said control section operation; said new process controller is then reprogramming by the neighboring processor that holds said primary status; means in said primary and in secondary controller to switch said serial interface from said self-diagnostic to an mutual diagnostic by using a number of an electronic Single-Pole Double-Throw (SPDT) switches; means in said secondary process controller to change status from secondary status to primary status and starts operating in said stand-alone mode if said primary process controller fails; means in said primary process controller to keep primary status after going to said stand-alone mode in the event that secondary process controller fails; said first and second interface in said primary and in secondary process controller is for transmitting/receiving said self-diagnostic data and said status to said primary and secondary process controller respectively.

A redundant control system of claim 5 wherein said primary and secondary process controllers are identical; means in said process controllers for defining said primary status or said secondary status after inserting said process controllers in said backplane and power up; said backplane includes a first socket connector located on the left side of said backplane and includes a second socket connector located on the right side of said backplane; selected pins of said first socket connector connected to plus terminal of a power supply to form a first identification word, while selected pins of said second socket connector connected to ground terminal of said power supply to form a second identification word; a first and a second input port in each of said process controllers, said input port coupled with a plug connector for inserting each process controller either to left side or to right side of said backplane; if one said process controller inserted to left side of said backplane it is coupled with a first socket connector, said one process controller reads a first identification word via said first input port and gets said primary status after power up; if another process controller inserted to right side of said backplane it is coupled with a second socket connector said another process controller reads a second identification word via said second input port and gets said secondary status after power up; said primary status and said secondary status of said process controllers are setting thereby initially after system power up, but can be changed during system operation; said first and second interface is a serial peripheral interface (SPI) in said primary and in secondary process controller for transmitting/receiving said self-diagnostic data and status data to said primary and secondary process controller respectively; means in said primary and in secondary process controller to switch said SPI from said self-diagnostic to an exchange said status data by using a number of an electronic Single-Pole Double-Throw (SPDT) switches; further means in said primary and in secondary process controller for continuously indicate primary or secondary status of said controllers; said primary and secondary process controller can be remove and replace by new healthy process controller if primary or secondary process controller fails; status of said new healthy process controller is automatically setting up as new start status after power up, and then automatically changed to secondary status not later than during of one cycle of said control section operation; said SPI interfaces for discovering possible faults occurrence in the primary or in the secondary process controller respectively and disabling the primary or secondary process controller when it fails; said SPI interfaces can operate in full Duplex mode.

BRIEF DESCRIPTION OF THE DRAWINGS

The various embodiments disclosed herein will become better understood with regard to the following description, accompanying drawings, and appended claims wherein:

FIG. 11AB is another partial flow diagram showing the operation of the primary controller of the system provided in FIG. 9 in accordance with the concepts and disclosures presented herein;

FIG. 11AC is a further partial flow diagram showing the operation of the primary controller of the system provided in FIG. 9 in accordance with the concepts and disclosures presented herein;

FIG. 11BB is another partial flow diagram showing the operation of the secondary controller of the system provided in FIG. 9 in accordance with the concepts and disclosures presented herein; and FIG. 11BC is a further partial flow diagram showing the operation of the secondary controller of the system provided in FIG. 9 in accordance with the concepts and disclosures presented herein.

DETAILED DESCRIPTION

Figure 1:
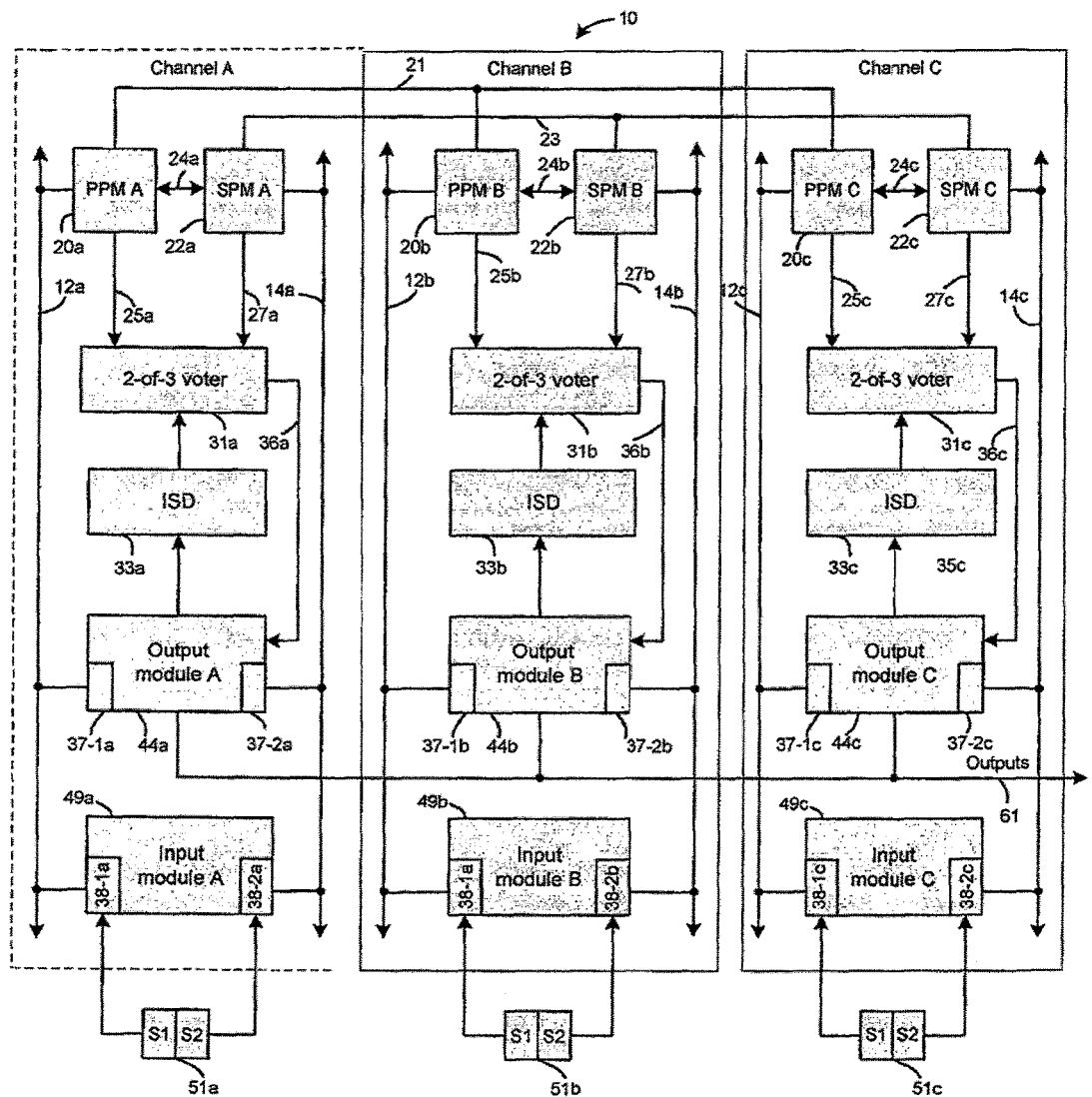
FIG. 1 is a block diagram of one embodiment of a triple redundant computer system having channels A-C in accordance with the concepts and disclosures presented herein.

In one embodiment, a redundant computer system 10 is shown in FIG. 1 of the drawings. The system 10 includes a plurality of parallel channels, and as such, may include for exemplary purposes, the following three channels, identified as A, B and C. For clarity, the components of each of the channels A, B and C are denoted in the drawings by respective reference characters a, b and c. Furthermore, because each of the parallel channels A, B and C are structurally equivalent, only channel A has been discussed below. Channel A includes a primary processor module 20a (PPM A) and a secondary processor module 22a (SPM A), which operatively communicate with each other via a communication bus 24a. The interface 37-1a of the output module A 44a and the interface 38-1a of the input module A 49a are in operative communication with the PPM 20a (PPM A) via an input/output (I/O) bus 12a. In addition, the interface 37-2a of the output module A (44a) and the interface 38-2a of the input module A (49a) are in operative communication with the SPM 22a (SPM A) via an input/output (I/O) bus 14a. In some embodiments, the input and output modules and corresponding redundant sensors may be digital or analog.

Thus, the PPM A receives input data from the input module A (49a) via the interface 38-1a, and sends output data to the output module A (44a) via the interface 37-1a. The SPM A receives input data from the input module A via the interface 38-2a, and sends output data to the output module A via the interface 37-2a. In addition, an input module A is provided in operative communication with a plurality of redundant sensors, such as dual redundant sensor (DRS) 51a. It should be appreciated, that each sensor 51a may integrate a first and a second section into a single hardware package, whereupon these sensors are used for the same measurement at each controlled point. The input module 49a simultaneously obtains two values of input data that are issued by the first and second sections of one or more DRSs and sends them to PPM A and to SPM B. A possible deviation may occur between the values of input data that is produced by the first and second sections of the DRS.

In addition, channel A, which has been described above, is in operative communication with channels B and C. As such, PPM A 20a, PPM B 20b and PPM C 20c operatively communicate with each other via a primary communication bus 21, while SPM A 22a, SPM B 22b, and SPM C 22c operatively communicate with each other via a secondary communication bus 23. The primary communication bus 21 enables the PPM A-C to synchronize their operation, while the secondary communication bus 23 enables the SPM A-C to synchronize their operation. The bus 24 provides the PPM and the associated SPM synchronous operation in each A-C channel. In addition, the output module A 44a, the output module B 44b and the output module C 44c operatively communicate with each other via a communication bus 55, which in some embodiments may comprise a read-only bus.

Figure 2:
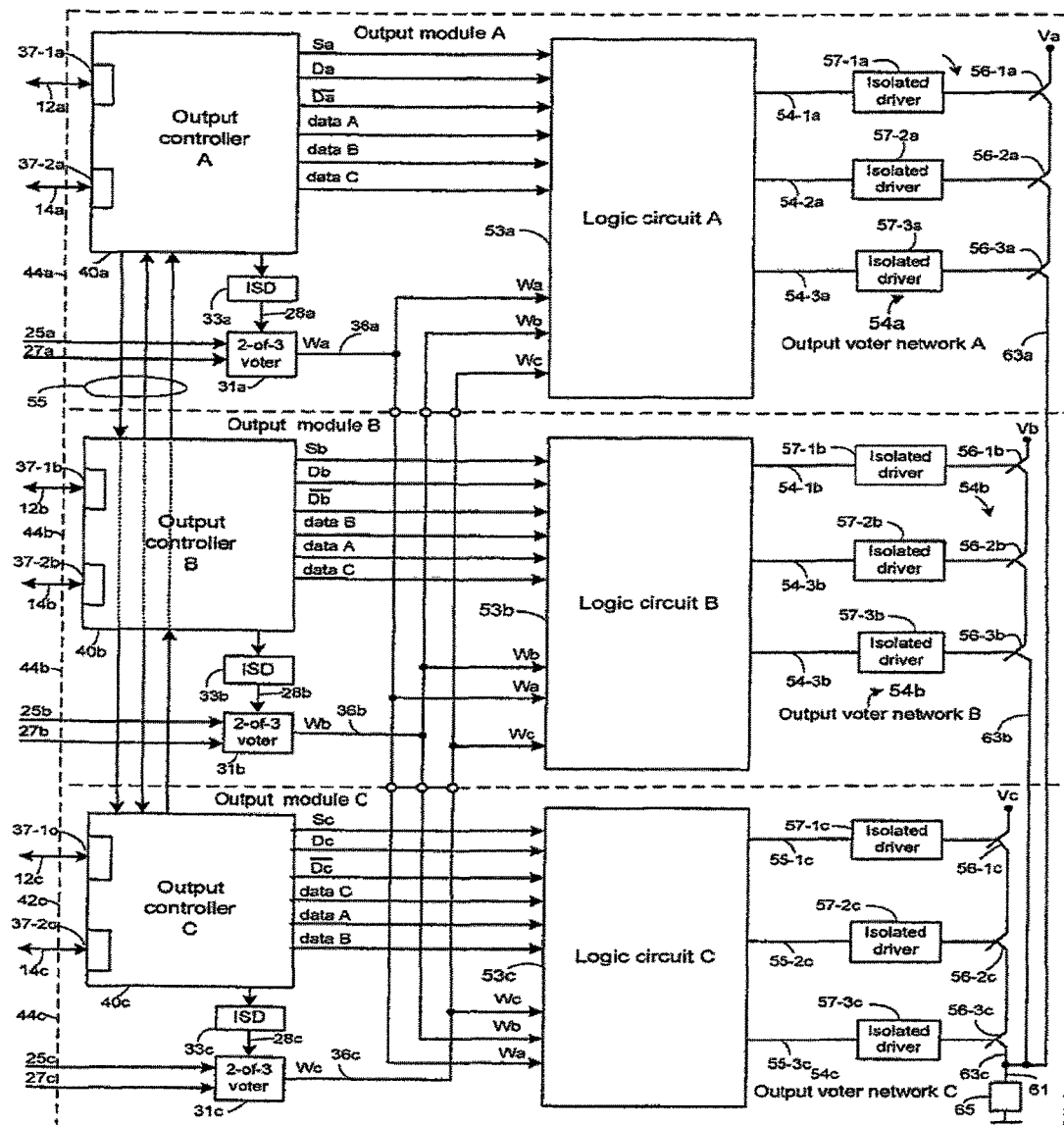
FIG. 2 is a block diagram of the output modules of the triple redundant computer system shown in FIG. 1 in accordance with the concepts and disclosures presented herein.

In some embodiments, the system 10 performs safety and control functions on a cyclical basis, whereby an operation cycle period is defined by a scan time, which includes the time required for input data polling, application program execution, and a time required for the transfer of output data to the output module. In addition, application program execution and input data polling are overlapped. The PPMs A-C send output data as result of the application program execution to the associated output module 44, as shown in FIG. 2. The output controller 40 in each channel compares the output data that it has received from the associated PPM and SPM, and uses the output data that is produced by the PPM in the event that the associated SPM fails permanently. Similarly, the output controller 40 uses the output data that is produced by the associated SPM if the associated PPM fails. In the event that the associated PPM and SPM are healthy, but the output controller 40 discovers a disparity between the output data that produced by the PPM and SPM for a particular controlled point, it may be due to the occurrence of an unacceptable data deviation or due to one or more transient faults. The output data with disparity is counted as "doubtful", and because of that, the output controller 40 activates a disparity signal D indicating that the system 10 is not utilizing this doubtful data. The output controller (OC) 40 then sends zero output data to the neighboring output controllers, and receives output data from neighboring output controllers through the bus 55 to substitute the doubtful output data. The output controller 40a, for example, uses output data that is received from the PPM A by default, if the output data of the PPM A and SPM A do not have a disparity. The output controllers in all channels operate similarly due to the symmetrical configuration of the components provided by the system 10.

Continuing to FIG. 2, the operational components of the output modules A-C are presented. Specifically, the output module A includes output controller A, logic circuit A, and voting network A; output module B includes output controller B, logic circuit B, and voting network B; and output module C includes output controller C, logic circuit C, and voting network C. The output controller 40a, for example, sends output data to the logic circuit 53a, which is in operative communication with the associated voting network via communication lines 54-1a, 54-2a, and 54-3a for each controlled point.

The communication lines 54-1a, 54-2a, and 54-3a connected to the an optoelectronic isolation drivers 57-1a, 57-1b, and 57-1c that isolated logic circuits from switches 56-1a, 56-2a, and 56-3a, that are connected in series between the associated power supply V1 and output 63a, which, in turn, are coupled with the load 66 of the system 10. This configuration allows the system 10 performs two-out-of-three (2-of-3) voting among the output data A, B, and C during normal operation and provides the system 10 to remain operational in the presence up to any two faults. The comparison diagnostic, which is described above is able to restore the system 10 back to proper operation after the occurrence of one or more permanent and transient faults in each channel. In addition, the output controller uses any suitable technique, such as SEC-DED (single error correct, double error detect), which allows for the correction of any one fault, and to indicate the occurrence of two faults in the PPM and SPM during their communication with the output controller through the associated buses 12 and 14.

Furthermore, the system 10 continues to perform 2-of-3 voting if all three PPMs or all three SPMs in different channels are failing concurrently, since each channel still produces three sets of output data that are received either from PPMs A-C or from the SPMs A-C. The system 10, therefore, provides a high level of fault tolerance with respect to permanent faults, which may occur in the PPMs A-C or in the SPMs A-C.

In another embodiment, the system 10 may be configured to utilize a single triple redundant sensor (TRS) that includes three identical sections that are integrated in a single hardware package. The sections of the TRS are designed to measure a value of a single controlled point in the process. The sections S1, S2, and S3 are coupled with input modules 49a, 49b, and 49c respectively. The input module 49a receives input data from sensor S1, and transfers this data in a digital format to the PPM A and SPM A simultaneously through buses 12a and 14a. The input module 49b receives the input data from sensor S2 and transfers it in a digital format to the PPM B and the SPM B simultaneously through buses 12b and 14b. In addition, the input module 49c receives input data from sensor S3 and transfers it in a digital format to the PPM C and SPM C simultaneously through buses 12c and 14c. It should be appreciated that in some embodiments, the input modules 49 may be digital or analog. The PPM and the SPM in each channel receive input data, execute an application program and transfer output data in single-bit format to output module 44 that also can be digital or analog. The output controller 40, the logic circuit 53, and the voting network 54 provide output 61 as result of 2-of-3 voting among output data A, B, and C if the system 10 operates with digital modules, as it was described above. Alternatively, if the system operates with analog modules, then an analog module in each channel utilizes said output controller that is coupled with a digital-to-analog converter (DAC). The outputs of the DAC in each channel may be coupled with a conventional current summing circuit (CSC), which provides output 61 of the system 10 as a mid-value among the output currents that are produced by all of the channels of the system 10. The current summing circuit is able to keep the same value of output current in the event that up to two channels concurrently fail. (Analog output modules are not shown in FIG. 2 for the sake simplicity). A Triple Redundant (TMR) diagnostic using a digital or analog module includes a 2-of-3 voter 31 that is coupled with an improper sequence detector (ISD) 33, and is coupled with an associated PPM and SPM in each channel. The operation of such systems will be clear from the description presented below.

Continuing, the output module A includes an output controller A 40a and a logic circuit A. The output controller A includes interfaces 37-1a and 37-2a, as previously discussed. In addition, the output controller A (OC A) sends output data A to output controllers B and C, and receives output data B and C from them at the same time via bus 55. Output controller A operatively sends data A to the logic circuit A and issues signals Sa, Da, and inverted signal (Da)' on the corresponding inputs of this logic circuit. The output data produced by PPM A and SPM A is designated herein as A1 and A2. The output controller calculates a "D" signal for each controlled point in channel A using the following equation: D={XNOR with A1, A2}, where Da is equal to '1', if there is no disparity between data A1 and data A2. If a disparity exists between data A1 and data A2, then the output controller 40 sets the inverse signals (Da)' that is equal to "0". A truth table is shown in Table 1 below.

TABLE 1

| A1 | A2 | XNOR | Da | Da' |
|----|----|------|-----|-----|
| 0  | 0  | 1    | 1   | 0   |
| 1  | 1  | 1    | 1   | 0   |
| 1  | 0  | 0    | 0   | 1   |
| 0  | 1  | 0    | 0   | 1   |

As shown in Table 2 below, Da signals are set to a '1' state for controlled points 0, 1, 2, and 3 for which output data of PPM A and SPM A are equal, and Da signal is set to a '0' state for 4, 5, 6, and 7 controlled points.

TABLE 2

| Points | PPM A data | SPM A data | Da signal | (Da') signal |
|--------|------------|------------|-----------|--------------|
| 0 | 1 | 1 | 1 | 0 |
| 1 | 0 | 0 | 1 | 0 |
| 2 | 1 | 1 | 1 | 0 |
| 3 | 0 | 0 | 1 | 0 |
| 4 | 1 | 0 | 0 | 1 |
| 5 | 0 | 1 | 0 | 1 |
| 6 | 1 | 0 | 0 | 1 |
| 7 | 0 | 1 | 0 | 1 |

The PPM A 20a is in operative communication with a voter component 31a by a communication line 25a, and the SPM 22a is in operative communication with the voter component 31a by a communication line 27a. The voter component 31a may be, in some embodiments, a 2-out-of-3 voter component. An improper sequence detector (ISD) module 33a is in operative communication with the voter component 31a. The ISD 33a monitors both time-based programs and logical programs that the output controller 40a executes. In the event that the ISD 33a discovers that the output controller 40a has failed, the ISD 33a activates an output signal 28a. The PPM A uses line 25a to activate an alarm signal when a failure in the output controller 40a is discovered during communication between PPM A and the output module 40a. Similarly, the SPM A uses line 27a for activating an alarm signal when a failure in the output controller 40a is discovered during communication between SPM A and the output controller 40a. If the ISD 33a discovers the occurrence of a failure in the output controller 40a, the ISD 33a activates an alarm signal on output 28a. The voter component 31a then produces output signal 36a, as result of two-out-of-three (2-out-of-3) voting among the alarm signals that are produced by the PPM A, the SPM A, and the ISD 33a. Output signal 36 is also used to disconnect the output 63a from the output 61 of the system 10 in the event of a fault occurrence in the output controller 40a. The performance of this diagnostic in each channel allows the system 10 to discover one or more possible failures in the output controller 40, since the voter component has no single point of failure, as will be discussed in detail below.

Figure 3A:
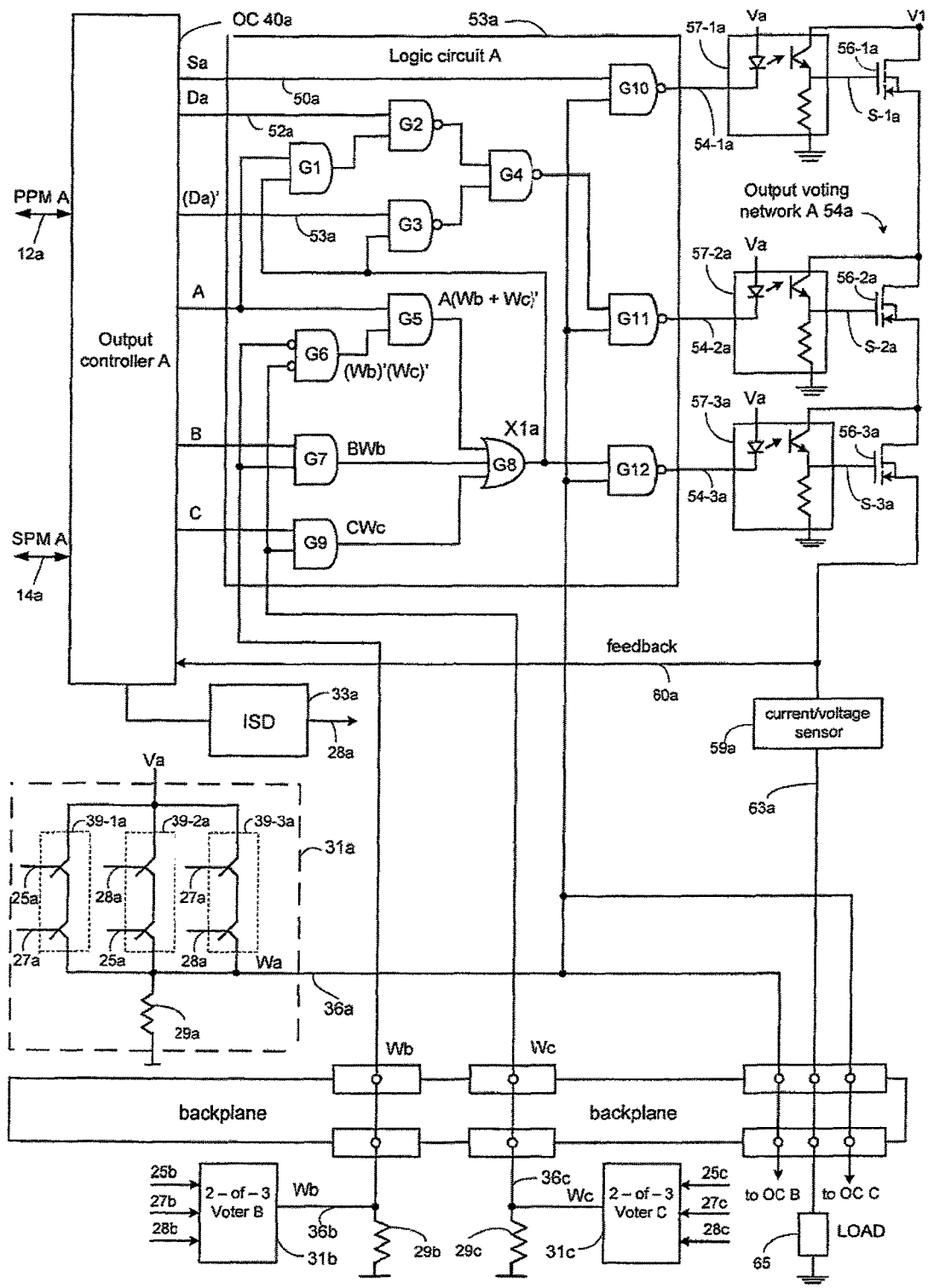
FIG. 3A is a schematic diagram of components of the output controller A of the embodiment of FIG. 1 in accordance with the concepts and disclosures presented herein.
Figure 3B:
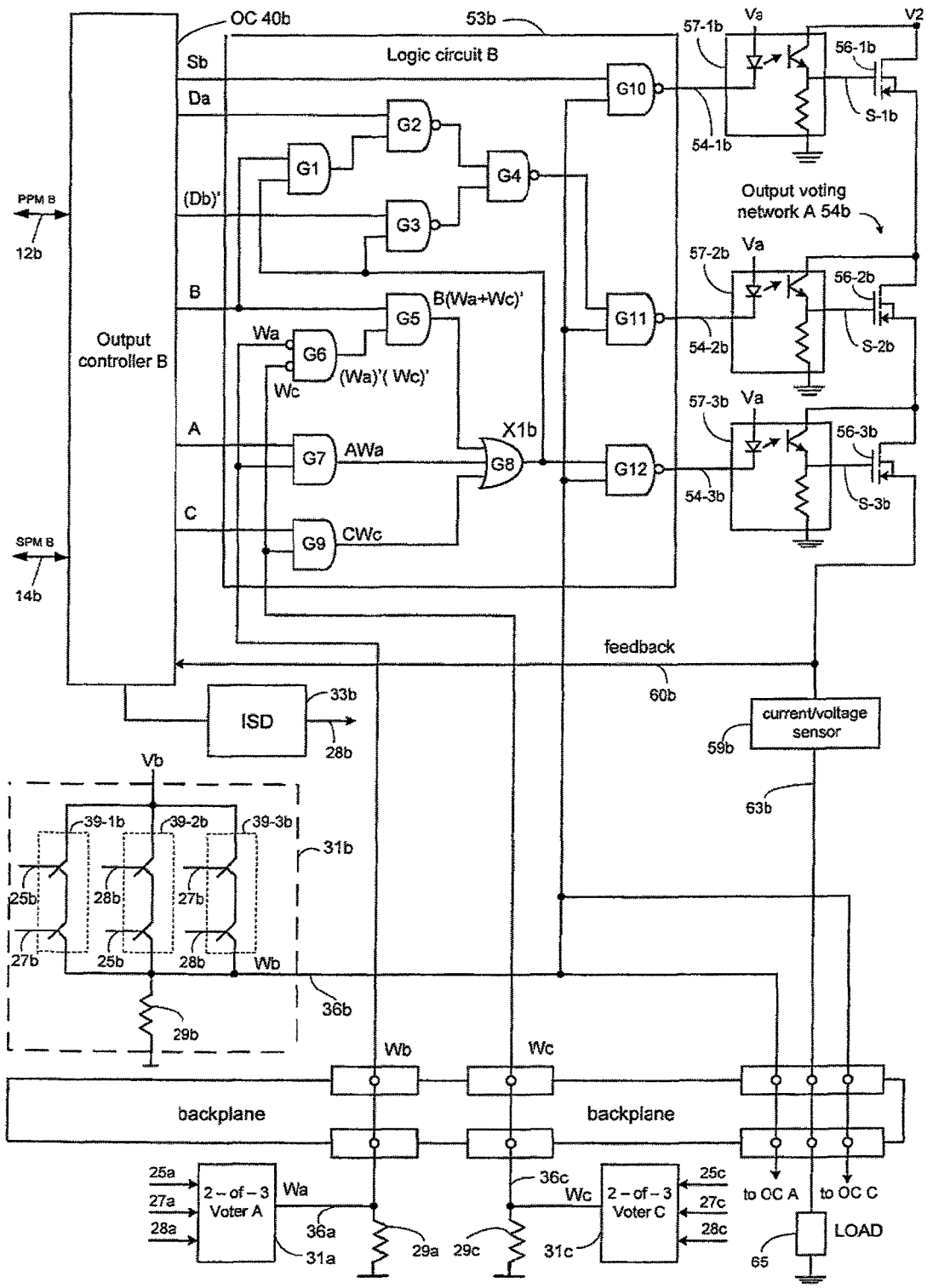
FIG. 3B is a schematic diagram of components of the output controller B of the embodiment of FIG. 1 in accordance with the concepts and disclosures presented herein.
Figure 3C:
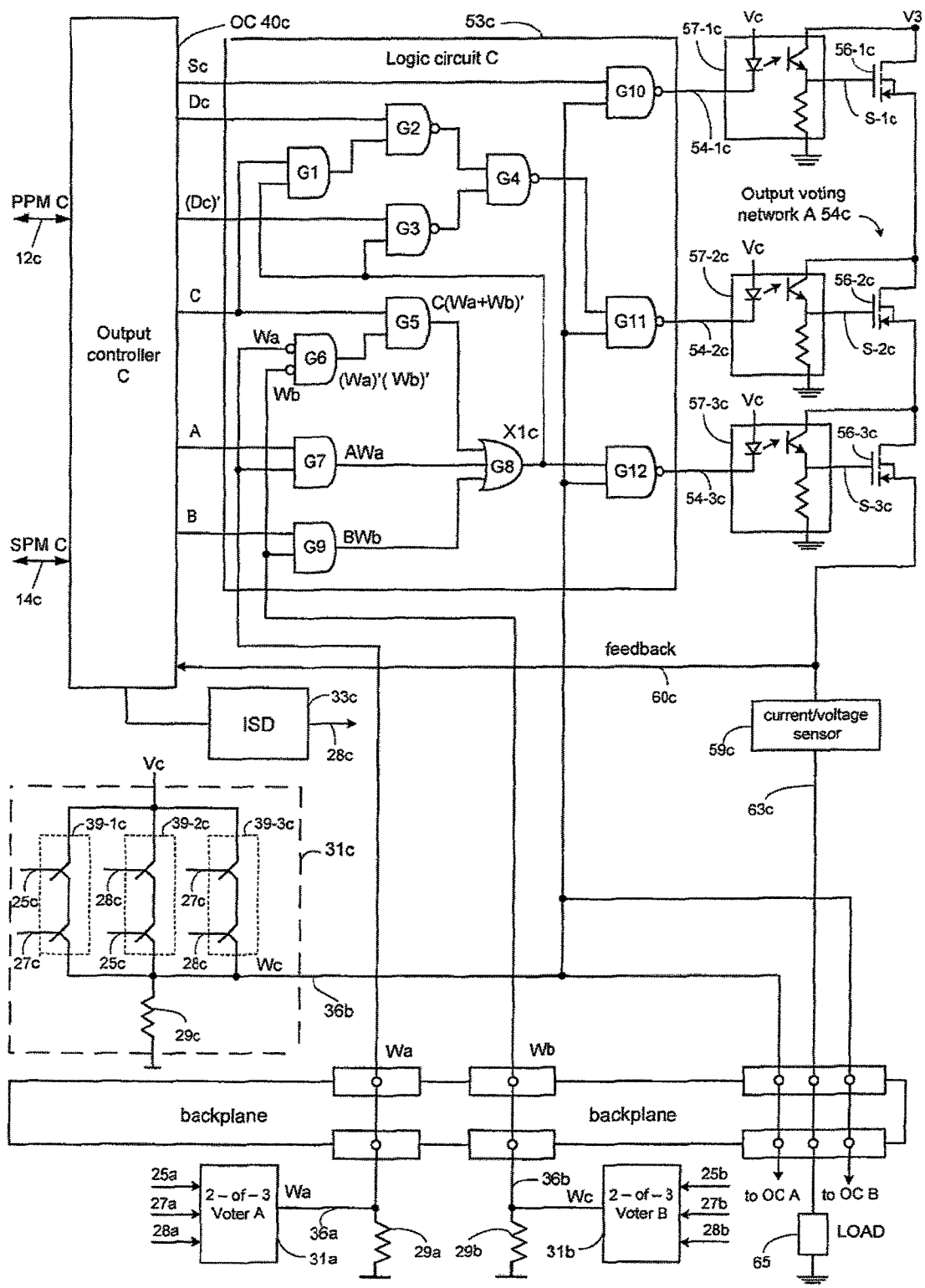
FIG. 3C is a schematic diagram of components of the output controller C of the embodiment of FIG. 1 in accordance with the concepts and disclosures presented herein.

FIGS. 3A-C present the details of how the components of the output module 44a-c operate. The TMR diagnostic include a 2-of-3 voter 31 that is coupled with an improper sequence detector (ISD) 33 and is coupled with an associated PPM and SPM in each channel. As previously discussed, the output controller A is in operative communication with the ISD 33a, which is in operative communication with the voter component 31a. In addition, the voter component 31a is in operative communication with each of the logic circuits A, B and C via line 36 (Wa). The voter component 31a includes a plurality of parallel voting groups 39-1a, 39-2a, and 39-3a, which are coupled between a voltage source A and a resistor 29a, which is connected to the ground node. Each group 39a includes two electronic switches, such as MOSFET switches, other transistors or relays that are connected in series. A first switch of group 39-1a and a second switch of group 39-2a are coupled to communication line 25a, which are controlled by the PPM A. A first switch of group 39-3a and a second switch of group 39-1a are coupled to line 27a, which are controlled by the SPM A. A first switch of group 39-2a and a second switch of group 39-3a are coupled to line 28a, which are controlled by the ISD 33a. The voter component A therefore receives three input signals from the PPM A, the SPM A, and the ISD A, and produces output signal 36a (Wa) as result of a majority of two-out-of-three voting among signals from PPM A, SPM A, and ISD 33a. The output 36a (Wa) of the voter component 31a is coupled to the logic circuit A and is coupled to logic circuits B and C. The voter component B and C are identical to voter component A, and as such, has a similar connection with PPM b-c, SPM b-c, and ISD 33b-c due to the symmetrical configuration of the system 10. As such, the voter 31a-c configuration provides 2-of-3 voting and enables the system 10 to operate in the presence of any single failure.

It should be appreciated, that the TMR diagnostic described above allows the system to operate with one working output controller 40 in the event that the other output controllers 40 of the other channel fail. Such operation of TMR diagnostic that has no single point of failure ensures that fault occurrences in the associated output controller are identified.

In addition, current/voltage sensors 59 are shown in FIGS. 3 A-C, which are used to verify a value of electrical current passing through the switches 56a-c, and are able to determine a value of a voltage across a load 66. In addition, a feedback line 60a allows a controller 40a to monitor the load 66 state and the condition of switches 56a. It should be appreciated that all connections described above with the respect to the output controller A, the logic circuit A, and the voting network A are similar and applicable for controllers B (FIG. 3B) and C (FIG. 3C) due to the symmetrical configuration of the system 10. Because of this, the output 36b (Wb) of the voter component 31b is coupled to the logic circuit B and is coupled to the logic circuits A and C. The output 36c (Wc) of the voter component 31c is coupled to the logic circuit C and is also coupled to the logic circuits A and B.

Logic circuit 53a (FIG. 3A) includes logic elements G1-G12, where the outputs of G10, G11, and G12 are inverted by the isolation drivers 57-1a, 57-2a, and 57-3a that are respectively coupled with power switches 56-1a, 56-2a, and 56-3a that are located on the voting network 54a. It should be appreciated that each isolation driver 57 may include an optoelectronic isolation driver; however, the isolation driver 57 may comprise any suitable device. It should also be appreciated that the switches 56-1a, 56-2a, and 56-3a may comprise MOSFET power transistors, as shown, or any other controllable switches.

The logic circuit 53a and the voting network 54a operate, as shown in FIG. 3A, whereby the identifier (') indicates that it is an inverse value. Accordingly, the output of logic gate G8 is given as:

$A\hat{\ }(Wb+Wc)'+B\hat{\ }Wb+C\hat{\ }Wc=X1a$, which is defined as $X1a$ for simplicity.

The expression $[(Wb)']'[(Wc)']=(Wb+Wc)'$ in X1a is coupled to inputs G1, G3, and G12. On the inputs of G1, occur signals A and X1a, whereby the output of G1 produces signal $A\hat{\ }X1a$. The output controller A (OC A) sets a logical signal Da='1' and sets its inverse signal (Da)'='0' on the first inputs of G2 and G3 respectively when there are no disparities between data output by PPM A and SPM A. The output controller A (OC A) sets a logical signal Da='0' and sets its inverse signal (Da)'='1' on the first inputs of G2 and G3, respectively, in the event that a disparity exists between the data output by PPM A and SPM A. Signal X1a occurs on the second inputs of G1 and G3, while signal $A\hat{\ }X1a$ occurs on the second input of G2. The output of G2 then produces signal $(A\hat{\ }X1a\hat{\ }Da)'$, while the output of G3 produces signal $[X1a\hat{\ }(Da)']'$. As a result, G4 produces a signal $[(A\hat{\ }X1a\hat{\ }Da)']'[X1a\hat{\ }(Da)']'=Y1a$, that is identified as Y1a for simplicity. The output of gate 4 is given by the logic expression:

$Y1a=\{[(A\hat{\ }X1a\hat{\ }Da)']'[(X1a\hat{\ }(Da)']'\}'=[(A\hat{\ }X1a)']'$ since $Da='1', (Da)'='0'$ in normal operation of the system 10.

Signals Wb and Wc are normally in a '1' state, and because of that (Wb+Wc)'='0', hence X1a=B+C, $Y1a=[A\hat{\ }(B+C)]'='1'$ for each controlled point under normal operation. Data Y1a on output G4 is inverted twice: first Y1a is inverted to '0' by gate G11 that provides a '0' input for the isolated driver 57-2a; and the output of driver 57-2a is secondly inverted to a '1' on input S-2a, which forces switch 56-2a to be in an ON state.

The output of G8 is equal to: $X1a=A\hat{\ }(Wb+Wc)'+B\hat{\ }Wb+C\hat{\ }Wc='0'+B+C=B+C$. In addition, signal X1a is coupled with one input of gate G12, another input of which is coupled with signal Wa. The gate 12 output signal is defined as $Y2a=(X1a\hat{\ }Wa)'$. When the system 10 in an energized state, signal X1a='1' and signal Wa='1'; whereupon gate 12 gives an output signal $(X1a\hat{\ }Wa)'='0'$. The isolation driver 57-3a, in turn, inverts signal '0' to provide a '1' signal on output S3-a, which is coupled with a control input of the MOSFET power switch 56-3a. The output of G8 is, thereby, inverted twice and it is transformed to signal S-3$a$='1' that forces switch 56-3$a$ to be in an ON state. As a result, MOSFET switches 56-3$a$ are also is placed into an ON state. In addition, the output controller 40$a$, during normal operation, sets signal Sa='1' and produces signal (Sa^Wa)'='0' on the output of the gate 10. The isolation driver 57-1$a$, in turn, inverts this signal '0' to set a '1' signal on the output S1-$a$, which is coupled with control input of a fault recovery valve (FRV) 56-1$a$, which, in turn, goes to an "ON" state during normal operation of the system 10. It should be appreciated, that the fault recovery gate A may also comprise a MOSFET power switch or any other suitable transistor. All power switches 56-1$a$, 56-2$a$, and 56-3$a$, therefore, will be in an "ON" state so that the output 63$a$ is normally energized. The FRVs A-C are used to disconnect the output 63$a$-$c$ from the system output 61 in the event of a fault occurrence in channels A-C.

Output 63$a$ for each controlled point is defined as a logical product that provides switches 56-1$a$, 56-2$a$, and 56-3 with the corresponding signals S-1$a$, S-2$a$, and S-3$a$, which, in turn, are controlled by the outputs 54-1$a$, 54-2$a$, and 54-3$a$ of the logic circuit 53$a$. Thus, output 63$a$ is equal to: [A^(B+C)]^(B+C)=A^(B+C).

If a majority of the dual redundant sensors issue one or more signals that go out of a safe range, the controlled process may be in dangerous condition. In that event, the PPM A 20 and SPM 22 in each channel A-C may produce output data A=B=C='0' for each affected point in the controlled process. The logic circuits 53$a$, for example, receive signal A='0' and receives signal X1$a$='0' from the PPM A 20$a$ via the corresponding output controller 40$a$. Logic circuit 53$a$ then provides signal Y1$a$='0' at the input of gate G11, which inverts signal Y1$a$ to '1' at output 54-2$a$. The isolated driver 57-2$a$, in turn, inverts signal '1' to '0' on the output S2-$a$, which drives the power MOSFET switch 56-2$a$ to an "OFF" state. Gate 12 then provides output signal (X1$a$^Wa)'='1', since signal X1$a$='0'. The isolation driver 57-3$a$, in turn, inverts input signal '0' to provide a '1' signal on the output S3-$a$, which is coupled with control input of the power MOSFET switches 56-3$a$. As a result, MOSFET 56-3$a$ goes to an "OFF" state. Similarly, MOSFET switches 56-2$b$ and 56-3$b$ are driven to an "OFF" state. When the power switches 56-1$a$, 56-2$a$, and 56-3$a$ are in an "OFF" state, the switches 56-1$b$, 56-2$b$, and 56-3$b$ and the power switches 56-1$c$, 56-2$c$, and 56-3$c$ are also placed in an "OFF" state as well; and the controlled process will be de-energized from the output 61 and the load 66. The system 10, therefore, brings the controlled process to a safe condition by such shutdown process.

It should be appreciated that all of the elements and their connections described above with the respect of the output controller A, logic circuit A, and voting network A are similar and applicable for use in controllers B in channel B (FIG. 3B) and controllers C in channel C (FIG. 3C) due to the symmetrical configuration of the system 10.

Continuing, the following expressions for outputs 63$b$ and 63$c$ are provided as: Output 63$b$=B^(A+C); and Output 63$c$=C^(A+B). The output 61 of system 10 is given as a logical sum of outputs 63$a$, 63$b$, and 63$c$ since they are coupled in parallel:

$$\text{Output } 61 = A^\wedge(B+C) + B^\wedge(A+C) + C^\wedge(A+B). \quad (1)$$

Continuing, the following expressions for outputs 63$b$ and 63$c$ are provided as: Output 63$b$=B^(A+C), and Output 63$c$=C^(A+B). The output 61 of the system 10 is given as a logical sum of outputs 63$a$, 63$b$ and 63$c$ since they are coupled in parallel: Output 61=A^(B+C)+B^(A ^C) C^(A+B). Thus, the system 10 performs 2-of-3 majority voting among data A, B and C during normal operation.

The impact of a possible fault occurrence in the output controllers 40, logic circuits 53, and the voting networks 54 is considered below. The expression (1) is transformed to logic expression (2) in which all signals are counted:

$$\begin{aligned}
\text{Output } 61 = \text{Output } A(63a) + \text{Output } B(63b) + \text{Output } C(63c) == \quad (2) \\
SaAWa[BWb + CWc + A(Wb + Wc)']Da + \\
SaWa[BWb + CWc + A(Wb + Wc)'](Da)' + \\
SbBWb[AWa + CWc + B(Wa + Wc)']Db + \\
SbWb[AWa + CWc + B(Wa + Wc)'](Db)' + \\
ScCWc[AWa + BWb + C(Wa + Wb)']Dc + \\
ScWc[AWa + BWb + C(Wa + Wb)'](Dc)'.
\end{aligned}$$

It is clear, that the expression (2) is transformed to expression (1) if Wa=Wb=Wc=1; Da='1', (Da)'='0'; Sa=Sb=Sc='1', which takes place in normal operation.

The following discussion presents the impact that the occurrence of faults in the logic circuit 53$a$ and in the output voting network 54$a$ have on the system. Furthermore, any possible faults and their affect to the operation of the system 10 may be obtained by using the expression (2). For example, when the output controller 40$a$ receives output data from the PPM A and the SPM A and a disparity exists between their data for some points, the output controller 40$a$ counts this data as undefined and sets a logical "Low" state for the output data A on the inputs of the neighboring output controllers 40$b$-$c$ for these points. The output controller 40$a$ also sets disparity signal Da to a '0' state and signal (Da)' to a '1' state for these points. As a result, expression (1) is provided as follows:

Output $A$=(B+C+'0')=B+C, since $A$='0';
Wa=Wb=Wc='1'; Sa='1'; Da='0'; and (Da)'='1';

Output $B$=B('0'+C+'0')=BC, since $A$='0';
Wa=Wb=Wc='1'; Sb='1'; Db='1'; and (Da)'='0';

Output $C$=C('0'+B+'0')=BC, since $A$='0';
Wa=Wb=Wc='1'; Sc='1'; Dc='1'; and (Dc)'='0'.

Thus, output 61 becomes equal (B+C)+BC+BC=B+C. In this example, output data of channel A for some controlled points are doubtful and they are substituted by the output data that channel A has received from neighboring channels B and C. The system, however, performs 2-of-2 voting for points with a disparity instead of 2-of-3 voting.

In the event that channel A and channel B have different output data, expression (2) is set forth as follows:

Output 63$a$=('0'+C+'0')=C, since $A$=$B$='0';
Wa=Wb=Wc='1'; Sa='1'; Da='0'; and (Da)'='1';

Output 63$b$=('0'+C+'0')=C, since $A$=$B$='0';
Wa=Wb=Wc='1'; Sb='1'; Db='0'; and (Db)'='1';

Output 63$c$=('0'+'0'+'0')=0, since $A$=$B$=$C$='0';
Wa=Wb=Wc='1'; Sc='1'; Dc='1'; and (Dc)'='0'.

Thus, the system output (SO) 61 becomes equal, such that SO=C+C=C. If channels A and B concurrently fail and the output data has a disparity for points that are safety-critical, this output data is substituted by the output data that channel A and channel B receive from channel C. Thus, for this data, the system 10 performs 1-of-1 voting, but continues to be operational in the presence of multiple faults. If three output controllers concurrently discover a disparity in the output data for some points, the system 10 initiates a shutdown of the process by de-energizing the system output 61 and passing the process to a safe state.

In the event that two logic circuits 53 in different channels fail in a way that the associated electronic switches 56 (e.g. transistors or relays) are in a permanently "OFF" state for some controlled points, outputs 63 of the associated channels are de-energized for these points, but the system 10 still remains operational by using the third healthy channel. If switches 56-2 and 56-3 in the associated channel fail being permanently in the "ON" state the dangerous failure of the system may occur. The output controller 40a-c in the associated channel activates signal Sa-c on the input of gate G10 of the associated logic circuit 53, which, in turn, sets the associated fault recovery switch 56-1 to be in an "OFF" state. Because of that outputs 63 of the associated channel is de-energized to avoid this dangerous situation. The system 10, however, remains operational by means of the two healthy channels. In the event that two logic circuits 53 concurrently fail holding the two associated switches 56-2 and 56-3 in an "ON" state or in an "OFF" state permanently, the system also remains operational. Consequently, the system 10 remains operational by means of the single healthy channel in the presence of multiple faults in two neighboring channels. In addition, the system performs a shutdown process that passes the process into a safety condition if all channels A-C concurrently fail.

In some embodiments, the system utilizes three identical power supplies for providing power to channels A-C. Each power supply includes the necessary components to detect the occurrence of faults within the power supply itself and for preventing fault penetration to the power supplies of the other channels A-C. This allows the system 10 to continue to be operational if at least one power supply out of the three remains healthy. Thus, the system 10 disclosed herein is capable of operating in the presence of up to two transient or permanent faults in any combination of the system's components.

Moreover, the system 10 uses diverse redundancy as a protection against a common cause failure. Each PPM uses same hardware and same software, which are different with hardware and software that each SPM uses. This allows the system 10 to eliminate a common cause failure that is the result of software design errors or hardware faults. An alternative approach for decreasing the probability of common cause failures is to use a functional block diagram (FBD) language for developing the same application program for each the associated PPM and SPM. The application program may be divided into segments, with each segment being executed within one scan period, and with the segments being executed in the order that is defined by a user's algorithm. This approach allows the system to use the same software and hardware for the primary and secondary processor modules, and significantly decreases the probability of a common failure. Furthermore, utilizing this approach in channel A-C provides the system 10 with the ability to replace faulty primary or faulty secondary processor modules with a new processor module. The healthy processor module can then reprogram the new processor module since both the processor modules have the same software and hardware.

The system 10 is configured to use a comparison diagnostic that is combined with voting techniques that allow the system to remain operational upon the occurrence of multiple faults within the primary and secondary processor modules. In addition, the system 10 is able to be operational on the occurrence of up to two faults within the I/O modules and may operate properly upon the occurrence of some type of three faults. The system 10 is also able to detect a possible disparity in output data, and continues to remain operational upon the occurrence of two faults caused by the disparity. This system includes a very effective fault diagnostic that has no single point of failure and allows the system to operate properly upon the occurrence of up to two faults and upon the occurrence of some types of three faults. The system 10 also provides diverse redundancy that significantly reduces the probability of common cause failures. In addition, the system 10 also utilizes I/O (input/output) circuits with a reduced number of internal elements, thereby allowing lower system cost to be achieved. The architecture of the system 10 allows it to be manufactured to produce different m-out-of-n redundant computer systems by reprogramming only a few elements, such as the logic circuit for example, if it is implemented as a single-chip, such as a field programmable gate array (FPGA) or an application specific integrated circuit (ASIC) for example. The m-out-of-n systems, such as those disclosed herein include only a different number of the same elements.

Figure 4:
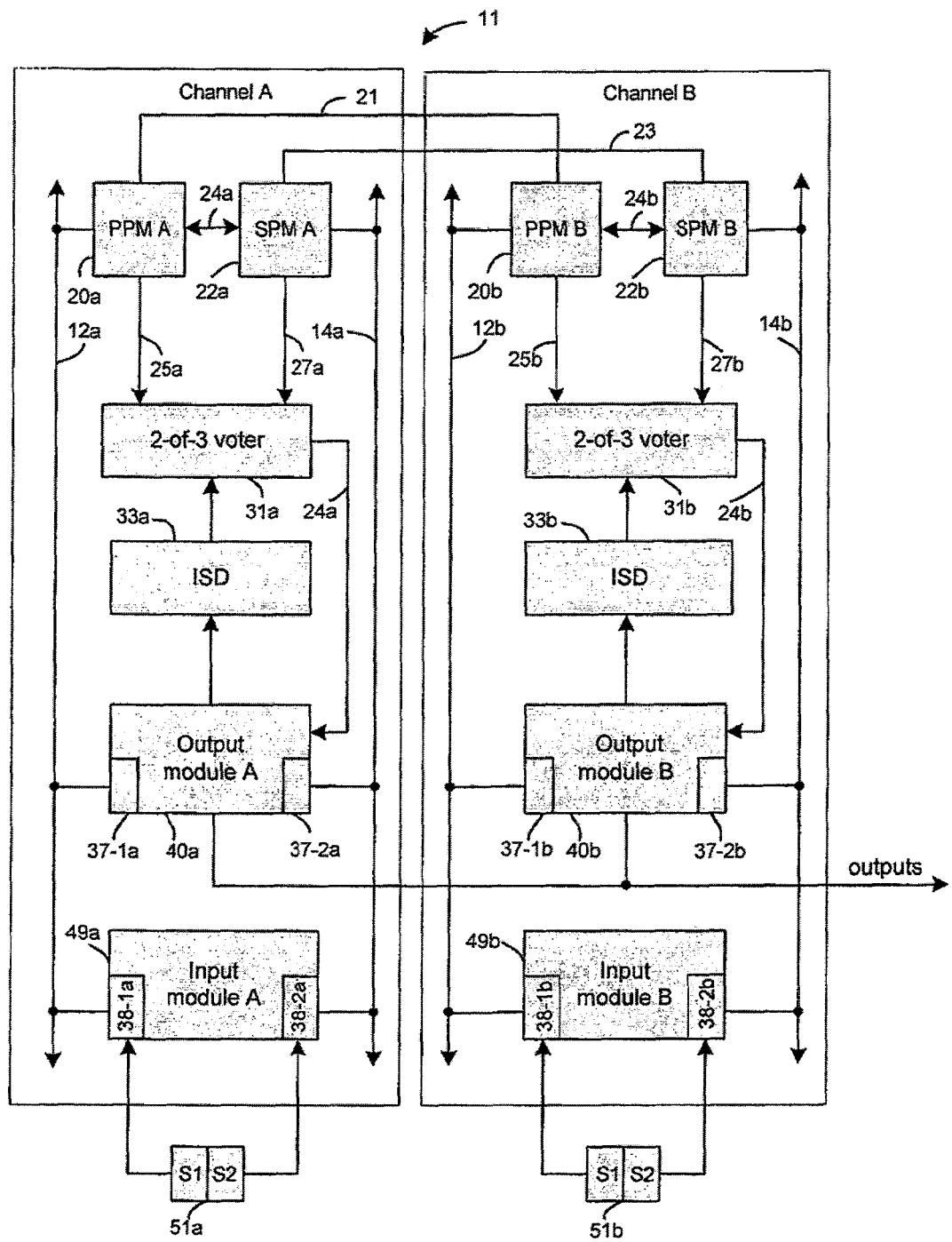
FIG. 4 is a block diagram of another embodiment of the dual redundant computer system having channels A-B in accordance with the concepts and disclosures presented herein.
Figure 5:
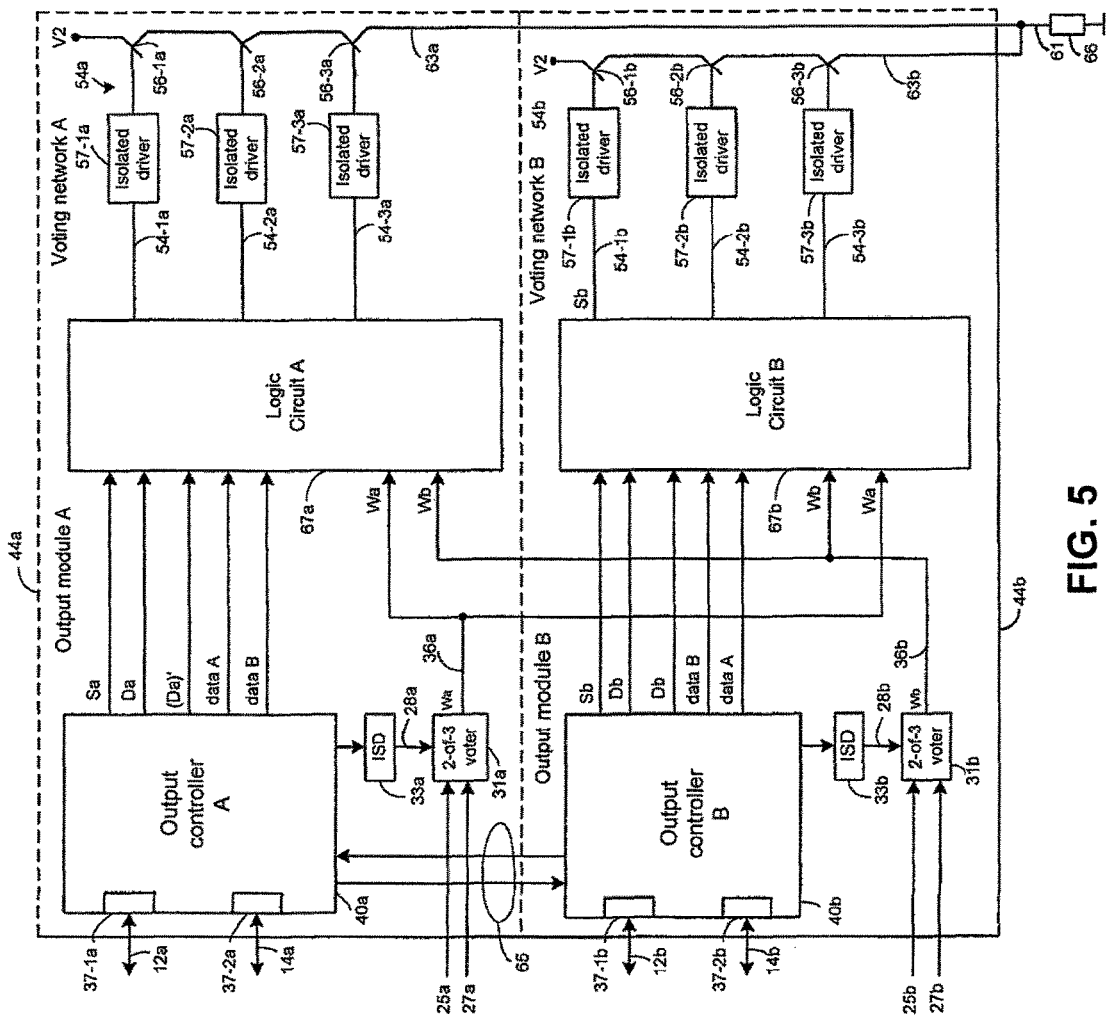
FIG. 5 is a schematic diagram of two output modules of the embodiments of FIG. 4 in accordance with the concepts and disclosures presented herein.

In another embodiment, as shown in FIGS. 4 and 5, a dual duplicated system (DDS), is referred to by numeral 11, which includes two channels that are similar to the channels in the URS (ultra-reliable computing system) system 10 described above. The DDS system 11 operates similarly as the URS system 10 discussed above, with the DDS system 11 having the same elements that the URS system 10 utilizes, but with the number of elements being 1.5 times less than in the URS system. Thus, the DDS system 11 is substantially less expensive in comparison with the URS system 10. As such, channel A and channel B of the DDS system 11 are equivalent to respective channel A and channel B of the URS system 10. As such, each channel A and B of the DDS system 11 includes respective output modules A and B, as shown in FIG. 4, which are structurally equivalent to the output modules A and B shown in FIG. 2 of the URS system 10. Each of the output modules A and B include the TMR diagnostic system that includes a 2-of-3 voter component 31 and the improper sequence detector component 33. The DDS A includes logic circuit 67 that is substantially similar to the logic circuit 53 described above.

The output modules A and B of the DDS system 11 are structurally equivalent to the output modules A and B of the URS system 10, such that the DDS system 11 in the channel A includes the primary processor module 20a (PPM A) and the secondary processor module 22a (SPM A). In addition, channel A includes the output controller 40a, the logic circuit 67a, and the voter network 54a. Channel B includes the primary processor module 20b (PPM B) and the secondary processor module 22b (SPM B). Additionally, channel B includes the output controller 40b, the logic circuit 67b, and the voter network 54b. Channel A includes a primary processor module 20a (PPM A) and a secondary processor module 22a (SPM A), which operatively communicate with each other via a communication bus 24a. The interfaces 37-1a and 37-2a of output module A 44a and the interfaces 38-a and 38-2a of input module A 49a are in operative communication with the PPM 20*a* and SPM B 22*a* via an input/output (I/O) bus 12*a* and 14*a* respectively. The interfaces 37-1*b* and 37-2*b* of the output module 44*b* and the interfaces 38-1*b* and 38-2*b* of the input modules A 49*b* are in operative communication with the PPM 20*b* and SPM B 22*b* via an input/output (I/O) bus 12*b* and 14*b* respectively.

It should be appreciated that the input and output (I/O) circuits can be digital or analog, however, with regard to the discussion herein, digital I/O modules are utilized. Furthermore, input module 49*a-b* operatively communicates with dual redundant sensors 51*a-b* for receiving process information. Each sensor 51*a* may be integrated into a single hardware package, whereupon a first and a second section of dual redundant sensors (DRS) 51*a* are utilized to conduct the same measurement for each controlled point. For example, the PPM A receives input data that is produced by the first section through bus 12*a*, while the SPM A receives input data that is produced by the second section through bus 14*a*. A possible deviation can occur between the values of the input data that is produced by the first and second sections of the DRS.

In some embodiments, the system 11 performs safety and control functions on a cyclical basis, whereby an operation cycle period is defined by a scan time, which includes the time required for input data polling, application program execution, and the time required for the transfer of output data to the output module. In addition, application program execution and input data polling are overlapped.

The PPMs A-B send the output data as result of the application program execution to the associated output controller 40, as shown in FIG. 5. The output controller 40 in each channel compares the output data that it has received from the associated PPM and SPM, and uses the output data that is produced by the PPM in the event that the associated SPM fails permanently. Similarly, the output controller 40 uses the output data that is produced by the associated SPM if the associated PPM fails. The output controller 40 uses the output data that is received from the associated PPM by default, if both PPM and SPM are healthy and do not have a disparity, that can occur because of the possible unacceptable deviation between the values of input data that are produced by the first and second sections of the DRS. In the event that the associated PPM and SPM are healthy, but the output controller 40 discovers a disparity between the output data that produced by the PPM and SPM for a particular controlled point, it may be due to the occurrence of unacceptable deviations or due to one or more transient faults. The output data with a disparity is counted as "doubtful", and because of that, the output controller 40 activates a disparity signal D indicating that the system 11 is not utilizing this doubtful data. The output controller (OC) 40 then sends zero output data to the neighboring output controller, and receives output data from neighboring output controller through the bus 65 to substitute the doubtful output data. The output controllers in all channels operate similarly due to the symmetrical configuration of the components provided by the system 11.

FIG. 5 presents the operational components of the output modules A and B (44*a-b*). As such, the output module A includes the output controller A, the logic circuit A, and the voting network A; output module B includes: the output controller B, the logic circuit B, and the voting network B.

The output controller 40*a* receives the output data produced by the PPM A and SPM A via interfaces 37-1*a* and 37-2*a* respectively; the output controller 40*b* receives the output data produced by the PPM B and SPM B via interfaces 37-1*b* and 37-2*b* respectively. In addition, the output controller A is able to operatively communicate with the output controller B via the communication bus 65. In some embodiments, the communication bus comprises a read-only bus. As such, the communication bus 65 enables each of the output controller 40*a-b* to communicate with one or more of the other output controllers, such as by sending and/or receiving output data. The isolation driver 57 is used to provide isolation of a logic section of the system 11 from its power section. It should be appreciated that the isolation driver 57 may comprise an optoelectronic isolation driver; however, any isolation driver 57 may comprise any suitable device.

Each output controller 40 includes a windowed timer that verifies that the associated PPM and SPM delivers output data to the output controller on time. If, for example, the PPM A or SPM A fails to deliver the output data on time, the output controller 40*a* indicates a failure occurrence in one or the PPM A/SPM A or in both of them. The output controller 40 in each channel compares the output data that it has received from the associated PPM and SPM, and uses the output data that is produced by the PPM in the event that the associated SPM fails permanently. Similarly, the output controller 40 uses the output data that is produced by the associated SPM if the associated PPM fails. The output controller 40 by default uses the output data that is received from the PPM if the output data of the associated PPM and SPM do not have a disparity. In the event that an associated PPM and SPM are healthy, but the output controller 40 discovers a disparity between output data produced by the associated PPM and SPM for some controlled points, it may be due to unacceptable deviation or due to occurrence of transient faults. The output data with disparity is counted as "doubtful" and is not used in the channel with the disparity. Accordingly, the output controller 40 activates disparity signal D so that the system 11 does not use these doubtful data. In addition, the output controller 40 then sends a zero output data to the neighboring output controller, and receives output data from the neighboring output controller through bus 65. The output data received from neighboring output controller is then used for substituting the doubtful output data.

Continuing, the output controller A operatively sends single-bit data A to the logic circuit A (67*a*) and issues disparity signal Da, inverted signal (Da)', and signal Sa, and on the corresponding inputs of this logic circuit. Output data are identified as A1 and A2, which the output controller 40*a* receives from PPM A and SPM A respectively. The output controller 40*a* calculates disparity signal D for each controlled point using the following equation: D={XNOR with A1, A2}, where Da is equal to 1 ' if there is no disparity between data A1 and data A2. If a disparity exists between data A1 and data A2, then the output controller 40 sets inverse signal (Da)' equal to '0'. A truth table is shown in Table 3 below.

TABLE 3

| A1 | A2 | XNOR | Da | Da' |
|----|----|------|----|-----|
| 0  | 0  | 1    | 1  | 0   |
| 1  | 1  | 1    | 1  | 0   |
| 1  | 0  | 0    | 0  | 1   |
| 0  | 1  | 0    | 0  | 1   |

As shown in Table 4 below, disparity signal Da are set to a logical '1' state for points 0, 1, 2, and 3 for which PPM A and SPM A output data are equal and setting signal Da to a logical '0' state for 4, 5, 6, and 7 points.

TABLE 4

| points | PPM A data | SPM A data | Da signal | (Da)' signal |
|---|---|---|---|---|
| 0 | 1 | 1 | 1 | 0 |
| 1 | 0 | 0 | 1 | 0 |
| 2 | 1 | 1 | 1 | 0 |
| 3 | 0 | 0 | 1 | 0 |
| 4 | 1 | 0 | 0 | 1 |
| 5 | 0 | 1 | 0 | 1 |
| 6 | 1 | 0 | 0 | 1 |
| 7 | 0 | 1 | 0 | 1 |

The comparison diagnostic that is described above is able to recover from many permanent and transient faults that may occur in each channel. In addition, the output controller uses any suitable technique, such as SEC-DED, which allows for the correction of any transient fault, and to indicate the occurrence of two faults in the PPM and SPM during their communication with the output controller through the associated buses 12 and 14.

Figure 6A:
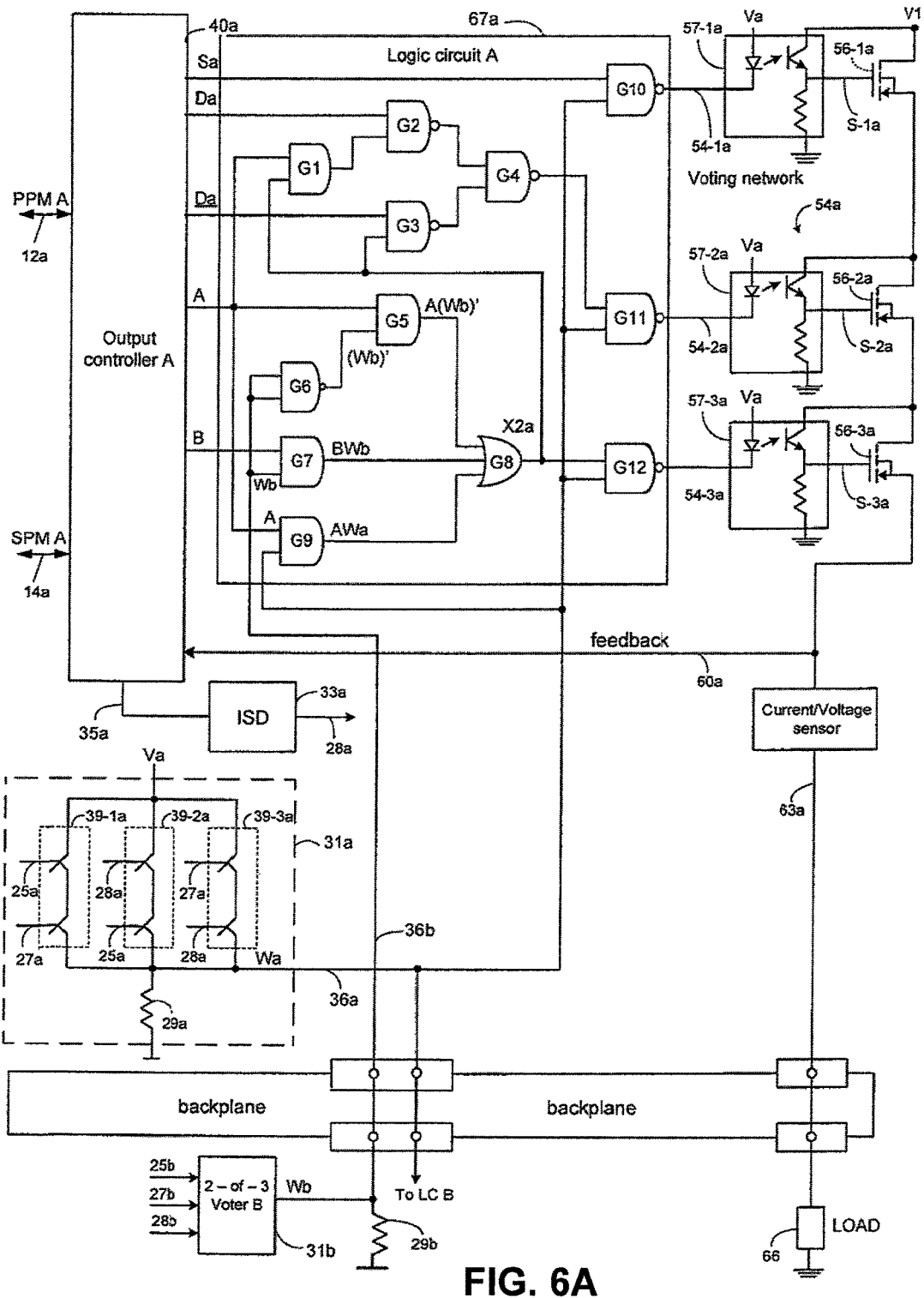
FIG. 6A is a schematic diagram of the components of the channel A of the dual-doubled redundant computer system in accordance with the concepts and disclosures presented herein.

The TMR diagnostic includes a 2-of-3 voter component 31 that is coupled with an improper sequence detector (ISD) 33 and is coupled with an associated PPM A and SPM in each channel. Output 35a of the output controller A, as shown in FIG. 6A, connected with input of the improper sequence detector (ISD) 33a. The ISD 33a monitors both time-based programs and logical programs that the output controller 40a executes. In the event that the ISD 33a discovers that the output controller 40a has failed, the ISD 33a activates an output signal 28a.

Figure 6B:
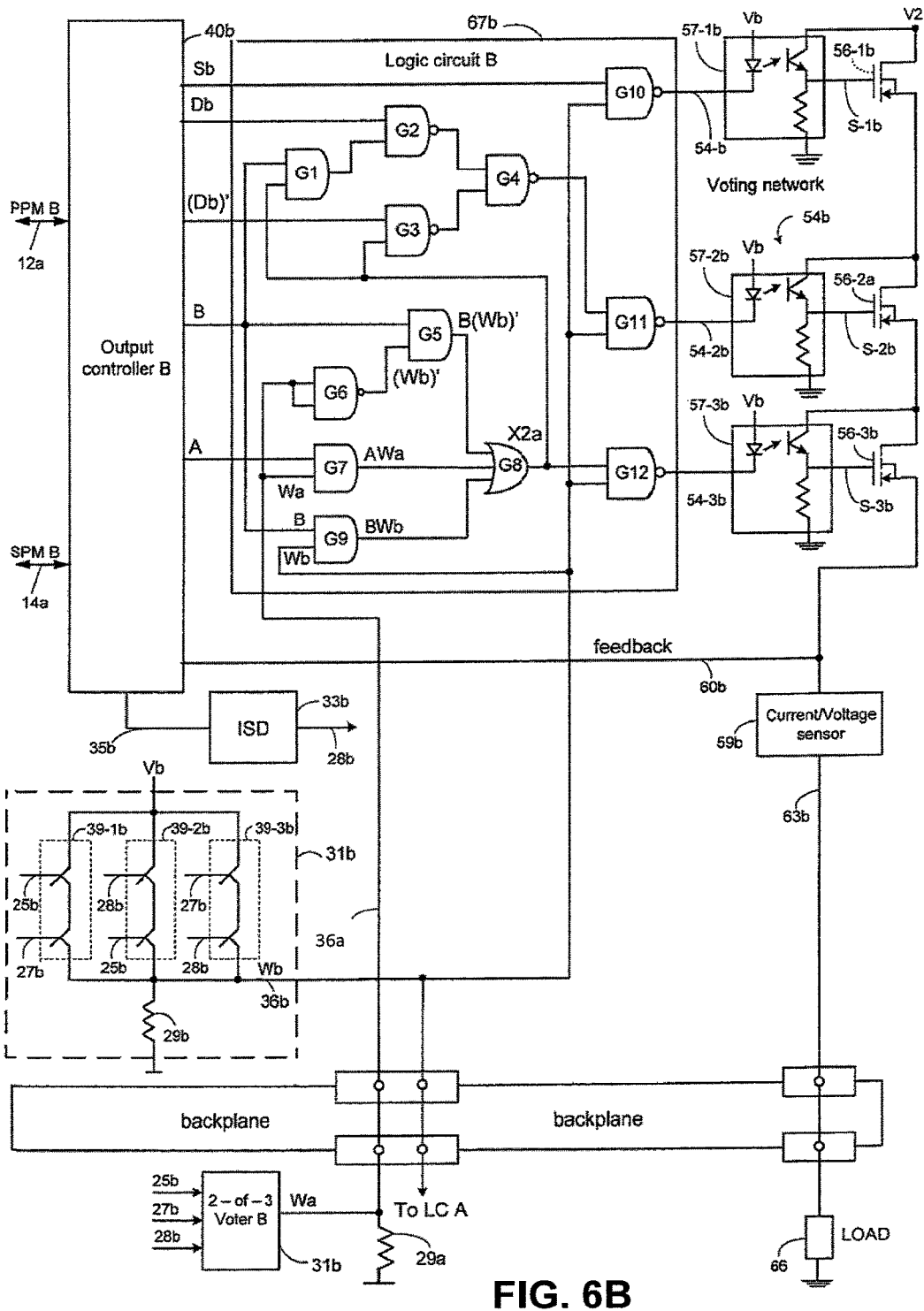
FIG. 6B is a schematic diagram of the components of channel B of dual-doubled redundant computer system in accordance with the concepts and disclosures presented herein.

The PPM A uses line 25a to activate an alarm signal when a failure in the output controller 40a is discovered during communication between PPM A and the output module 40a. Similarly, the SPM A uses line 27a for activating an alarm signal when a failure in the output controller 40a is discovered during communication between SPM A and the output controller 40a. The voter component 31a then produces output signal 36a, as result of two-out-of-three (2-out-of-3) voting among the alarm signals that are produced by the PPM A, the SPM A, and the ISD 33a. Output signal 36a is also used to disconnect the output 63a from the output 61 of the system 11 in the event of a fault occurrence in the output controller 40a. Similarly, output signal 36b is used to disconnect the output 63b from the output 61 of the system 11 in the event of a fault occurrence in the output controller 40b. The performance of this diagnostic in each channel allows the system 11 to discover one or more possible failures in the output controller 40, since the voter component has no single point of failure, as will be discussed in detail below. In addition, the voter component 31a is in operative communication with each of the logic circuits A and B via communication line Wa. The voter component 31a, which may be a 2-of-3 voter component includes a plurality of parallel voting groups 39-1a, 39-2a, and 39-3a, which are coupled between a voltage source A and a resistor 29a, which is connected to a ground node as shown in FIG. 6a. Each group 39a includes two electronic switches, such as transistors or relays for example, which are connected in series. A first switch of group 39-1a and a second switch of group 39-2a are coupled to line 25a, that are controlled by PPM A. A first switch of group 39-3a and a second switch of group 39-1a are coupled to line 27a, that are controlled by SPM A. A first switch of group 39-2a and a second switch of group 39-3a are coupled to line 28a, which are controlled by ISD 33a. The voter component A, therefore, receives three input signals from PPM A, SPM A, and ISD A, and produces output signal 36a (Wa) as result of a majority of two-out-of-three voting among signals from PPM A, SPM A, and ISD 33a. Output signal 36 is used to disconnect the associated output 63 from output 61 of system 11 in the event of a fault occurrence in output controller 40. The voter component B, as shown in FIG. 6B, is identical to voter component A, and has a similar connection to PPM B, SPM B, and ISD 33b due to the symmetrical configuration of the system 11. PPM A-B, SPM A-B, and ISD A-B sets signals on the associated communication lines 25a-c, 27a-c, and 28a-c to be deactivated during normal operation of the system 11, by holding each signal in a logical '1' state. It should also be appreciated, that the TMR diagnostic described above allows the system to operate with one working output controller 40 in the event that the other output controllers 40 of the other channel fail. Such operation of TMR diagnostic that has no single point of failure ensures that fault occurrences in the associated output controller are identified.

Continuing, the logic circuit A (67a) is in operative communication with the voting network 54a via communication lines 54-1a, 54-2a, and 54-3a. The communication lines 54-1a, 54-2a, and 54-3a are coupled with isolation drivers 57-1a, 57-2a and 57-3a respectively, which are in operative communication with switches 56-1a, 56-2a, and 56-3a that connected in series between the associated power supply V2 and output 63a, which, in turn, are coupled with load 66 of the system 11. Outputs 63a-b and associated switches 56a-b are connected in parallel to each other and are coupled to the load 66 and the output 61 because of symmetrical configuration of the system 11. This configuration allows the system 11 to perform two-out-of-two (2-of-2) voting among output data A, and B. Furthermore, if two PPM or two SPM are failing concurrently, the system 11 continues perform 2-of-2 voting since each channel still produces two sets of output data that are generated either by two PPM-s or by two SPM-s. The system 11, therefore, continues to be operational in the presence of up two faults occurring in the PPM A-B or in the SPM A-B. An alternative method may be for the PPM A-B and SPM A-B to use three-out-of-four voting among data A1, A2, and data B1, B2 in channels A and B respectively instead of using 2-of-2 voting in the OC A and in OC B.

If the system operates with the use of analog modules, then an analog module in each channel utilizes the output controller that is coupled with a digital-to-analog converter (DAC). The outputs of the DAC in each channel are coupled with the conventional current summing circuit (CSC), which provides output 61 of the system 10 as a mid-value among the output currents that are produced by the first and second channels of the system 11. The current summing circuit is able to keep the same value of output current in the event that one channel fails. (Analog output modules are not shown in FIG. 5 for the sake of simplicity). The Triple Redundant (TMR) diagnostic used in the digital and in the analog module includes a 2-of-3 voter 31 that is coupled with an improper sequence detector (ISD) 33 and is coupled with an associated PPM and SPM in each channel.

Continuing, current/voltage sensors 59 are shown in FIGS. 6A-B, which are used in each channel is used to verify a value of electrical current passing through the switches 56a-b. The current/voltage sensor 59a for example, may also be able to check a value of the voltage across a load 66. In addition, a feedback line 60a provides a controller 40a to monitor the load 66 state and the condition of the switches 56a.

Next, the logic circuit 67*a* of FIG. 6A, which is slightly different with the logic circuit shown in FIG. 3A of the system 10 is set forth. Specifically, the logic circuit 67*a* has logic elements G1-G12, with outputs G10, G11, and G12 that are inverted by isolation drivers 57-1*a*, 57-2*a*, and 57-3*a* that are respectively coupled with power switches 56-1*a*, 56-2*a*, and 56-3*a* located on the voting network 54*a*. It should be appreciated that the isolation driver 57 may comprise an optoelectronic isolation driver, however, the isolation driver 57 may comprise any suitable device. It should also be appreciated that the switches 56-1*a*, 56-2*a*, and 56-3*a* may comprise MOSFET power transistors for example, as shown, or any other controllable switches.

It is next considered the logic circuit 67*a* and the voting network 54*a* operation in FIG. 6A. It should be appreciated that the identifier (') used herein identifies that a value is an inverse value. The output of gate G8 is given as: A^Wa+B^Wb+A^(Wb)'=X2*a*, that we defined X2*a* for simplicity. Output X2*a* is coupled to inputs G1, G3, and G12. On the input of G1, occurs signals A and X2*a*, while the output of G1 produces signal A^X2*a*.

The output controller A (OC A) sets logical signal Da='1' and sets its inverse signal (Da)'='0' on the first inputs of G2 and G3 respectively when there is no disparity between PPM A and SPM A data, which are delivered to the output controller A (OC A). The OC A sets the logical signal Da='0' and sets its inverse signal (Da)'='1' on the first inputs of G2 and G3 respectively in the event that a disparity between PPM A and SPM A data is discovered. Signal X2*a* occurs on the second input of G3, and signal A^X2*a* occurs on the second input of G2. The output of G2 then produces signal (A^X2*a*^Da)', while the output of G3 produces signal [X2*a*^(Da)']'. During normal operation, signal A and signal X2*a* may each be in a logical '1' or logical '0' state for each controlled point. The output of G4, is given by logic expression as:

$$Y2a=\{[(A^\wedge X2a^\wedge Da)']^\wedge [(X2a^\wedge (Da)')']\}'=(A^\wedge X2a)' \text{ if } Da='1', (Da)'='0' \text{ in normal operation of the system 11.}$$

Signals Wa and Wb are normally in '1' state, consequently $$X2a=A^\wedge Wa+B^\wedge Wb+A^\wedge (Wb)'=A+B \text{ since } (Wb)'='0'.$$

As such, Y2*a*=A^(A+B) for each controlled point under normal operation, if it is assumed that the system 11 is normally energized, then Y2*a*='1'. Y2*a* on output G4 is inverted twice: first Y2*a* is inverted to '0' by gate G11 that provides '0' input for the isolated driver 57-2*a*; and second, the output of driver 57-2*a* is inverted to '1' on input S-2*a*, which forces switch 56-2*a* to be in ON state.

Signal X2*a* is coupled with one input of gate G12, with another input of which being coupled with signal 36*a* (Wa). Gate 12 output signal is defined as Y2*a*=(X2*a*^Wa)'=A+B. When system 11 in an energized state, signal X2*a*='1' and signal Wa='1'. Gate 12 then gives an output signal (X2*a*^Wa)'='0'. The isolation driver 57-3*a*, in turn, inverts signal '0' to provide a '1' signal on output S3-*a*, which is coupled with the control input of power MOSFET 56-3*a*. As a result, MOSFET 56-3*a* also comes to an ON state. The output of G8 is also inverted twice and it transformed to signal S-3*a*='1' that forces switch 56-3*a* to be in an ON state. In addition, the output controller 40*a* during normal operation sets signal Sa='1' that produces signal (Sa^Wa)'='0' on the output of gate 10. The isolation driver 57-1*a* in turn inverts this signal '0' for setting '1' signal on output S1-*a*, which is coupled with the control input of a fault recovery valve (FRV) 56-1*a*, which in turn goes to "ON" state in normal operation of the system 11. It should be appreciated, that the fault recovery gate or valve A may also comprise a MOSFET power switch. All power switches 56-1*a*, 56-2*a*, and 56-3*a*, therefore, will be in an "ON" state allowing the output 63*a* to be in a normally energized. The output 63*a* for each controlled point is defined as a logical product that provides 56-1*a*, 56-2*a*, and 56-3 switches in accordance with corresponding signals S-1*a*, S-2*a*, and S-3*a* that in turn are controlled by the outputs 54-1*a*, 54-2*a*, and 54-3*a* of the logic circuit 67*a*. Output 63*a* is equal to: [A^(A+B)]^(B+A)=A^(A+B). FRVs A-B are used to disconnect the output 63*a-c* from the system output 61 in the event of fault occurrence in channels A-B.

If a majority of sections of the DRS issue data that indicate that the controlled process is going out of a safe range, the controlled process may be in a dangerous condition. In that event, the PPM A 20 and SPM 22 in each channel usually produce output data A=B='0' for each affected point in the controlled process. The logic circuits 67*a*, for example, receives signal A='0' and receives signal X2*a*='0' from the PPM A 20*a* via the corresponding output controller 40*a*. Logic circuit 67*a* then gives signal Y2*a*='0' at the input of gate G11 that inverts signal Y2*a* to '1' at output 54-2*a*. The isolated driver 57-2*a*, in turn, inverts signal '1' to '0' on output S2-*a*, which drives power MOSFET switch 56-2*a* to an "OFF" state. Gate 12 then gives output signal (X2*a*^Wa)'='1', since signal X2*a*='0'. The isolation driver 57-3*a* in turn inverts input signal '0' to provide '1' signal on output S3-*a*, which is coupled with the control input of the power MOSFET 56-3*a*. As a result, MOSFET 56-3*a* goes to an "OFF" state. Similarly, MOSFET switches 56-2*b* and 56-3*b* are driven to an "OFF" state. When power switches 56-1*a*, 56-2*a*, and 56-3*a* are in an "OFF" state, then switches 56-1*b*, 56-2*b*, and 56-3*b* and switches 56-1*c*, 56-2*c*, and 56-3*c* will also be in an "OFF" state as well, and the controlled process will be de-energized. The system 11 may bring the process to a safe condition if the majority of data A and B for a given controlled point is in a '0' state.

It should be appreciated that all elements and their connections described above with the respect of the output controller A, the logic circuit A, and the voting network A are similar, and are applicable for use in the components of channel B (FIG. 3B) due to the symmetrical configuration of the system 11. As such, the following expressions for outputs 63*a* and 63*b* are provided:

$$\text{Output } 63a=A^\wedge (A+B);$$

$$\text{Output } 63b=B^\wedge (B+A).$$

System 11 output 61 is given as the logical sum of outputs 63*a* and 63*b* since they are coupled in parallel:

$$\text{Output } 61=A^\wedge (A+B)+B^\wedge (B+A)=A+B. \quad (3)$$

Thus, the system 11 performs two-out-of-two (2-of-2) majority voting among data A and data B in normal operation.

The following discussion considers the occurrence of possible permanent failures in the PPMs A-B or in the SPMs A-B in various channels A-B. In particular, each output controller has a windowed timer that verifies if the associated PPM and SPM delivered output data over buses 12 and 14 on time. If, for example, the PPM A or SPM A fails to deliver the output data on time, the output controller 40*a* indicates a failure occurrence in PPM A/SPM A or in both of them. In the event that up to two PPMs or up to two SPMs concurrently fail, the system 11 continues to be operational with a healthy PPM 20 or with a healthy SPM 22 in each channel A-B. The system 11, therefore, still performs 2-of-2 voting even through up to two PPMs 20 or up to two SPMs 22 fail concurrently, since each channel provides output data that is produced by the PPM or by the SPM. The system 11, therefore, provides a high level of fault tolerance with respect to permanent faults that occur in the PPM or SPM.

It is now considered that outputs 63a, 63b, and 63c, and taking A and B data and all signals that: Wa, Wb; Da, (Db)'; and Sa, Sb. Output 63a for each controlled point is defined as a logical product that provides 56-1a, 56-2a, and 56-3 switches in accordance with corresponding signals S-1a, S-2a, and S-3a that, in turn, are controlled by the outputs 54-1a, 54-2a, and 54-3a of the logic circuit 67a. The following logical expression for output 63a and 63b includes all signals in account is transformed to:

$$\text{Output } 63a = (S\text{-}1a)(S\text{-}2a) = SaAWa[Awa + BWb + A(Wb)'] \quad (3)$$
$$Da + +SaWa[AWa + BWb + A(Wb)'](Da)'$$
$$\text{Output } 63b = (S\text{-}1b)(S\text{-}2b) = SbBWb[BWb + Awa + B(Wa)']$$
$$Db + +SaWa[BWb + AWa + B(Wa)'](Db)'$$

Outputs 63a and 63b are connected in parallel and they are coupled to output 61 of the system 11. Output 61 on load 66 is given then as a logical sum:

$$\text{Output } 61 = \text{Output } A(63a) + \text{Output } B(63b) == \quad (4)$$
$$SaAWa[Awa + BWb + A(Wb)']Da + SaWa[AWa + BWb + A(Wb')]$$
$$(Da)' + +SbBWb[BWb + Awa + B(Wa)']Db +$$
$$SbWb[BWb + AWa + B(Wa)'](Db)'$$

As such, in expression (4) channel A produces the data $A\hat{}(A+B)$, channel B produces the data $B\hat{}(B+A)$, and system 11 gives the output 61 that is equal to:

Output $61 = A\hat{}(A+B)+B\hat{}(B+A)=A+B$, since $Wa=Wb=Sa=Sb='1'$ in normal system 11 operation.

Da='1', (Da)'=0 if no disparity is found in data A and B; Da='0', (Da)'='1' when disparity in data A and B exists. The system 11 thereby provides an enhanced 2-out-of-2D shutdown logic operation.

Next, the operation of the system 11 is considered when a disparity of the output data exists within the output controller 40a. In the event that the output controller 40a receives output data from the PPM A and the SPM A where a disparity exists, the output controller 40a counts this data as undefined, and sets a logical "Low" state for the output data A on the inputs of the logic circuit 67a for each point that has received different data. The output controller 40a also sets the signal Da to a '0' state and signal (Da)' to a '1' state for these points. The logical expression (4) is then given as: Output 61=Output A (63a)+Output B (63b)=B+ B=B, since Da='0', (Da)'='1'.

The output controller A uses output data B that it has received from the controller B, however the system 11 continues to operate by using output data B in both controllers A and B. Similarly, the system 11 provides output 61=A+A=A, in the event that a disparity is discovered in the output controller B due to the symmetrical configuration of the system 11.

In the event that output controller A fails due to a permanent (hard) failure, the associated PPM A, SPM A and ISD 33a recognize such condition, and issue signals 25a and 27a providing an alarm signal Wa='0' on output 36a of the voter component 31a, which, in turn, disconnects output 63a from system 11 output 61 and load 66. Similarly, if the output controller B fails permanently the associated PPM B, SPM B and ISD 33b recognize such condition, and issue signals 25b and 27b providing an alarm signal Wb='0' on output 36a of the voter component 31a, which, in turn, disconnects output 63b from system 11 output 61 and load 66.

The signal Wa='0' is coupled to the inputs of the gates G10, G11, and G12 that forces switches 56a to be in an OFF state, thereby disconnecting output 63a from system 11 output 61 and load 66. Output 61 is given then as: output 61=B. Output 61=A in the event that output controller B fails. Accordingly, the faulty output controller B may be online replaced, with a new healthy one.

In the event that the PPM or SPM fails and the output controller concurrently fails in the same channel, the healthy PPM or healthy SPM still check the condition of the output controller, as the ISD 33 does. If, for example, PPM A and output controller 40a concurrently fail, the voter component 31a continues to provide an alarm signal Wa (36) as the majority voting of two signals issued by healthy SPM A and ISD 33a. Alarm signal Wa occurs on the corresponding input of logic circuit 67a, that in response, disconnects output 63a from the output 61. The system 11, however, continues to operate with healthy channel B in the presence of two failures in channel A. If the PPM B and output controller B concurrently fail, the system 11 continues to operate with healthy channel A in the presence of two failures due to the symmetrical configuration of the system 11. Similar operation occurs in the event that any SPM and the associated output controller fail due to the symmetrical configuration of the system 11. In the event that the output controller 40 and the associated ISD 33 concurrently fail in the same channel in a way that ISD 33 cannot discover a fault in the output controller 40, then two PPM and SPM in this channel issues '0' signal on lines 25 and 27 as inputs of the voter component 31 respectively. These signals force the voter component 31 to issue an alarm signal 36='0', which disconnects the faulty output 63 from the system output 61.

The system 11 therefore continues to remain operational in the presence of any single point of failure, either permanent or transient, and may tolerate some kind of two faults. The system performs a shutdown process that passes the process into a safety condition if all channels A-B concurrently fail.

The system 11 utilizes two identical power supplies for providing power to channels A and B. Such configuration of the power supplies allows the system 11 to remain operational if at least one power supply out of two is healthy. In addition, each power supply includes the necessary components for detecting a fault occurrence in a given power supply and for preventing fault penetration to the power supply associated with the other channel.

In addition, the system 11 uses diverse redundancy as a protection against a common cause failure. In one aspect, the system includes two PPMs A-B, which are identical to each other with regard to hardware and software. The system 11 includes two SPMs A-B, which are identical to each other with regard hardware and software. The PPM A-B and SPM A-B, however, are different in hardware and software with respect to each other, allowing the system 11 to practically eliminate a common cause failure that is the result of software design errors or hardware faults. An alternative approach allows for a decrease the probability of common cause failures by the use of PPMs A-B and SPMs A-B having the same hardware and software, and to use functional block diagram (FBD) language for developing the application program for the PPM A-B and for SPM A-B. The application program is divided into segments, with each segment being executed within one scan period, and the segments being executed in the order that are defined by the user's logic. This approach allows the system to use the same software and hardware for the primary and secondary processor modules, and significantly decreases the probability of a common cause failure. In addition, such approach in each channel enables the system 11 to replace online faulty primary or faulty secondary processors with a new one. The healthy processor module then reprograms new processor module, since both the processor modules utilize the same software and hardware.

Thus, system 11 provides a reduced cost system as compared to the ultra-reliable system 10 described above for the first embodiment without significant sacrifice of system tolerance to faults: the system 11 has no single point of failure and continues to operate properly upon the occurrence of some typical two faults. As such, the system 11 can be certified up to SIL 3 in accordance with standards 61508 and 61511. Furthermore, the system 11 employs only two I/O circuits that allow a decreased number of elements in the I/O circuits, which result in the system 11 having I/O circuits with a lower cost.

Figure 7:
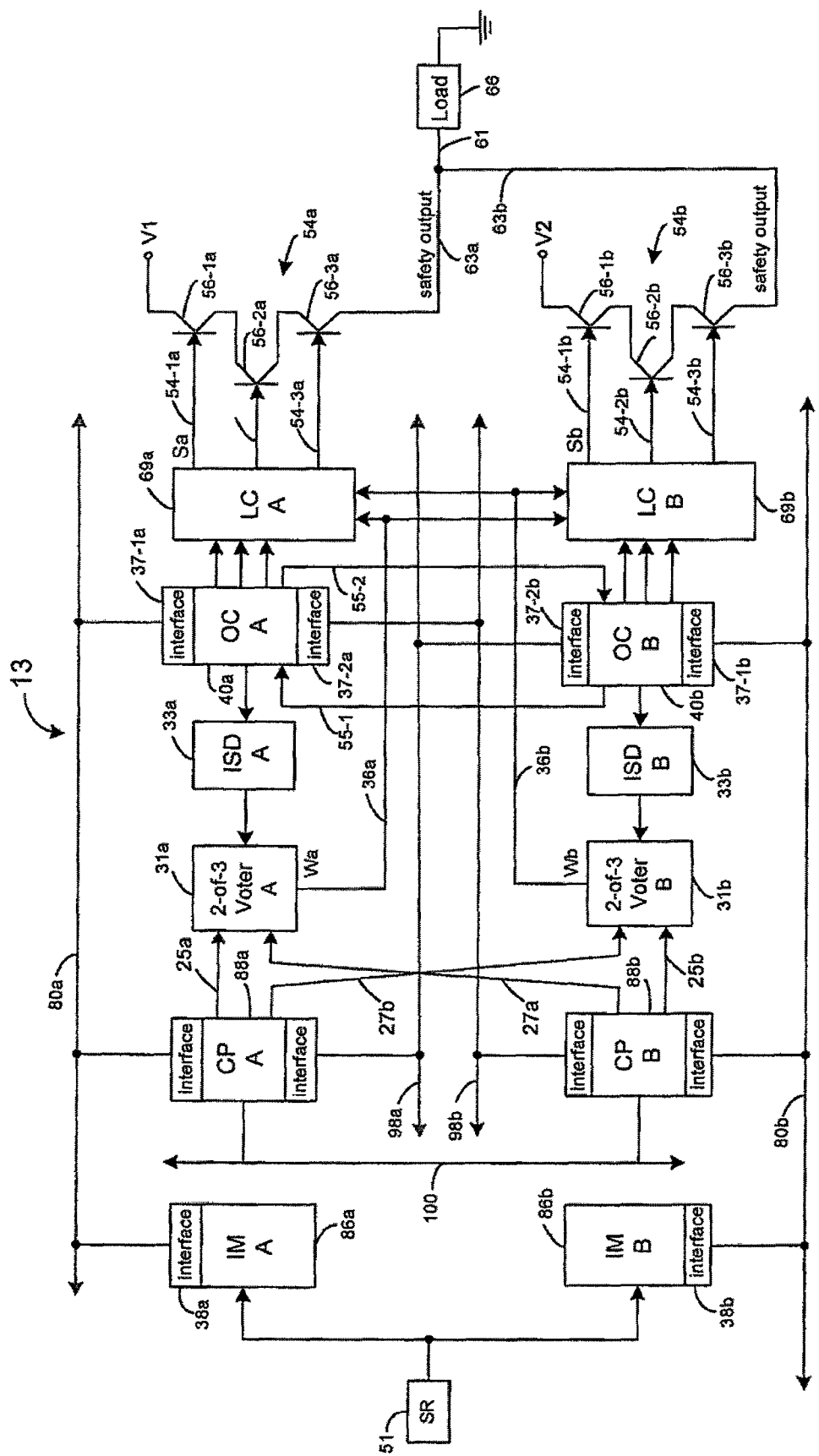
FIG. 7 is a block diagram of an embodiment of the dual redundant computer system in accordance with the concepts and disclosures presented herein.

Another embodiment of a redundant computer system is referred to by numeral 13, as shown in FIG. 7, and is primarily designed to provide safety for a typical distributed control system, but it can also be used in stand-alone mode. In particular, the system is referred to as a two-channel computer system (DCS) 13, and includes components that are equivalent to those utilized by the DDS system 11 and the URC system 10, but utilizes a number of components that are significantly less than the elements of the URC system 10. The DCS 13 includes channels A and B, each of which includes identical central processors 88, input modules 86, and the output modules that includes output controllers 40, logic circuits 69, and voting networks 54. FIG. 7 shows only single controlled point for the sake of reader's understanding. The input modules 86a-b operatively communicate with a single sensor 51 to receive process information for each controlled point and transform this information into a digital format, whereupon the input data is transferred to the associated central processors CP A-B 88 via interfaces 38a-b through I/O buses 80a-b. The CP A (88a) and CP B (88b) are synchronized via bus 100 to receive input data simultaneously from their associated input module 86a-b.

The CP A and CP B calculate whether the input data is higher than the predetermined first and second limits or not. The value of a first limit (FL) is usually less than a value of a second limit (SL). The result of these calculations presented for each controlled point is in a single-bit format. If the input data is less than the first limit in both channels A-B, CP A and CP B use the input data for executing an application program and they send output data to the associated output controller 40 and further to the outputs 63, which in turn provides the process to be in energized state. In the event that the input data is higher than the second limit in one channel, it means that the process may be in dangerous state. The system 13 performs a process shutdown by passing the process to the safety state if the input data is higher than the second limits in all channels of the system.

The difference of the input data received by CP A and CP B for some controlled points may be due to sensor faults or due to the occurrence of transient faults, because of that, the outputs 63a-b of the system may be forced to stop or be suspended until this difference disappears or is rectified after replacing faulty sensors. During normal operation, output data goes to the associated output module, which provides the system output 61 as result of two-out-of-two (2-of-2) voting among output data produced by A-B channels.

Figure 8A:
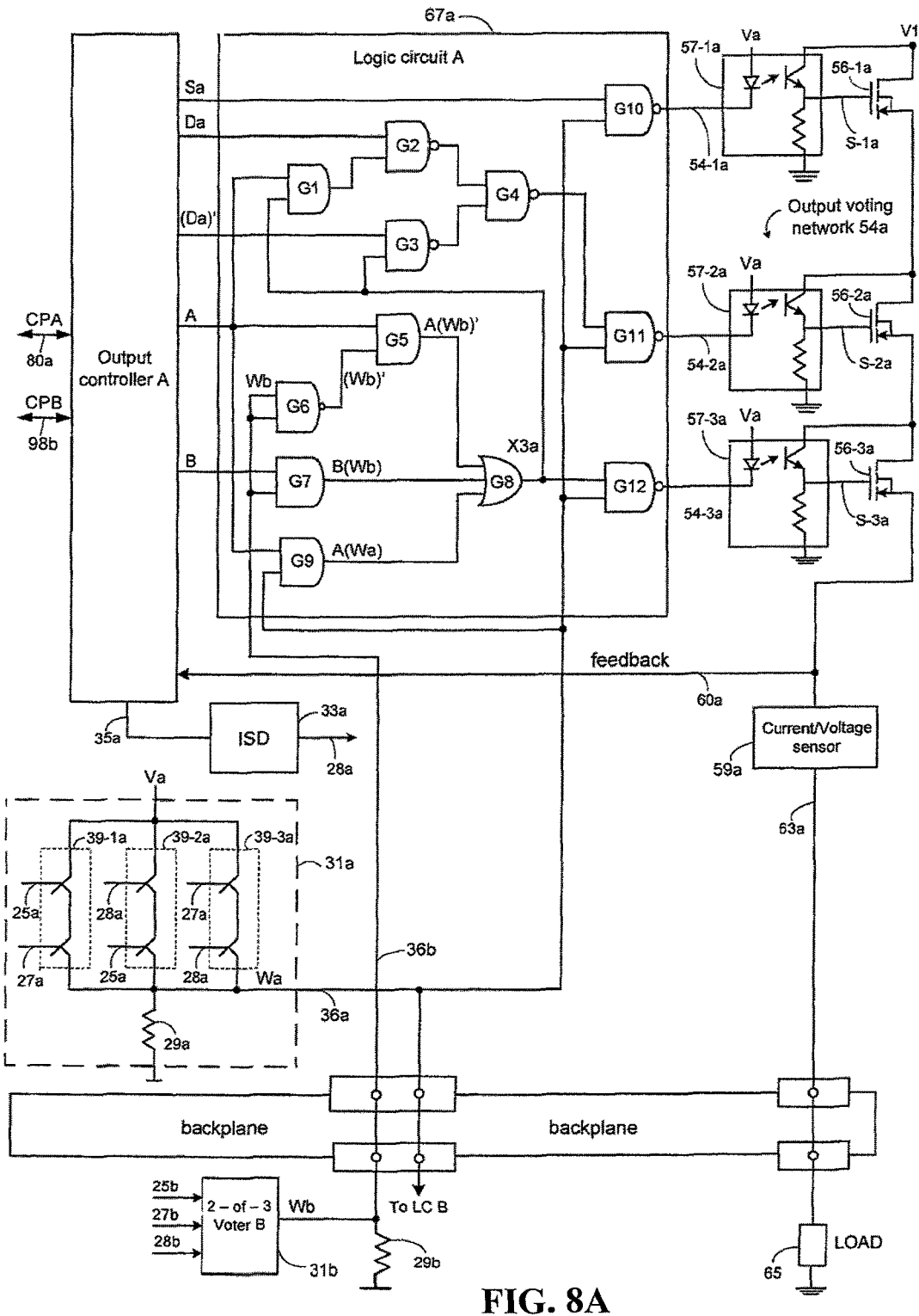
FIG. 8A is a schematic diagram of the components of channel A of the dual redundant computer system of the embodiment shown in FIG. 7 in accordance with the concepts and disclosures presented herein.
Figure 8B:
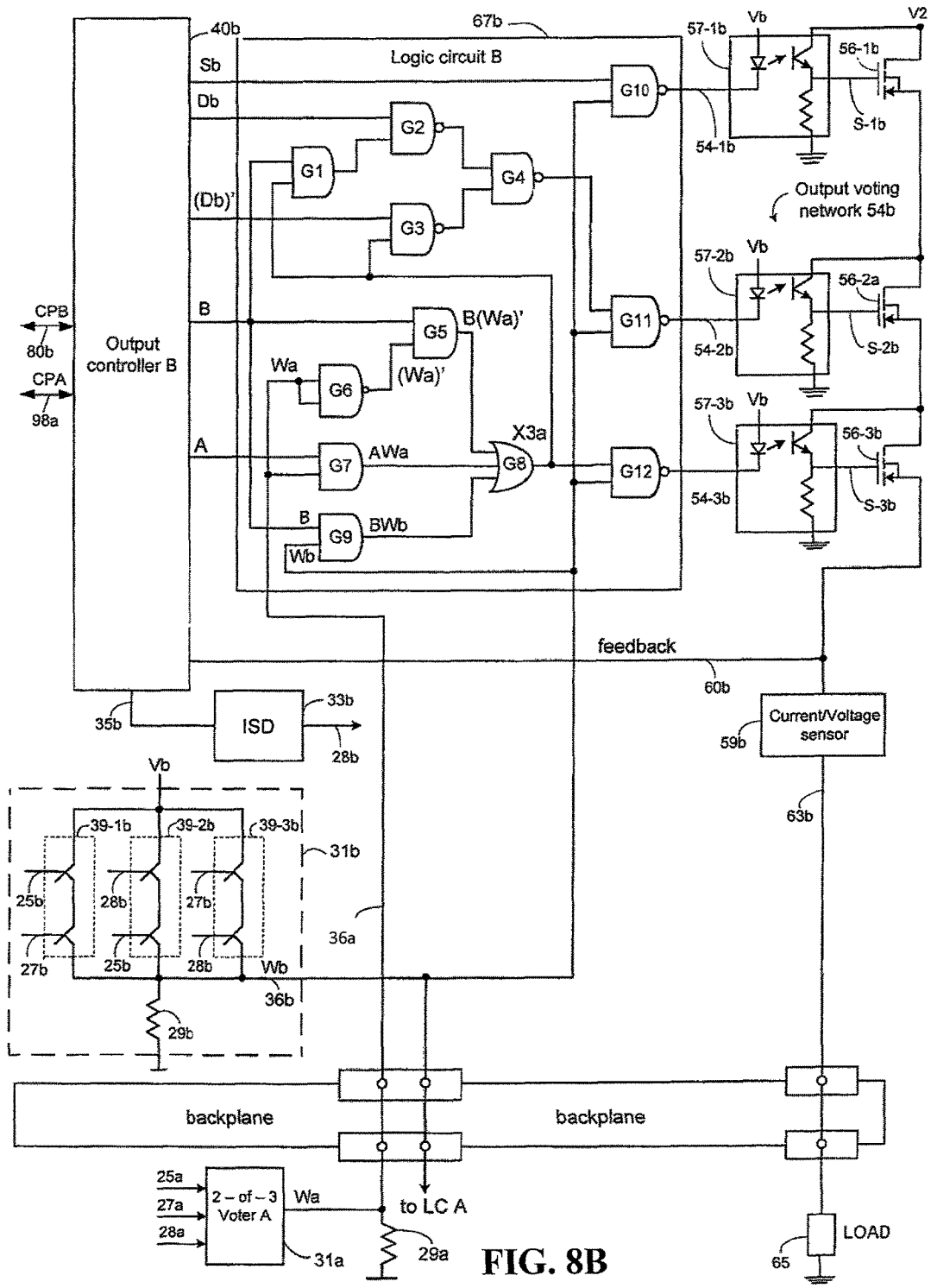
FIG. 8B is a schematic diagram of the components of channel B of the dual redundant computer system of the embodiment shown in FIG. 7 in accordance with the concepts and disclosures presented herein.

The system 13 operates in a cyclical basis, whereby the operation cycle period of the system 13 is defined by a scan time, which is primarily composed of the time required for input data polling, application program execution, and the time required for transfer output data to the output module. The application program execution and input data polling are overlapped. The CP A and CP B then uses input data for synchronously executing an application program and each provide two copies of the output data as result of application program execution. The CP A then sends a first copy of the output data to the output controller A (OC A) through bus 80a and interface 37-1a, and sends a second copy of output data to the output controller B (OC B) through bus 98a and interface 37-2b. At the same time, the CP B sends first copy of the output data to the OC B through bus 80b and the interface 37-1b, and then sends a second copy of output data to the OC A through the bus 98b and the interface 37-2a. Each output controller 40, therefore, receives output data from the CP A and from the CP B through buses 80a-b and 98a-b, as it is shown in FIGS. 7, 8A and 8B. Each output controller 40, during communication with the associated CP A and CP B, verifies their condition by a windowed timer that is embedded in the output controller 40 for choosing the correct output data that is produced by CP A and CP B. The output controller 40a compares the output data that it receives from the associated CP A and CP B. The output controller 40a by default uses the output data that is received from CP A if the output data of CP A and CP B do not have a disparity. In the event that CP A fails, the output controller 40b uses the output data that is produced by the associated CP B. If the output controllers 40 A-B discover a disparity between the output data that is produced by the CPA and CPB for some controlled points, it may be due to the occurrence of transient faults in CP A or in CP B. The output data with disparity is counted as doubtful, and this data will not be used for controlled points with disparity. Because of that, the output controller 40 activates disparity signal D indicating that the system 10 is not utilizing this doubtful data. The output controller 40 activates disparity signal D on the input of the logic circuit 69, thereby preventing the system 13 from using this doubtful data. The output controller (OC) 40 then sends zero output data to the neighboring output controller and receives therefrom output data through bus 55 to substitute the doubtful output data.

The output data that the output controller receives from the CP A and CP B is defined herein as A and B. The output controller then calculates signal D for each controlled point in channel A using the following equation:

$$D = \{X\text{NOR with } A, B\},$$

where Da is equal to '1', if there is no disparity between data A and data B. If a disparity exists between data A and data B, then output controller 40 sets inverse signal (Da)' equal to "0". A truth table is shown in Table 5 below.

TABLE 5

| A | B | XNOR | Da | Da' |
|---|---|------|-----|-----|
| 0 | 0 | 1    | 1   | 0   |
| 1 | 1 | 1    | 1   | 0   |
| 1 | 0 | 0    | 0   | 1   |
| 0 | 1 | 0    | 0   | 1   |

In addition, the output controller uses any suitable technique, such as SEC-DED, to correct any one fault and to indicate a two fault occurrence in CP A and CP B during their communication with the output controller 40 through the associated buses 80a-b and 98a-b. The comparison diagnostic that is described above is able to restore the system 13 to proper operation after the occurrence of single permanent or transient point of failure in each channel. When a disparity between the output data occurs in output controllers 40a and 40b concurrently, each output controller repeats the process of receiving output data up to three times, until the transient fault disappears. If the disparity persists for a longer period than that defined by the safety process time, the system 13 performs a process shutdown by passing the process to the safety state.

FIGS. 8A-B show the components that each output module a-b includes, as follows: output controller 40a-b, voting component 31a-b, and an improper sequence detector (ISD) 33a-b.

In addition, the CPs 88a-b are in operative communication with a voter component 31a by a line 25a and 27a, and communicate with a voter component 31b by a line 25b and 27b as shown in FIGS. 7 and 8A-B. Improper sequence detectors (ISD) 33a and 33b are used for continuously monitoring both time-based and logical correctness of the programs that the output modules 40a and 40b execute. The ISD 33a activates an output signal on the input of the voter component 31a in the event that the output module 40a fails. The CP A verifies the conditions of the OC A and OC B during communication with them over the buses 80a and 98a respectively. Similarly, the CP B verifies the conditions of OC B and OC A during communication with them over buses 80b and 98b respectively. In addition, the CP A connects to a first and second input of the voter components 31a and 31b by lines 25a and 27b respectively. Similarly, the CP B connects to a first and second of the inputs of the voter components 31b and 31a by lines 25b and 27a respectively. In addition, the outputs of ISD-s 33a and 33b are connected to a third input of the voter components 31a and 31b respectively.

The voter component 31a includes a plurality of parallel voting groups 39-1a, 39-2a, and 39-3a, as shown in FIG. 8A, that are coupled between a voltage source A and a resistor 29a, which is connected to a ground node. Each voting group 39a includes power switches, such as a low power MOSFET or any other suitable transistor or relay for example, connected in series. A first switch of group 39-1a and a second switch of group 39-2a are coupled to line 25a, that are controlled by CP A. A first switch of group 39-3a and a second switch of group 39-1a are coupled to line 27a, which are controlled by CP B. A first switch of group 39-2a and a second switch of group 39-3a are coupled to line 28a, which are controlled by ISD 33a. Both CP A and CP B monitor the conditions of the output controllers 40a and 40b during communication with them through buses 80a-b and 98a-b. CP A, CP B, and ISD 33a-b sets respective signals to a state on lines 25a-b, 27a-b, and 28a-b during normal system 13 operation, which provides that the outputs 36a and 36b of voter components 31a and 31b be normally in a state. Such configuration of the 2-of-3 voter with SP A, SP B, and ISD in each channel has no single point of failure. During normal system 13 operation, therefore, the voter component 31a produces output signal 36a as result of a majority of two-out-of-three voting among signals, which the CP A, CP B, and the ISD 33a produce on the inputs of the voter component 31a. If, for example, the output controller 40a fails, the CP A activates a '0' signal on line 25a, while the CP B activates a '0' signal on line 27a. As a result, at least two signals in a '0' state occur simultaneously on two inputs of the voter component 31a, which are sufficient to provide a majority of signals in a '0' state for allowing them to have a '0' signal in the output 36a (Wa) of the voter component 31a. Signal Wa in a '0' state goes to corresponding input of the logic circuit 67a, which in turn disconnects output 63a from output 61 of the system 13. The voter component B is identical to voter component A and has similar connection with CP B, CP A, and ISD 33b due to the symmetrical configuration of the system 13. Consequently, if the output controller 40b fails, the CP B activates the '0' signal on line 25b, while the CP A activates the '0' signal on line 27b. As a result, at least two signals in the '0' state occur simultaneously in two inputs of the voter component 31b, which are sufficient to provide a majority of signals in a '0' state to have a '0' signal on the output 36b (Wb) of the voter component 31b. Signal Wb in a '0' state goes to a corresponding input of the logic circuit B, which in turn disconnects the output 63b from the output 61 of the system 13. The diagnostics considered above allows the system 13 to be effective in discovering possible failures in the output controllers 40a-b, since the 2-of-3 voter component 31a-b configuration has no single point of failure. In addition, the output controller A is able to operatively communicate with the output controller B and the output controller C via the communication bus 55. In some embodiments, the communication bus comprises a read-only bus. As such, the communication bus 55 enables each output controller 40a-b to communicate with one of the other output controllers, such as by sending and/or receiving output data. Continuing, the output controller A (OC A) sends output data A to the output controller B through bus 55-2, and receives output data B from the output controller B at the same time through bus 55-1. The output controller 40a issues single-bit data A and B, and issues signals Sa, Da, and inverted signal (Da)' on the corresponding inputs of the logic circuit 67a. Similarly, the output controller 40b issues data A and data B, and issues signals Sb, Db, and inverted signal (Db)' on the corresponding inputs of logic circuit 67b.

FIGS. 8A-B show the current/voltage sensors 59 in each channel, which are utilized to verify a value of electrical current passing through the switches 56a-c. In addition, sensor 59a is able to check a value of the voltage of a load 66. Furthermore, a feedback line 60a provides a controller 40a to monitor the load 66 state and the condition of the switch 56a. The logic circuit 67a-b is now considered, which is similar to the logic circuit 53a-b that is shown in FIGS. 6A-B. Data A and data B in FIGS. 8A-B are named A and B for the sake of simplicity. First, we consider signals on the outputs of gates G1-G4 and G8, as shown in FIG. 8A. On the G1 output is A^X3a, where X3a is provided as the output of gate G8. Output X3a is equal to a logical sum of the three inputs of gate G8. The first input of G8 is the output of gate G6 that is equal A^(Wb)', while the second and third inputs of G8 are equal to B^Wb and A^Wa respectively. Identifier (') indicates that a value is an inverse value in the discussion presented herein. The output of gate G8 is given as: A^(Wb)

'+B^Wb+A^Wa=X3a, which is defined herein as X3a for clarity. It should be appreciated that both inputs of G6 are coupled for the system 13 only. Output G8, which is equal to X3a is coupled to inputs G1, G3, and G12. On inputs of G1 occur signals A and X3a, and the output of G1 produces signal A^X3a. The output controller A (OC A) sets a logical signal Da='1' and sets its inverse signal (Da)'='0' on the first inputs of G2 and G3 respectively when there is no disparity between CPA and CPB data in OC A. The output controller A (OC A) sets the logical signal Da='0' and sets its inverse signal (Da)'='1' on first inputs of G2 and G3 respectively in the event that a disparity between data A and B is discovered. Signal X3a occurs on a second input of G3 and signal A^X3a occurs on a second input of G1. The output of G2 then produces signal (A^X3a^Da)', while the output of G3 produces signal X3a^(Da)'. As a result, G4 produces a signal [(A^X3a^Da)]^[X3a^(Da)']'=Y3a, which is identified herein as Y3a for simplicity. Gate 4 output is given by logic expression as: Y3a={[(A^X3a ^(Da)']^[(X3a^(Da)']'}'. Similar results were achieved for X3b and Y3b for channel B by using FIG. 8B: X3b=B^(Wa)'+A^Wa+B^Wb. Y3b={[(B^X3b^Db)']^[(X3b^(Db)']'}'.

During normal operation, signal A and signal X3a may each be a logical '1' or a logical '0' for each controlled point. Signal Da='1' and signal (Da)'='0' in normal operation when output data A and B produced by CPA and CPB are equal. During normal operation, signals Wa=Wb=Wc='1'. If the system 13 is normally energized, then A=X3a=X3b='1' since A=B=1. And the logical signal Y3a for each controlled point given as: Y3a={[(1^1)']^[(1^0]']}'=[0^(1^0)]'=(0^0)'='1'. Signals Y3a and Wa are coupled to gate G11 that provides the output signal 54-2a on input of the isolation driver 57-2a as an inverse signal (Y3a^Wa)'=(1^1)'='0'. The isolation driver 57-2a is used to provide isolation to a logic section of the system 10 from its power section. It should be appreciated that the isolation driver 57-2a may comprise an optoelectronic isolation driver; however, isolation driver 57-2a may comprise any suitable device. The isolation driver 57-2a, in turn, inverts signal '0' to provide a '1' signal on output S2-a, which is coupled with the control input of power MOSFET 56-2a, and as a result, MOSFET 56-2a comes to an "ON" state.

Signal X3a is coupled with one input of gate G12, while another input of which is coupled with signal Wa. When system 10 is in an energized state, signal X3a='1' and signal Wa='1'. Gate 12 then gives output signal (X3a^Wa)'='0'. The isolation driver 57-3a, in turn, inverts signal '0' to provide a '1' signal on output S3-a, which is coupled with a control input of the power MOSFET 56-3a. As a result, MOSFET 56-3a goes to an "ON" state. The output controller 40a in normal operation sets signal Sa='1' at one input of gate 10, another input of which is coupled with signal Wa. The isolation driver 57-1a, in turn, inverts signal '0' to provide a '1' signal on the output S1-a, which is coupled with the control input of a fault recovery valve 56-1a that goes to an "ON" state. It should be appreciated that the fault recovery gate may also comprise a MOSFET power switch. All of the power switches 56-1a, 56-2a, and 56-3a, therefore, will be in an "ON" state provided that output 63a is energized. FIGS. 8A-B show the current/voltage sensors 59 in each channel, which are utilized to verify a value of electrical current passing through the switches 56a-c. In addition, sensor 59a is able to check a value of the voltage of a load 66. Furthermore, a feedback line 60a provides a controller 40a to monitor the load 66 state and the condition of the Fault Recovery Switch (FRS) 56a.

In general, the output controller 40b, the logic circuit 67b, and the voting network 54b operate similarly as the corresponding elements in FIG. 8A, as described above, because the elements a and b in FIGS. 8A-B are structurally equivalent. It should be appreciated, that all connections described above with the respect of the output controller A, logic circuit A, and voting network A are similar and applicable for controllers B (FIG. 8B) due to the symmetrical configuration of the system 13. In the event that the output data that is produced by the CP A and the CP B have a disparity, it would be due to the occurrence of undetected transient faults in the CP A or in the CP B, if a hard failure in the CP A and in the CP B has not been identified.

Outputs 63a, and 63b are now presented, whereby output 63a for each controlled point is defined as a logical product that switches 56-1a, 56-2a, and 56-3 provide in accordance with corresponding signals S-1a, S-2a, and S-3a that, in turn, are controlled by the outputs 54-1a, 54-2a, and 54-3a. The output controller 40a sets Da signal='1' and (Da)' signal='0' in this event. Outputs 63a, and 63b are connected in parallel and they are coupled to output 61 of the system 13. The following logical expression for outputs 63a and 63b includes all signals, and given as a logical sum:

$$\text{Output } 61 = \text{Output } A(63a) + \text{Output } B(63b) = Sa\hat{\ }A\hat{\ }Wa\hat{\ }[A\hat{\ }Wa + B\hat{\ }Wb + A\hat{\ }(Wb)']\hat{\ }Da + Sa\hat{\ }Wa\hat{\ }[A\hat{\ }Wa + B\hat{\ }Wb + A\hat{\ }(Wb)']\hat{\ }(Da)' + Sb\hat{\ }B\hat{\ }Wb\hat{\ }[B\hat{\ }Wb + A\hat{\ }Wa + B\hat{\ }(Wa)']\hat{\ }Db + Sb\hat{\ }Wb\hat{\ }[B\hat{\ }Wb + A\hat{\ }Wa + B\hat{\ }(Wa)']\hat{\ }(Db)' \quad (5)$$

It should be appreciated that a first product contains data A-B, while data A-B is in absence in the first product of a second term.

During normal operation, the Wa=Wb='1'; Sa=Sb='1'; Da='1', (Da)'='0'. As such, in expression (5) CPA and CP B produce data A^(A+B) and produce data B^(B+A) respectively, and the system 13 provides the output 61 to be equal:

$$\text{Output } 61 = A\hat{\ }(A+B) + B\hat{\ }(B+A) = A+B. \quad (6)$$

Thus, the system 13 performs two-out-of-two (2-of-2) majority voting among data A and B under fault-free circumstances as it follows from the logical expression (6).

Next, the operation of the system 13 is considered when a disparity of the output data exists within the output controller 40a. In the event that the output controller 40a receives output data from the CP A and the CP B, where a disparity exists between their data for some points, the output controller 40a counts this data as undefined and sets a logical "Low" state for the output data A on the inputs of the logic circuit 67a for each point that has received different data. The output controller 40a also sets disparity signal Da to a '0' state and signal (Da)' to a '1' state for these points. The logical expression (6) is then given as:

$$\text{Output } 61 = \text{Output } A\ (63a) + \text{Output } B\ (63b) = B+B=B,$$
since Da='0', (Da)'='1'.

The output controller A uses output data B that it receives from the controller B over bus 55. The system 13, therefore, continues to operate by using output data B in both controllers A and B. The system 13, due to its symmetrical configuration, provides output 61=A+A=A in the event that a disparity is discovered in the output controller B.

In the event that output controller A fails due to a permanent (hard) failure, the CP A and CP B recognize this fault during communication with controller A and sets alarm signals to a '0' state on lines 25a and 27a respectively. At least two signals in a '0' state are sufficient to have the voter component 31a provide a '0' state on output Wa (36a), even though ISD 33a fails to discover a fault occurrence in output controller A. As shown in FIG. 8A, the signal Wa='0' is coupled to the inputs of the gates G10, G11, and G12, which forces switches 56a to be in an OFF state, thereby disconnecting output 63a from system 13 output 61 and load 66. Output 61 is then equal to B. The signal Wa is also coupled with a second input of gate 9 to provide A(Wa) output of this gate. Similarly, if the output controller B fails due to a permanent (hard) failure, the CP B and CP A recognize this fault during communication with controller B and set alarm signals to a '0' state on lines 25b and 27b respectively. As shown in FIG. 8B, the signal Wb='0' is coupled to inputs of the gates G10, G11, and G12 that forces switches 56b to be in an OFF state, thereby disconnecting output 63b from system 13 output 61 and the load 66. Output 61 is then equal to A as it follows from the equation 5. In the event that the CP A fails because of the occurrence of a hard failure, CP B still provides output data to both output controllers B and A through bus 80b and 98b respectively. If the CP B fails, the CP A still provides output data to both output controllers A and B through bus 80a and 98a. In the event that CP A and output controller A concurrently fail, the system 13 continues to remain operational with the healthy CP B and the healthy output controller B. The system 13 also remains operational if the CP A and output controller B located in different channels fail concurrently, because the healthy CP B will operate with the healthy output controller A through bus 98b. If the CP B and the output controller A fail concurrently, the system 13 again continues to remain operational with the healthy CP A and the healthy output controller B. The system 13 therefore provides tolerance to any single point of failure, either permanent or transient, and continues to operate in the presence of some kind of two faults. In the event that two output controllers A and B fail or CP A and CP B concurrently fail, the system 13 performs a shutdown process by de-energizing the system output 61 and passing the controlled process to a safe state.

Continuing, another exemplary operating scenario includes the possible occurrence of faults in the logic circuits 67a-b and in the voting network 54a-b. Outputs 36a and 36b of the voting modules 31a and 31b serve as inputs for both the logic circuit A and logic circuit B. In the event that one logic circuit fails in a way that the associated electronic switches are permanently in an 'OFF' state, the outputs 63 of the associated channels are de-energized, but the system 13 continues to operate using the other remaining healthy channel. If two electronic switches in the associated channel fail in a permanently 'ON' state for the same controlled points and the voltage/sensors 56 recognize such faults and give this information on line 60 to the associated output controller. The output controller A, for example, activates a signal Sa='0' on lines 54-1a of the logic circuit 67a. The output of each G10 is coupled to the input of the associated isolation driver 57-1a, which controls a fault recovery valve (FRV) 56-1a. The output of the G10 goes to '1', output of the isolation driver 57-1a goes to '0' state forcing the FRV 56-1a to be in an 'OFF' state, and outputs 63a are de-energized. The output controller B operates similarly to output controller A as discussed above. In addition, the output controller uses any suitable technique, such as SEC-DED, to correct any one transient fault and to indicate a two fault occurrence in CP A and CP B during their communication with the output controller 40 through the associated buses 80a-b and 98a-b.

The system 13 therefore continues to remain operational in the presence of any single point of failure and may tolerate some kind of two faults. In the event that two logic circuits or two output voting networks 54 fail in the 'OFF' state for the same controlled points, the system 13 performs a shutdown process that passes the controlled process in a safety condition.

It should be appreciated that the system 13 utilizes two identical power supplies for providing power to channels A and B. Each power supply includes the necessary hardware and/or software for detecting the occurrence of a fault in the power supply itself, and for preventing fault penetration into the power supply of the other channel, thereby allowing the system 13 to remain operational if at least one of the two power supplies remains healthy and operational.

Thus, the system 13 is configured to have reduced cost given its design, by utilizing only two central processors CP A and CP B and two I/O (input/output) circuits that utilize a reduced number of elements. In addition, the system is capable of performing fault diagnostics that has no single point of failure, allowing the system 13 to operate properly in the presence of some kind of two faults. The architecture of the system 13, therefore, is capable of achieving certification of up to SIL 3 in accordance with standards 61508 and 61511.

Another embodiment of the various embodiments is a computer system 14 that integrates, but maintains as separate, a safety and control functionality (ISC). The safety section 14a and control section 14b each includes multiple remote chassis to provide safe control of up to four or more processes at the same time.

Figure 9:
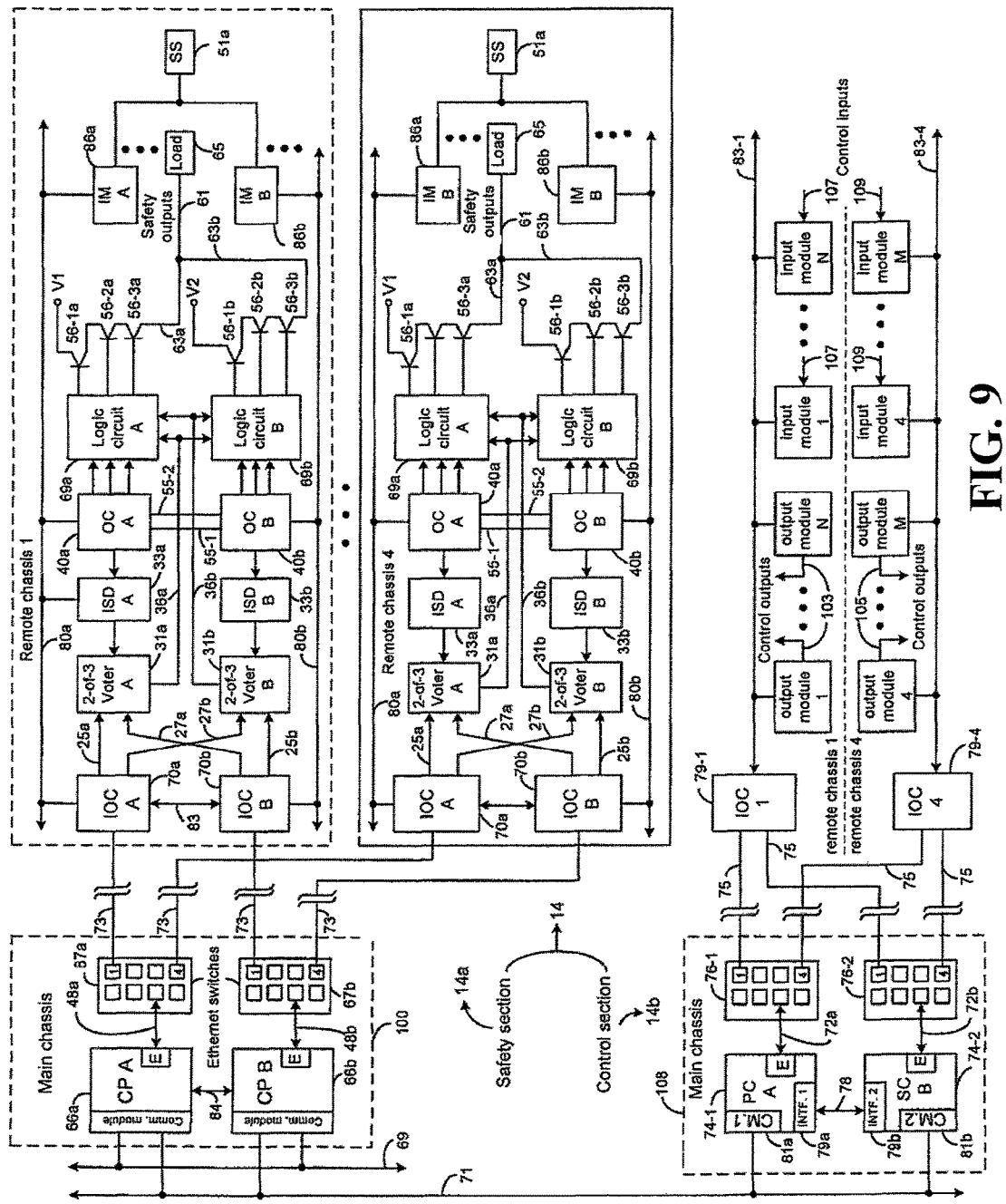
FIG. 9 is a block is a block diagram of an embodiment of the redundant computer system that integrates safety and control functionality in accordance with the concepts and disclosures presented herein.

Next, the safety section of the ISC system is presented. Specifically, the safety section 14a (FIGS. 9, 9A, 9B) includes a main chassis 100 that houses two redundant central processors 66a (CP A) and 66b (CP B) operating in parallel. The CP A and the CP B each have a communication module, which are separately connected to bus 69 for communicating between the CP A and the CP B, and connected to bus 71 for isolated communication between the safety and control sections of the integrated system. The third bus, not shown in FIG. 9, is used for communication with external devices, such as a host device and an operator Interface. Each central processor further includes at least one embedded ETHERNET port that operatively communicates with an ETHERNET switch 67 over bus 48. An input/output controller 70 (IOC) in each remote chassis that can be 1-4 in some embodiments, operatively communicates with a corresponding output of the associated ETHERNET switch 67. Each central processor 66 uses an embedded ETHERNET port and an external ETHERNET switch 67 for scanning input/output controllers 70 over the long distance bus 73, which can be a fiber optic or copper cable for example. Each remote chassis further includes at least two input module 86 that receive information about the controlled process from the single sensor 51 for each controlled point. Input modules 86a-b convert the input data so as to be in a digital format, and sends the input data to the associated IOC 70 through buses 80a and 80b. The IOC 70a and IOC 70b then utilize the associated long distance buses 73 and ETHERNET switches 67a, 67b to transfer the input data to the CP A and to CP B respectively. The CP A and the CP B execute the application program and they transfer output data, as a result of the application program executing back to the associated IOC 70a-b over a long distance bus 73, which, in turn, send output data to the associated output controller (OC) 40a-b over bus 80a-b. The OC 40a-b produce outputs on corresponding inputs of a logic circuit 69a-b, which coupled with a voting switches 56 to perform 2-of-2 voting between output data that said first and second IOC 70 receive from CP A and CP B.

In addition, the CP A and CP B calculate whether input data is higher than predetermined limits or not. The result of these calculations is presented for each controlled point in a single-bit format. The value of a first limit (FL) is usually less than a value of a second limit (SL). If the input data is less than the first limit in both channels A-B, then the controlled process is in energized state. If the input data is higher than the second limit in one channel of the system it means that the process can be in a dangerous state. The system 13 performs a process shutdown by passing the process to the safety state if the input data is higher than the second limits in two channels of the system.

Figure 9A:
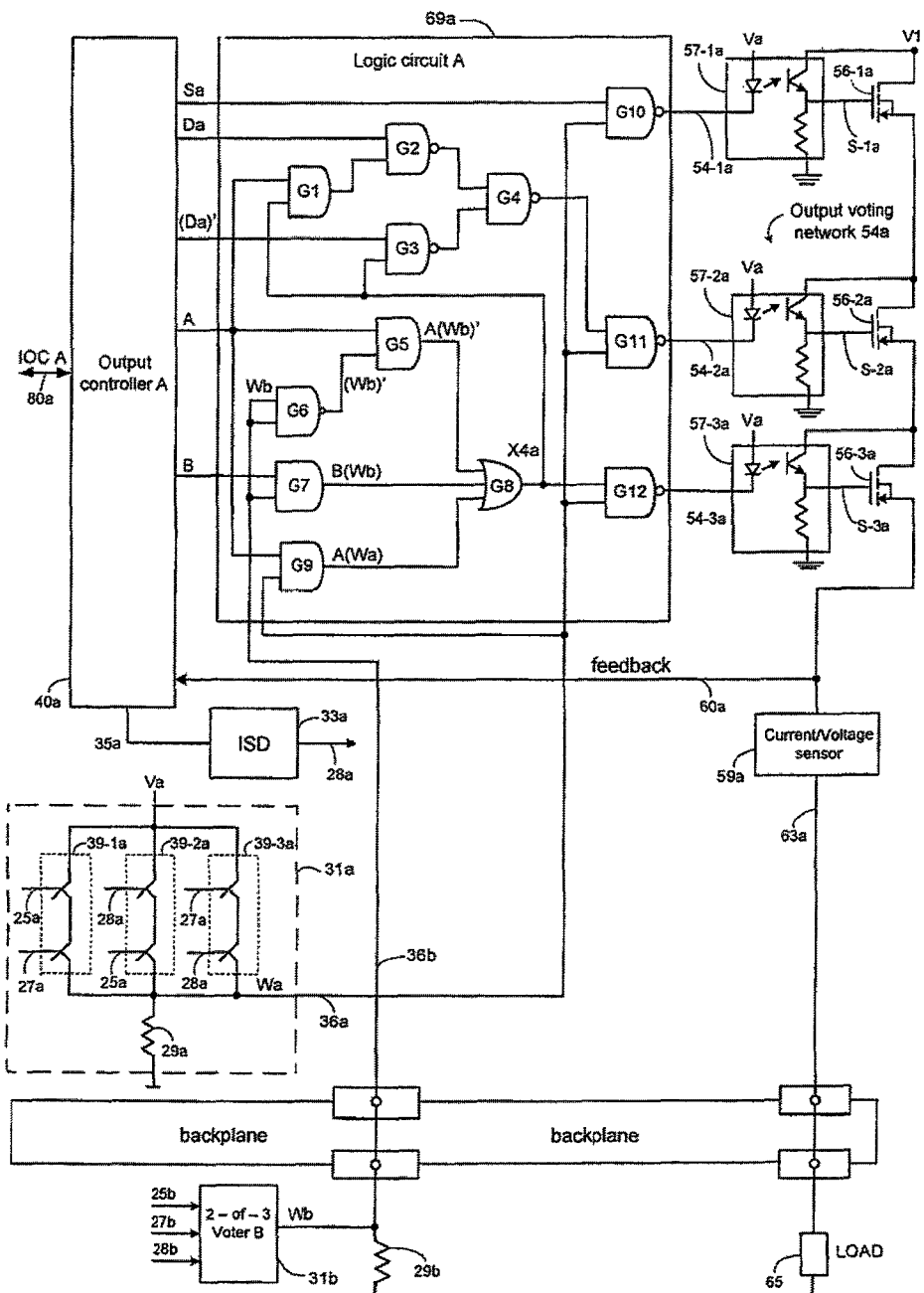
FIG. 9A is a schematic diagram of the components provided by the safety section that are included in channel A of the redundant computer system of the embodiment shown in FIG. 9 in accordance with the concepts and disclosures presented herein.
Figure 9B:
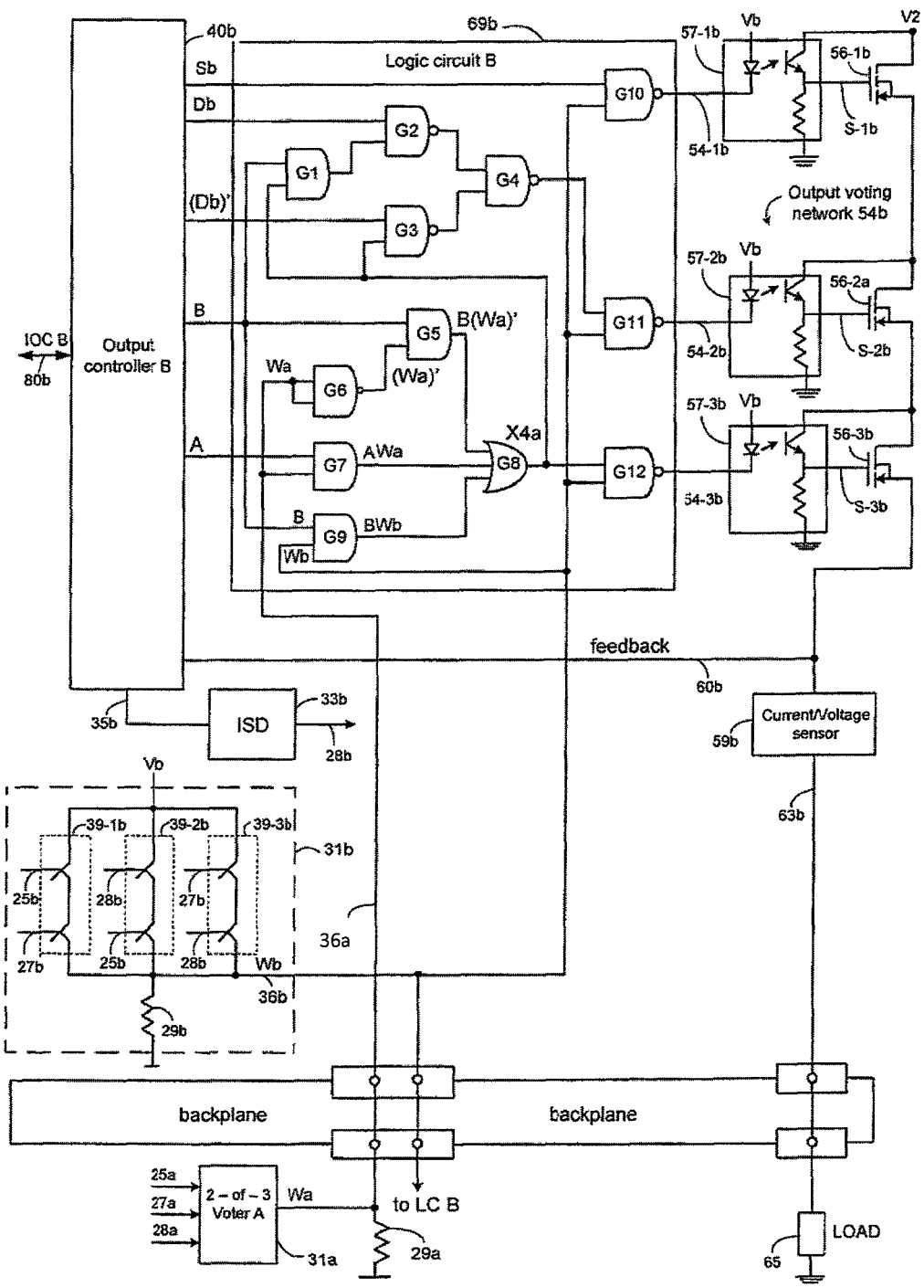
FIG. 9B is a schematic diagram of the components of the safety section that are included in channel B of the redundant computer system of the embodiment shown in FIG. 9 in accordance with the concepts and disclosures presented herein.

Additional components that each remote chassis includes will now be presented. Each output module includes a diagnostic circuit, that includes a voter component 31, an improper sequence detector 33 (ISD), an output controller 40 (OC), a logic circuit (LC) 69, and a voting circuit 54. The voter component 31 shown in FIGS. 9A and 9B is in operative communication with each of the logic circuits 69a and 69b via line 36a (Wa). Logic circuits 69a-b is in operative communication with output controller 40a-b. The system further includes a TMR type diagnostic in each channel. The TMR diagnostic includes the 2-of-3 voter 31, one input of which is coupled with ISD 33 output 28. The voter component 31a, which may be a 2-of-3 voter component includes a plurality of parallel voting groups 39-1a, 39-2a, and 39-3a, which are coupled between a voltage source A and a resistor 29a, which is connected to the ground node. Each group 39a includes two electronic switches, such as transistors, connected in series. A first switch of group 39-1a and a second switch of group 39-2a are coupled to line 25a, which are controlled by the IOC 70a. A first switch of group 39-3a and a second switch of group 39-1a are coupled to line 27a, that are controlled by the IOC B. A first switch of group 39-2a and a second switch of group 39-3a are coupled to line 28a, that are controlled by ISD 33a. The voter component 31a, therefore, receives three input signals from IOC 70a, IOC 70b, and from ISD 33a, and produces output signal 36a (Wa), as result of a majority of two-out-of-three voting among signals from IOC 70a, IOC 70b, and ISD 33a.

The IOC 70a and the IOC 70b periodically monitor conditions of the associated OC 40 during communication xxx through buses 80a and 80b. The ISD 33a continuously monitors the associated OC 40a for verifying both time-based and logical program execution that the OC 40 performs. The IOC A and the IOC B in normal operation keeps '1' signals on lines 25a and 27b, as well on lines 25b and 27a, respectively. The 2-of-3 voter component 31a produces, in this case, an output signal 36a='1' as the result of a majority voting among signals issued by the IOC 70a, IOC 70b, and the ISD 33a. For example, if OC 40a fails, the IOC 70a and ISD 33a discover this fault and the IOC 70a sets signal '0' on line 25a, while the ISD 33a sets signal '0' on the output 28a, which is coupled with another input of voter component 31a. The IOC 70a, using bus 83, sends a message to the IOC 70b to set '0' on line 27a for providing the majority voting for '0' signals on the inputs of the voter component 31a even though the ISD 33a has not discovered a fault occurrence in the OC 40. The voter component 31a, in response, produces the '0' output signal on inputs LC 69a and LC 69b. The LC 69a, in turn, sets the associated electronic switches 56-2a and 56-3a in an OFF state for de-energizing the output 63a from output 61 in the event that the OC 40a fails. When this occurs, the system continues to operate with a single controller OC 40b until the replacement of the faulty output module with a healthy one.

Similarly, LC 69b sets electronic switches 56-2b and 56-3b in an OFF state for de-energizing the output 63b of the safety section output 61 when the OC 40b fails. This TMR diagnostic, thereby, allows the safety section to operate properly with one working OC 40a, in the event that OC 40b fails and vice versa. The IOC 70a then restores a '1' on line 25a and sends a message to the IOC 70b to restore a '1' on line 27a. Similar system operation takes place in the event that the OC 40b fails. This TMR diagnostic has no single point of failure, because of that it is considerably more effective than those diagnostics currently known. The safety section of the system 14 further utilizes SEC-DED technology to decrease the probability of transient faults.

The operation of the logic circuits 69a-b and the voting networks 54a-b operation (FIGS. 9A-B) will now be discussed. It should be appreciated, that the isolation driver 57 in FIGS. 9A, 9B may comprise an optoelectronic isolation driver, however, the isolation driver 57 may comprise any suitable device. It should also be appreciated, that the switches 56-1a, 56-2a, and 56-3a may comprise low power MOSFET transistors, as shown, or any other controllable switches. Symbol (') identifies that a value is an inverse value.

The logic circuit 69a-b which is now presented, is similar to the logic circuit 69a-b that is shown in FIGS. 8A-B. Data A and data B in FIGS. 9A-B are named A and B for the sake of simplicity. First, we consider signals on the outputs of gates G1-G4 and G8, as shown in FIG. 9A. On the G1 output is A^X4a, where X4a is provided as the output of gate G8. Output X4a is equal to a logical sum of the three inputs of gate G8. The first input of G8 is the output of gate G6 that is equal A^(Wb)', while the second and third inputs of G8 are equal to B^Wb and A^Wa, respectively. Identifier (') indicates that a value is an inverse value in the discussion presented herein. The output data A=B='1' are in the energized mode, consequently output of gate 11 is also in '0' state. The isolation driver 57-2a inverts signal '0' to provide '1' signal on output S2-a, which is coupled to control input of power MOSFET 56-2a.

Output 63a is defined thereby to be equal to A^(A+B). Output 63b (FIG. 9B) is defined similarly to output 63a, whereby output 63b=B^(B+A) due to the symmetrical section 14a configuration. The following logical expression, Eq. 7, for outputs 63a and 63b includes all signals, is given as a logical sum:

Output 61=Output $A(63a)$+Output $B(63b)=Sa^{\wedge}A^{\wedge}Wa^{\wedge}$ [$A^{\wedge}Wa+B^{\wedge}Wb+A^{\wedge}(Wb)'$]$^{\wedge}Da+Sa^{\wedge}Wa^{\wedge}$[$A^{\wedge}Wa+$ $B^{\wedge}Wb+A^{\wedge}(Wb)'$]$^{\wedge}(Da)'+Sb^{\wedge}B^{\wedge}Wb^{\wedge}$[$B^{\wedge}Wb+A^{\wedge}Wa+$ $B^{\wedge}(Wa)'$]$^{\wedge}Db+Sb^{\wedge}Wb^{\wedge}$[$B^{\wedge}Wb+A^{\wedge}Wa+B^{\wedge}(Wa)'$]$^{\wedge}$ $(Db)'$ The output controller a-b in each scan receiving/sending from/to output controller b-a output data B over read bus 55. As such, in expression (7) IOC A and IOC B received output data A and B from CP A and CP B and produce output data A^(A+B) and B^(B+A), on outputs of output controllers A-B respectively, and the safety section of the system 14 provides the output 61 to be equal:

Output 61=$A^{\wedge}(A+B)+B^{\wedge}(B+A)=A+B$ in normal system operation.

The safety section, thereby, performs 2-of-2 voting with the output data produced by central processors CP A and CP B. In the event that OC A fails, Wa='0', and the equation (7) is transformed to: Output 63a=B^(B+B)=B, and the safety section performs 1-of-1 voting with the output data produced by central processor CP B. In the event that the OC B fails, Wb='0' and Output $63b=A\hat{}(A+A)=A$ due to the symmetrical safety section configuration. Safety section output 61 (SO) is given as:

$$SO=B, \text{ or } SO=A.$$

In addition, the output controller 40*a* sets signal Sa='1', and produces signal (Sa^Wa)'='0' on the output of gate 10 in normal operation. The isolation driver 57-1*a*, in turn, inverts this signal '0' for setting '1' signal on output S1-*a*, which is coupled with the control input of a fault recovery valve (FRV) 56-1*a*, which, in turn, goes to an "ON" state. Power switches 56-1*a*, 56-2*a*, and 56-3*a* is also operation in an "ON" state providing output 63*a* to be normally energized. It should be appreciated, that the fault recovery gate 56-1*a* may also comprise a power switch such as a MOSFET power switch. The output 63*a* for each controlled point is defined as a logical product that MOSFET switches 56-1*a*, 56-2*a*, and 56-3 provides in accordance with corresponding signals S-1*a*, S-2*a*, and S-3*a* that in turn controlled by the outputs 54-1*a*, 54-2*a*, and 54-3*a* of the logic circuit 69*a*. In the event that controlled process requires shutdown, the section 14*a* obtains data A=B='0' for de-energizing the process. FRVs A-B are used for disconnecting the output 63*a-b* from the system output 61 in the event of fault occurrence in logic circuits A-B. For example, if the logic circuit A fails the output controller 40*a* recognizes that sets signal Sa='0', and produces signal (Sa^Wa)'='1' on the output of gate 10.

The isolation driver 57-1*a*, in turn, inverts this signal '1' for setting '0' signal on output S1-*a*, which is coupled with the control input of a fault recovery valve (FRV) 56-1*a*, which, in turn, goes to an "OFF" state, because of that faulty output 63*a* is disconnected from output 61. The safety section in general is able to operate in the presence of a single fault in any of the safety section components. The safety section is also able to operate with one healthy channel if the neighboring channel fails. For example, the safety section performs 1-of-1 voting if the CP A and IOC A fail. In the event that the two channels fail concurrently, the safety section performs a shutdown by passing the controlled process to a safe state.

The output controller 40*b*, the logic circuit 53*b*, and the voting network 54*b* operate similarly as the corresponding elements described in FIG. 9A above, as these elements are structurally equivalent to elements a and b in FIGS. 9 A-B. It should be appreciated that all connections described above with the respect of the output controller A, logic circuit A, and voting network A are similar and are applicable for controllers B (FIG. 9B) due to the symmetrical configuration of the safety section of the system 14. The safety section is able to operate with one healthy channel if the neighboring channel fails. For example, the safety section performs 1-of-1 voting if the CP A and IOC A fail. In the event that the channels fail concurrently, the safety section performs a shutdown by passing the controlled process to a safe state.

For some applications, it is preferable to perform 1-of-2 shutdown logic instead of 2-of-2 logic. Minor changes in logic 69 allow the safety section to perform 1-of-2 shutdown logic. In this way, output 61 is given as:

$$\text{Output } 61 = \text{output } 63a + \text{output } 63b = A\hat{}B + B\hat{}A = A\hat{}B$$

In the event that physical parameters deviate from the safety range, the CP A and CP B inform the control section that the controlled process is in a dangerous situation. If the safety and control sections cannot overcome the dangerous situation, the safety section brings the controlled process into the safety state. The safety section remain operational in the presence of any single hard/transient fault and may properly operate in the presence of some kind of two faults.

The safety section, thereby, further increases the safety level of the control section 14*b* in ISC system that is depicted in FIG. 9. The safety section and the control section operate completely independently, and have a physically separated protection layers that allow the integrated system ISC to attain up to SIL 3 requirements of the Standard of IEC 61511.

The control section 14*b* of the system 14 includes two identical process controllers primary (PC) and secondary (SC) in a back-up redundant configuration that is located on a main chassis 108. The PC A (74-1) and the SC B (74-2) has a communication module, each of which is separately connected to the bus 71 for communicating with the safety section and between the PC A and the SC B. Another bus (not shown in FIG. 9) is used by only the primary controller for communication with external devices, such as a host device and an operator interface. The PC A and the SC B further include at least one embedded ETHERNET port that is operatively connected with multiple ETHERNET switches 76 through a bus 72. The control section further includes multiple remote chassis (1-4), each of which house an input/output controller IOC (79). The PC A and the SC B utilize bus 78 for synchronous scanning IOC 79 in each remote chassis 1-4 over a long distance bus 75, which may comprise fiber optic or copper cable for example. Each IOC 79 operatively communicates with the associated input modules 1–N that receive input data from control inputs 107 and 109. These control inputs can be flow and pressure sensors of final control elements (that are not shown in FIG. 9 for simplicity), as well as any other type of sensors. Each IOC 79, through bus 83, receives information about the controlled process from the control inputs 107 and 109. IOC 79-1, for example, makes a first copy of the input data for the PC A, and makes a second copy of the input data for the SC B. The PC A and the SC B use embedded ETHERNET ports for scanning an infinite sequence of the IOC 79 1-4 through buses 75 and the ETHERNET switches 76, which are operatively connected to the ETHERNET ports embedded in PC A and in SC B via bus 72. The PC A and SC B receive the first and second copy of the input data during scanning, and utilize them for comparison with predetermined thresholds, and for synchronously executing an application program. Only PC A is selected, however, for sending the results of the application program execution to the associated IOC 79.

The PC A and SC B operate in a mode, whereby the primary controller (PC) operates in an active mode to provide all communication with the IOC 79, and with the external devices, while the second controller (SC) is placed in a hot standby mode. The SC automatically enters the active mode in the event that the PC fails. In some embodiments, the system HC900, produced by the Honeywell Company, may provide an architecture that the control section partially utilizes although any suitable architecture may be used. However, the control section of the ICS may be in some embodiments different from the HC900 architecture with regard to the following:

(1) hardware and firmware means in the control section define a primary or secondary status of the PC and CS by default after power up;

(2) Hardware and firmware means in the PC and SC detect their status in any scan by using an embedded serial peripheral interface (SPI) that houses self-diagnostics;

(3) self-diagnostics also allow the PC and SC to change their status automatically from PC to SC, and from SC to PC, if the PC or SC fails.

The manner in which the status of the PC and SC is defined by default after power up will now be presented. We will below use terms PC A and PC B instead of PC A and SC B for positioned in an identical configuration. The PC A and PC B may be located in a side-by-side position on a backplane, with each being inserted into an associated connector of the backplane. The first connector of the backplane has eight selected pins connected together to a plus terminal of power supply for obtaining a logical high signal on each of that pins, and providing thereby an identification word ID=FFh. A second connector of the backplane has eight selected pins connected together to a ground terminal of power supply for obtaining a logical low signal on the pins for providing identification word ID=00 h. Each process controller 74 has an input port that is connected via a connector to associated pins in the backplane for reading an identification word (ID) corresponding to values presented on the pins. Any process controller 74 that is inserted in the first connector will thereby read its identification word ID=FFh, while another process controller 74 inserted in the second connector will read its identification word ID=00 h. The process controller that inserted into the first connector is defined by default as the primary controller (PC), while the process controller that is inserted into the second connector is defined by default as the secondary controller (PC B). The control section 14b at power up must have two healthy process controllers, otherwise, a start-up diagnostic or SPI diagnostic will prevent the execution of the system application program. During normal operation, the statuses of both process controllers are constantly indicated. In the event that the primary controller fails, the secondary controller automatically obtains the primary status. In the event that the secondary process controller fails, the primary process controller holds the primary status. A faulty process controller should be replaced online by a new one that immediately obtains the secondary status. The diagnostic provides all functions described above.

Figure 10:
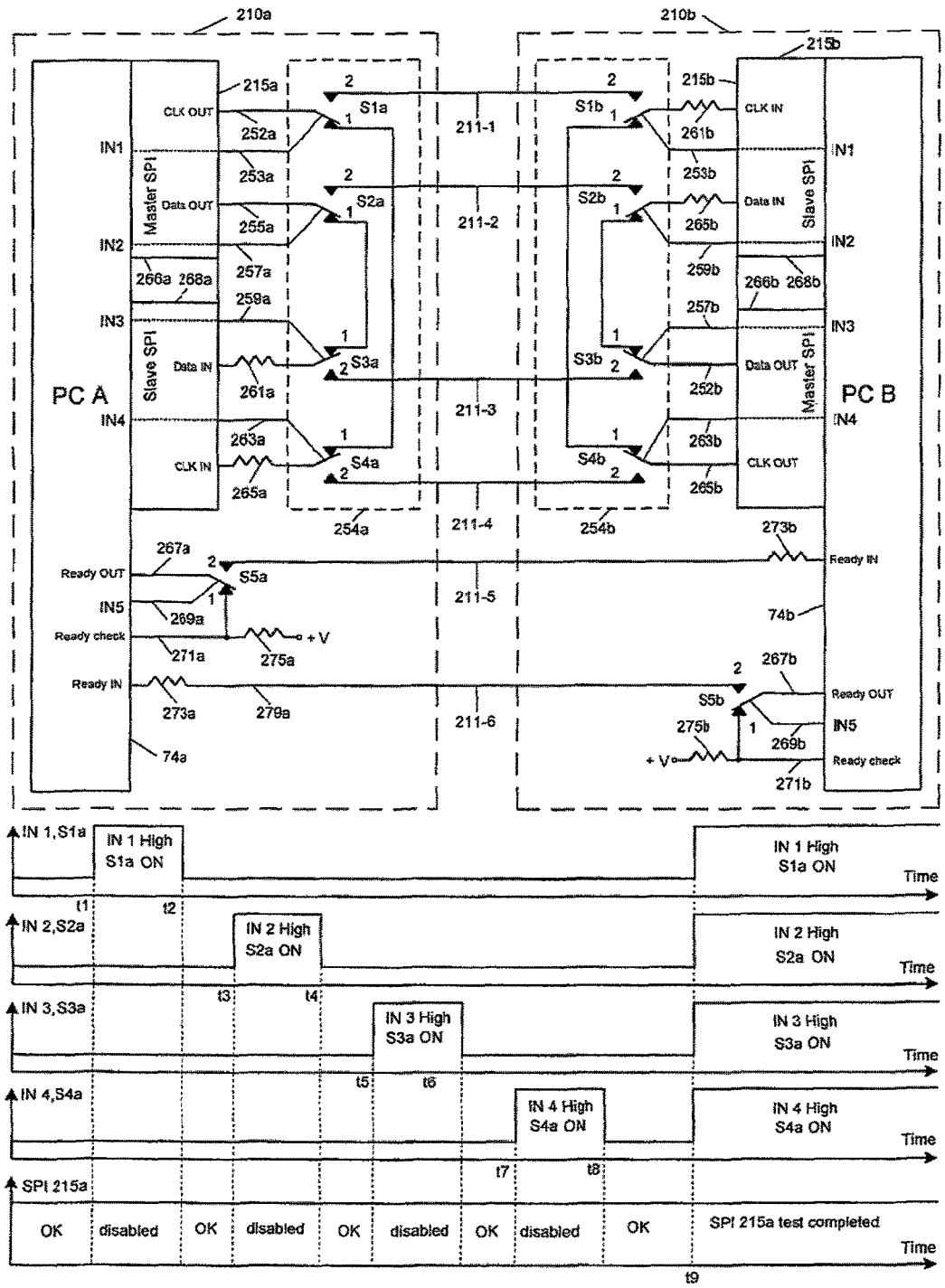
FIG. 10 is a schematic diagram of a diagnostic system provided by the dual redundant control system shown in FIG. 9 in accordance with the concepts and disclosures presented herein.

The diagnostic shown in FIG. 10 contains two identical circuits 210 each of which includes a serial peripheral interface (SPI) 215 with master and slave parts and Quad SPDT CMOS electronic switches 254. Circuits 215a, 254a and 215b, 254b are embedded into PC A and PC B respectively. Circuit 215a uses outputs IN 1, IN 2 to set switches S1a, S2a in 1 position, and uses outputs IN 3, IN4 to switch S3a, S4a in 1 position for testing SPI 215a before communicating with SPI 215b. Similarly, circuit 215b uses outputs IN 3, IN 4 to set switches S3b, S4b in 1 position, and uses outputs IN 2, IN 1 to switches S2b, S1b in 1 position for testing SPI 215b before communicating with SPI 215a. PC A 74a then uses master of SPI 215a for sending predetermined bytes of Data OUT accompanied with CLK OUT pulses to DATA IN of the slave part of the SPI 215a. PC A then compares Data OUT with DATA IN, and if no discrepancies are discovered, then SCI 215a operates correctly, otherwise PC A repeats the sending/receiving of data between the master and slave and indicates the failure of PC A or SPI 215a, if this failure is a hard (permanent) failure. Similarly, PC B compares Data OUT with DATA IN that is in the slave part obtained from master part of the SPI 215b. If no discrepancies between SPI 215b and Date In are discovered then SPI 215b operates correctly, otherwise SC B repeats the sending/receiving of data between the master and slave, and indicates a failure of SC B or SPI 215b, if this failure a hard (permanent) failure.

Continuing, the testing of switches Sa1-Sa4 is considered. PC A sets at moment t1 (FIG. 10 low side) a signal IN 1 in high state. The switch S1a must pass from an OFF state (position 1) to an ON state (position 2) if it is not fails. If there are no faults discovered, PC A then sets IN 1 at moment t2 in a low state for checking the ability of switch S1a to pass from an ON state back to an OFF state.

If Data IN still exists, it does mean that either switch S1a fails, or that IN 1 signal fails. The ability of switches S2a, S3a, and S4a to pass from an OFF state to an ON state and back are checked similarly as is performed with S1a. SPI 215a operates correctly if it switches S1a-S4a from OFF to ON and back properly, as shown in FIG. 10. This self-test of SPI 215a is completed at moment t9. All switches are in ON state (position 2) at moment t9, allowing the SPI 215a to be ready for communicating with neighboring SPI 215b. SPI 215b operates in the same way as SPI 215a due to the symmetrical SPI configuration. SPI 215a and SPI 215b operations, however, can be shifted in time.

The PC A and PC B initially set signals Ready IN as inputs. In addition, the PC A and PC B set initial signal IN 5 in a low state for setting switches S5a and S5b in an OFF state (position 1). PC A then toggles the Ready OUT signal from a high to a low state and back a few times to check whether the Ready Check signal will follow the Ready OUT signal or not. When the testing of the SPI 215a-b is successfully completed, switches S1a-S5a in PC A and switches S1b-S5b in SC B are in an ON state. The PC A and the SC B then sends a Ready Out signal to each other through buses 211-5 and 211-6. PC A and PC B begin synchronization in the event that both receive a Ready Out signal on time. The PC A and PC B include a watchdog timer, which the PC A and the SC B sets for predetermined time. In the event that one PC A does not obtain a "Ready" signal on time, it will to operate in a stand-alone mode. If PC A and PC B receive a "Ready OUT" signal on time, PC A and SC B are synchronized, and they send their status to each other. PC A and PC B compare their statuses and indicate a system failure if that statuses are the same as shown in FIG. 11 at block 302. Primary or secondary statuses for PC A and for PC B are automatically defined at start-up by their location in the main chassis 108. Master SPI sends the status of PC A to slave SPI of PC B over bus 211-2 (Data Out) and 211-1 (Clock OUT), while master SPI sends status to the PC B to slave SPI of the PC A over bus 211-3 (Data Out) and 211-4 (Clock Out). SPI 215a and SPI 215b operate, therefore, in full duplex mode. In addition, the PC A and the PC B employ conventional SEC-DED technology for correcting any single faults during communication and indicating the occurrence of multiple faults.

Figure 11A:
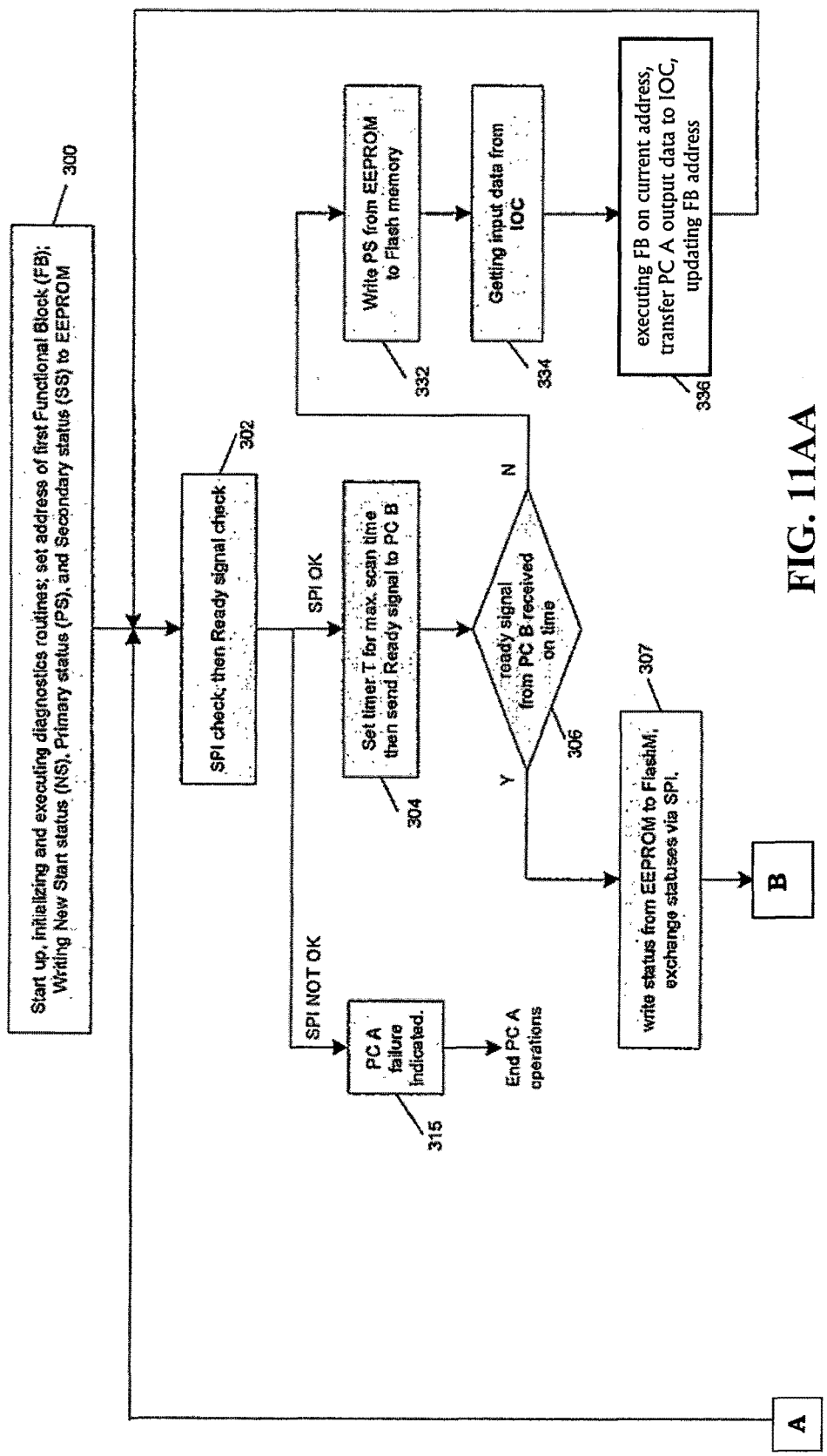
FIG. 11AA is a partial flow diagram showing the operation of the primary controller of the system provided in FIG. 9 in accordance with the concepts and disclosures presented herein.
Figure 11A:
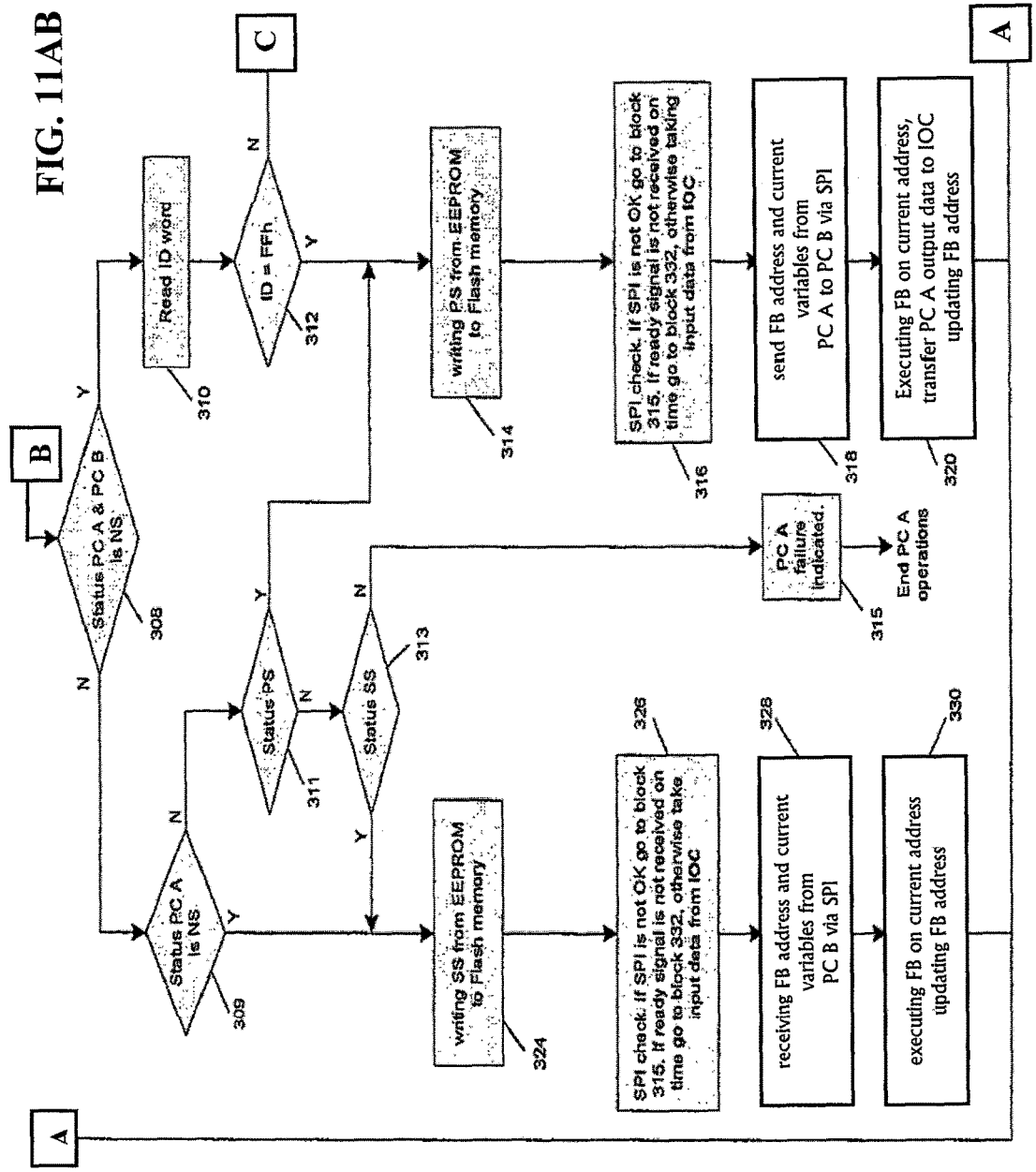
Figure 11A:
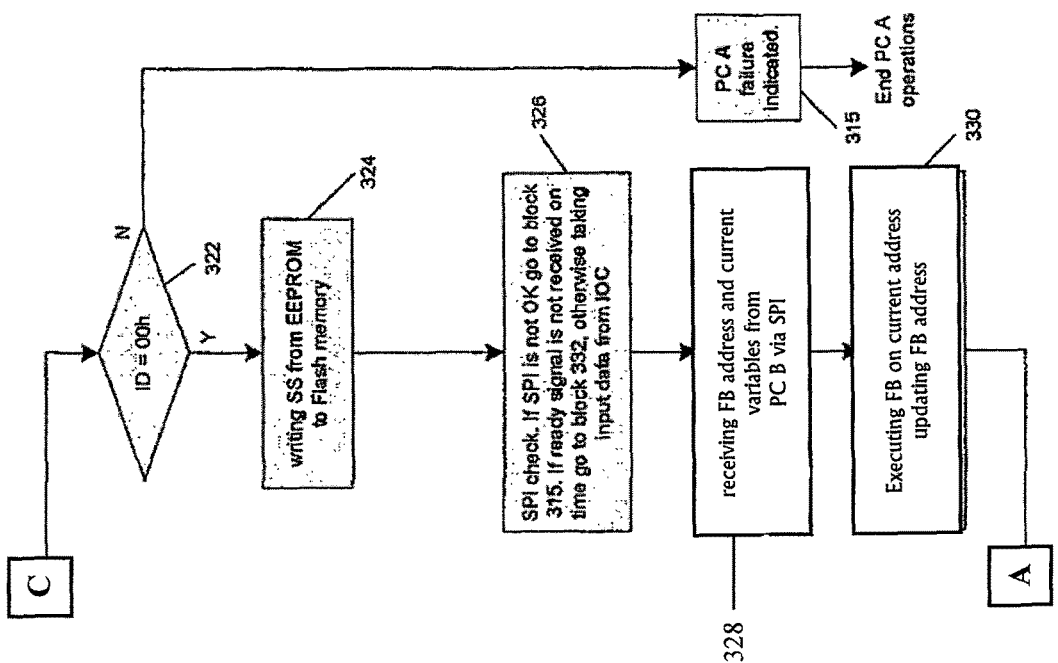
Figure 11B:
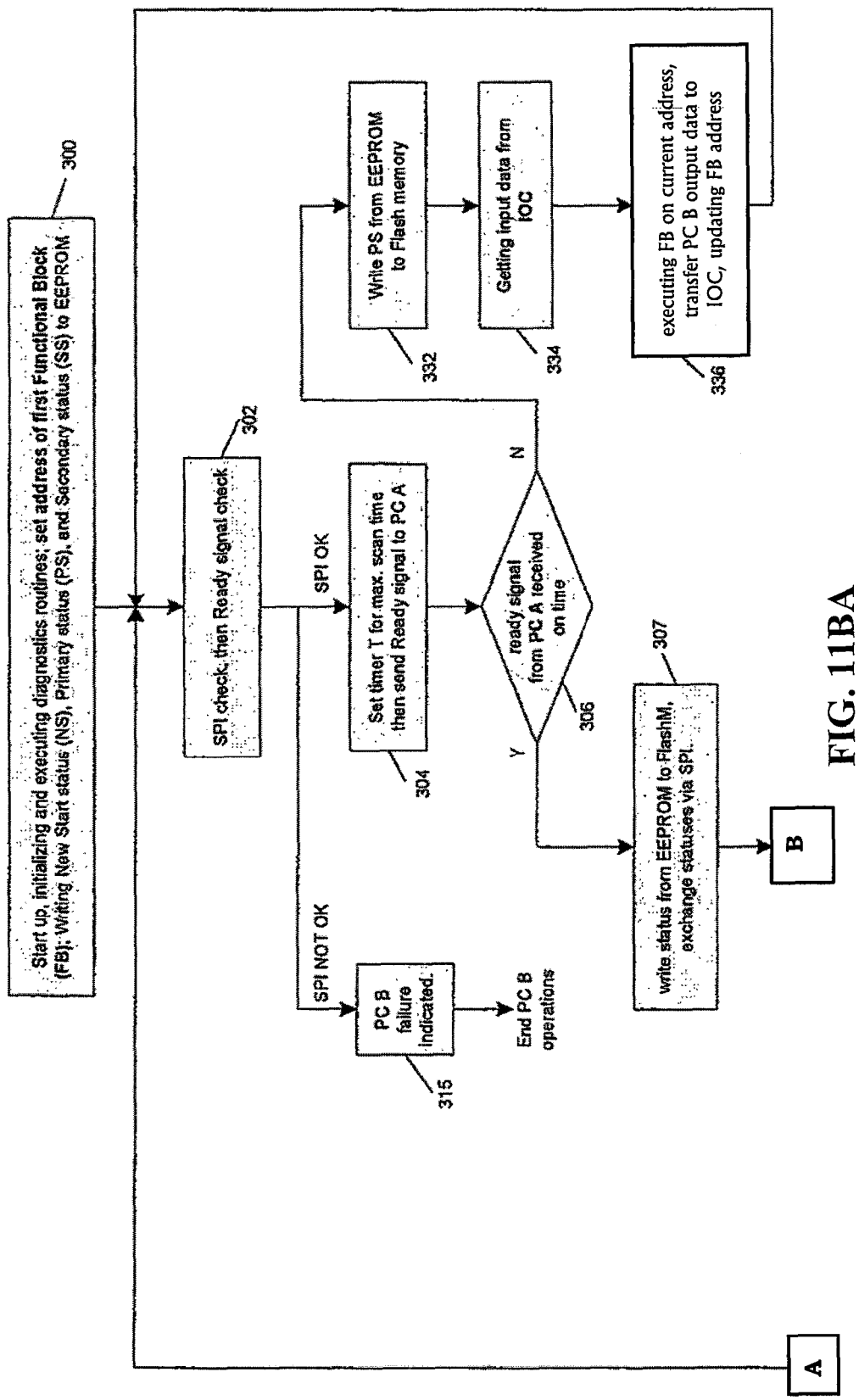
FIG. 11BA is a partial flow diagram showing the operation of the secondary controller of the system provided in FIG. 9 in accordance with the concepts and disclosures presented herein.
Figure 11B:
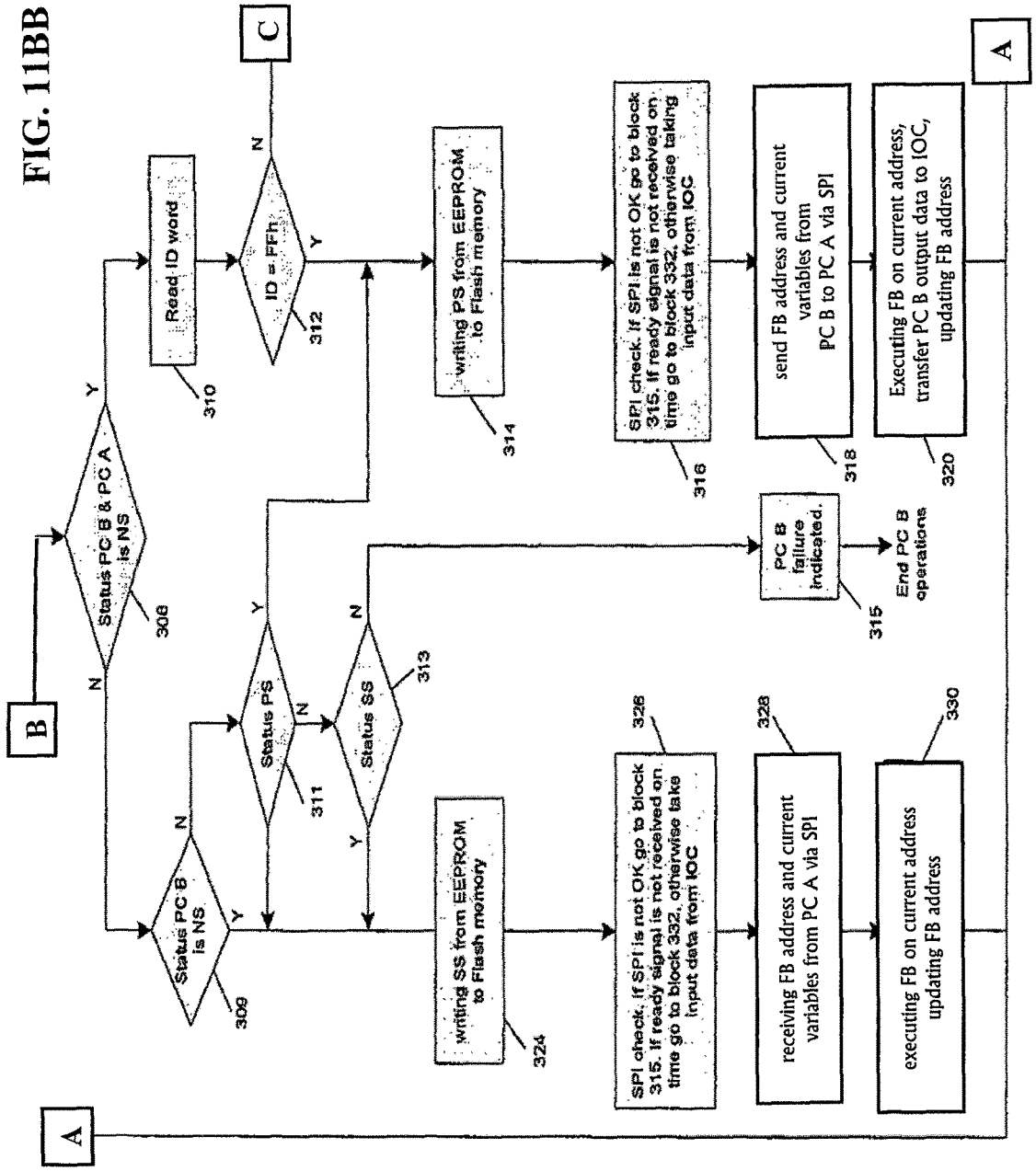
Figure 11B:
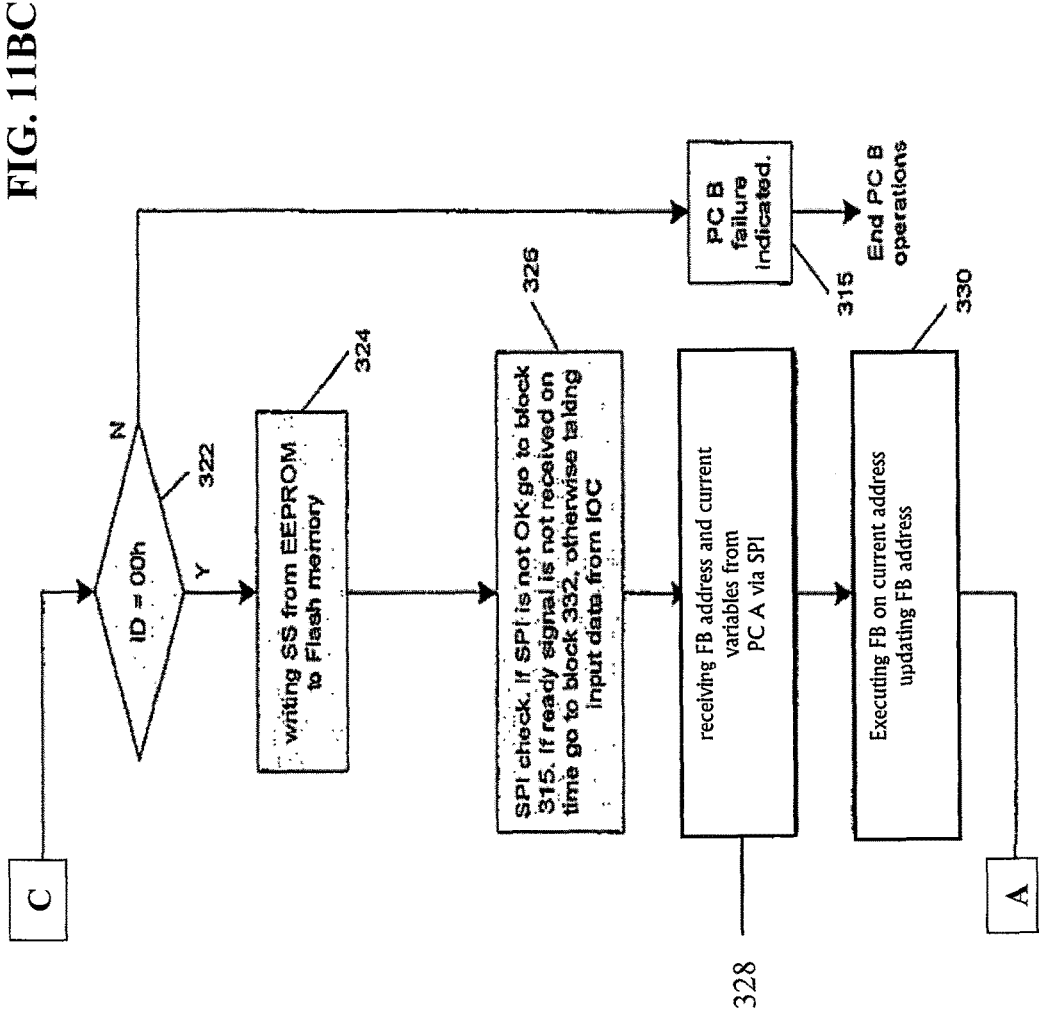

The details of the operation of the control section 14b are shown in FIGS. 11AA-AC for the primary processor PC A (that is located on the left side of the backplane) and in FIG. 11BA-BC for the secondary processor PC B (that is located on the right side of the backplane). The PC A and the PC B both obtain a new start status (NS) and implement steps 302-310 after power up. The PC A and the PC B read their own identification word (ID) at step 310, and they obtain a real status of FFh and 00 h at steps 312 and 322 respectively.

The PC A and the PC B checks the SPI 215 again at steps 316, 326 and, if "Ready IN" signal is received on time, they receive input data from the associated IOC. In the event that PC A does not receive the "Ready IN" signal on time from PC B, PC A operates in a stand-alone mode implementing the sequences of steps 332-336 until the faulty process controller is replaced. Further, in some embodiments, the control section 14b uses a function block diagram (FBD)

language for the application program development. The PC A sends a copy of a current FB address to the SC B over SPI 215 at step 318. At step 318 PC A also sends PC B current variables. The PC A and PC B execute the first function block (FB) of the application program respectively at steps 320, 330. The PC A and PC B then update FB address to use this address in the next scan of operation. If PC A does not obtain a Ready IN signal on time, the PC A indicates that the PC B or SPI 215b has failed. In this event, primary PC A will operate in a stand-alone mode, as shown in FIG. 11AA, steps 332-336. If secondary PC B does not obtain a Ready IN signal on time, the PC B indicates that the PC A or SPI 215a has failed. In the event, that healthy PC B obtains the primary status and will operate in a stand-alone mode, as shown in FIG. 11BA, steps 332-336.

Only PC A sends the outputs of the application program to the associated IOC at step 320, and takes an address of FB that will execute in the next scan. The address of the recent FB and variables are updated at the end of each scan, except the first one. The PC B operates similarly as PC A, but PC B does not send outputs of the FB execution to the IOC. The PC B, however, updates the FB address and the current variables at step 330 (FIG. 11BA-BC), because of the PC B will use them in the event that PC A fails. During fault free operation, the PC A and PC B proceed again to step 302 to execute in each scan all the functions that have been previously described. If the PC A or PC B fails, a healthy one replaces the faulty one. The method described here for the control section is more effective than many others are.

In conclusion, the safety section 14a, thereby, further increases the safety level of the control section 14b that depicted in FIG. 9. The control section and the safety section operate independently, and have physical separation protection layers, and as a result the integrated system ISC matches the up to SIL 3 requirements in accordance to Standards IEC 61511-1 11.2.4.

The advantages of the ISC system include: increased reliability and availability of both safety and control functions matching up to SIL 3 requirements of IEC 61508/61511 Standards; the ability to operate with fewer processes at the same time by using multiple I/O remote chassis that are located away from the main chassis closer to controlled processes; and a reduction in the probability of common cause failures by using different hardware and software in the control and safety parts.

It should be appreciated that the various embodiments of the system discussed above may include an electronic backplane or interconnect board, which includes multiple interface ports or connectors for electrically connecting the various system modules and components so that they may communicate with each other in the manner necessary to carry out the various functions discussed herein. For example, in some embodiments, the primary processor modules (PPMs A-C) may be on one side of the backplane, while another side of the backplane includes the supplemental processor modules (SPMs A-C). In some embodiments, the PPMs may be positionally offset from that of the SPMs. The backplane also includes various other removable or fixed interfaces or connectors to allow the other components of the various system embodiments to be attached thereto. In addition, the power supplies and communication interface modules utilized by the systems of the various embodiments may also be electrically coupled to the backplane.

In addition, it should be appreciated, that the output module includes an output controller, a 2-of-3 voter component, an ISD component, a logic circuit, and an output-voting network. Such features are beneficial in that it allows the user to remove and replace the output module if it fails. In some embodiments, the output controller, 2-of-3 voter component, ISD component, and logic circuit may be implemented as field-programmable gate array (FPGA), or as a complex programmable logic device (CPLD) for example.

It should be appreciated that various modifications and substitutions of the components of the various embodiments presented may be readily made. For example, the circuit in remote chassis shown in FIG. 9 can be modified by using circuit FIG. 7 that houses the appropriate IOC A-B instead of CP A and CP B. This modification can be utilized for more responsible applications, since it provides a higher level of fault tolerance and reliability than the circuit in the remote chassis shown in FIG. 9. Minor changes can be made in for logic circuit 53 and 69 that allow the safety section to perform 1-of-2D instead of 2-of-2D shutdown logic. The system can also support a hot spare input and output module, which take control if a fault is detected in the primary I/O module during operation. These and others modifications may be made without departing from the spirit of the various embodiments disclosed.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A redundant computer system comprising:
a first channel, a second channel, and a third channel each channel comprising:
   a primary processor module (PPM);
   a secondary processor module (SPM), wherein said primary processor module (PPM) is in operative communication with said secondary processor module (SPM), said primary processor module (SPM) and secondary processor module (SPM) operate in parallel redundancy;
   said primary processor module (PPM) in the first channel, said primary processor in the second channel, and said primary processor module (PPM) in the third channel are in operative communication with each other;
   said secondary processor module (SPM) in the first channel, said secondary processor module (SPM) in the second channel, and said secondary processor module (SPM) in the third channel are in operative communication with each other;
   an input module includes in each channel a first and a second interface to provide operative communication of said input module with said primary processor module (PPM) and secondary processor module (SPM), wherein said input module in each channel is in operative communication with a first and a second section of a dual redundant sensor (DRS) for each controlled point that delivers input data to said input module; said input module including means for calculating a deviation between values of said input data produced by said first and second section of the DRS for each controlled point to indicate whether said deviation is within a predetermined limit; said input module can be digital or analog;

said primary processor module (PPM) and secondary processor module (SPM) in each channel configured to receive said input data from said input module to synchronously execute an application program and to transfer output data as a result of said application program execution to an output module via a first and a second interface;

said output module in each channel includes an output controller that is in operative communication with primary processor module (PPM) and with said secondary processor module (SPM) for receiving said output data from the primary processor module (PPM) and from the secondary processor module (SPM);

said output module further includes a voter component and an improper sequence detector (ISD) component; said output module can be digital or analog;

said voter component is in operative communication with said primary processor module (PPM) and said secondary processor module (SPM), said improper sequence detector (ISD) component is in operative communication with said voter component and with said output controller;

means in said improper sequence detector that verifies an absence or presence a fault in timetable and verifies consistency of program operations in said output controller;

a comparing diagnostic in said primary processor module (PPM) and said secondary processor module (SPM) in each channel for monitoring a condition of said output module;

said comparison diagnostic allows the system to disable said output module if at least two elements among the primary processor module (PPM), the secondary processor module (SPM), and the improper sequence detector (ISD) vote that said output controller has failed;

said comparison diagnostic having no single point of failure to allow the system to operate with one operational output module in the event that two neighboring output modules fail concurrently;

said output controller connected via a read only bus with a neighboring output controller to receive or send said output data from or to said neighboring output controllers;

means wherein said output controller includes for activating a disparity signal on an input of said logic circuit for some controlled points if the associated primary processor module (PPM) and secondary processor module (SPM) produce said output data that are different due to occurrence of transient faults, or due to said deviation that is out of said predetermined limits for said controlled points;

said disparity signal being activated as a result of an exclusive NOR (XNOR) operation between single-bit output data that said output controller receives from the associated primary processor module (PPM) and secondary processor module (SPM);

said output data is substituted by the output data produced by neighboring output controllers for some controlled points if said disparity signal is activated for said controlled points;

said logic circuit includes in each channel an arrangement of a plurality of logic gates that are coupled through isolated drivers with inputs of said voting network for each controlled point;

said logic circuit in said first channel providing the outputs of the associated voting network as a product of said output data that is received from said output controller in the first channel and a sum of said output data received from output controllers in said second and third channels;

said logic circuit in said second channel providing outputs of the associated voting network as a product of said output data that is received from said output controller in said second channel and a sum of said output data received from said output controllers in said first and third channels;

said logic circuit in said third channel providing outputs of the associated voting network as a product of said output data that is received from said output controller in said third channel and a sum of said output data received from said output controllers in said first and second channels;

said logic circuit and voting network performing a logic operation with said output data to provide 2-of-3 voting among output data produced by said first, second, and third channel;

said voting network including a fault recovery valve for each controlled point to allow said voting network to remain operational in the presence of up two faults;

the system continuing to perform 2-of-3 voting even though three primary processor module (PPM)s or three secondary processor module (SPM)s concurrently fail, thereby, allowing the system to continue to remain operational in the presence of multiple faults in the primary processor module (PPM) and in the secondary processor module (SPM);

the system energizes a controlled process in the fault free operation when a majority of system channels operate properly and de-energizes said process in the presence of multiple dangerous failures in the system;

the system continues to operate in the presence of any two faults in one or two channels, the system providing a safe shutdown for the process if hard faults occurs in all channels;

each PPM uses same hardware and same software, which are different with hardware and software that each secondary processor module (SPM) uses, said hardware and software diversity allows the system decreasing the probability of common cause failure.

2. The redundant computer system of claim 1, wherein:
said voter component includes a plurality of parallel voting groups that are coupled between a voltage source and a ground node,
with each voting group including at least two low power switches, such as a MOSFET or any other suitable transistor or relay for example, connected in series;
said primary processor module (PPM) and secondary processor module (SPM) in each channel continually controlling said switches in two groups by the associated lines, while the switches in the third group is controlled by said improper sequence detector (ISD);
said voter component produces an output signal as a result of a majority of two-out-of-three voting among signals, which the primary processor module (PPM) and a secondary processor module (SPM) and the improper sequence detector (ISD) produce on the inputs of said voter component;
said output signal in each channel is connected to a corresponding input of said logic circuit that disconnects output of the associated channel from output of the system if said majority of two-out-of-three signals vote that said output controller fails;

a logic circuit in each channel includes an arrangement of plurality of a logic gates, the inputs of said arrangement is in operative communication with said output controller; outputs of said arrangement is in operative communication with inputs of said voting network via an isolation drivers;

said logic circuit is in operative communication with said output controller and in operative communication with said voting network, said voting network includes three switches in series for each controlled point that is in operative communication with said logic circuit, said three switches in said first, second, and third channels are coupled in parallel for each controlled point for providing an output of the system;

in normal operation, the system performs 2-of-3 voting among output data produced by said first, second, and third channel;

a single output controller excludes an own output data from outputs of said logic circuit and uses output data received from the neighboring output controllers, the system then performs the 2-of-2 voting instead of 2-of-3 voting if said disparity signal is activated in said single output controller for some controlled points;

said output controllers in two channels excludes an own output data from outputs of said associated logic circuits and uses output data received from the neighboring output controllers, the system then performs the 1-of-2 voting instead of 2-of-3 voting if said disparity signal activates in said two channels of the system for some controlled points;

the system, continues to operate in the presence of said disparity in one or two channels, the system may perform a safe shutdown for the process, if said disparity occurs in all channels concurrently.

3. A redundant computer system comprising:

a first channel, and a second channel, each channel comprising:

a primary processor;

a secondary processor, wherein said primary processor is in operative communication with said secondary processor; said primary and secondary processor operate in parallel redundancy;

said primary processor in the first channel and said primary processor in the second channel are in operative communication with each other;

said secondary processor in the first channel and said secondary processor in the second channel are in operative communication with each other;

an input module includes in each channel a first and a second interface to provide operative communication of said input module with said primary and secondary processor, said input module can be digital or analog module;

said input module in each channel is in operative communication with a first and a second section of a dual redundant sensor (DRS) for each controlled point that deliver an input data to said input module;

means in said input module for calculating a deviation between values of said input data produced by said first and in second section of the DRS for each controlled point to indicate whether said deviation is within predetermined limits or not;

said primary processor and said secondary processor in each channel receive said input data for synchronously execute an application program and for transfer an output data as a result of said application program execution to an output module via a first and a second interface; said output module can be digital or analog;

said output module in each channel includes an output controller, said voter and improper sequence components, a logic circuit and a voting network; said output module can be digital or analog;

said voter component is in operative communication with said PPM and said SPM, said ISD component is in operative communication with said voter component and with said output controller;

said comparison diagnostic in said primary processor (PPM) and said secondary processor (SPM) in each channel for monitoring condition of said output module, said diagnostic includes a voter component and includes an improper sequence detector (ISD) component;

said comparison diagnostic allows the system for disabling said output module if at least two elements among the PPM, the SPM, and the ISD vote that the output controller fails;

means in said improper sequence detector that verify absence or presence a fault in timetable and verify consistency of program operations in an output module, said output module in operative communication with said primary processor and said secondary processor and with said ISD component;

said output controller connected via a read only bus with a neighboring output controller for receiving/sending said output data from/to said neighboring output controller;

means in said output controller for activating a disparity signal on input of said logic circuit for some controlled points if the associated primary and secondary processor produce said output data that are different due to occurrence of transient faults, or due to said deviation that is out of said predetermined limits for said controlled points;

said disparity signal is activated as a result of an Exclusive NOR (XNOR) operation between single-bit output data that said output controller receives from the associated PPM and SPM;

the primary processor and the secondary processor in each channel use said input data for synchronously execute an application program and for transfer an output data as a result of said application program execution to said output controller in said output module;

said logic circuit and voting network perform a logic operation with said output data to provide 2-of-2 voting among output data produced by said first and second channel of the system, said voting network includes a fault recovery valve for each controlled point to provide no single point of failure of said voting network;

said voting networks includes plurality switches in series, said switches in said first and second channels connected in parallel to provide output of the system;

the system performs said 2-of-2 voting even though only two PPM or two SPM are operational; the system, thereby, continues to be operational in the presence of any two faults in said PPM and said SPM;

said output controller connected via a read only buses with neighboring output controller for receiving/sending said output data from/to said neighboring output controller;

said output controller excludes an own output data from inputs of said logic circuit and uses output data receiving from the neighboring output controller, the system then performs the 1-of-2 voting instead of 2-of-2 voting if said disparity signal activates in said output controller for some controlled points;

the system, thereby, continues operate in the presence of said disparity in one channel, the system may perform a safe shutdown for the process, if said disparity occurs in first and second channel concurrently;

said logic circuit is in operative communication with said output controller and in operative communication with said voting network, which contains multiple switches in series for each controlled points, said switches in said first and second channels connected in parallel;

said logic circuit in said first channel provides outputs of the associated voting network as a product of said output data received from said output controller in said first channel and a sum of said output data receiving from output controllers in said first and second channel;

said logic circuit in said second channel provides outputs of the associated voting network as a product of said output data received from said output controller in said second channel and a sum of said output data receiving from output controllers in said second and first channel.

4. A redundant computer system comprising:

a first channel, a second channel each channel comprising:

a first central processor and a second central processor that operate in parallel redundancy;

said first central processor is in operative communication with said secondary central processor;

a first input module and a second input module is in operative communication with said first central processor and with said second central processor via the associated interfaces;

said first input module and said second input module is coupled with a single sensor for each controlled point for delivering an input data of the process to the first processor and to the second processor respectively;

said first and second control processor use said input data for synchronously execute an application program and for transfer an output data as a result of said application program execution to said output module in normal system operation;

said output module includes an output controller, a voter and an improper sequence components, a logic circuit, and a voting network;

said first output controller is in operative communication with said first central processor via said first interface and is in operative communication with said second central processor via said second interface;

said second output controller is in operative communication with said second central processor via said first interface and is in operative communication with said first central processor via said second interface;

a first voter component and a second voter component that is in operative communication with said primary central processor and with secondary central processor;

an improper sequence detector that verify absence or presence a fault in timetable and verify a consistency of program operations of said output controller;

said output controller is in operative communication with the associated logic circuit in said first and second channel;

a comparing diagnostic in said first central processor (FCP) and said second central processor (SCP) in each channel for monitoring condition of said output module, said comparing diagnostic includes a voter component and includes an improper sequence detector (ISD) component;

said comparison diagnostic allows the system for disabling said output module if at least two elements among the FCP, the SCP, and the ISD vote that said output controller fails;

said comparison diagnostic having no single point of failure allows the system to operate with one working output controller in the event that neighboring output controller fails;

said output controller connected via a read only bus with a neighboring output controller for receiving/sending said output data from/to said neighboring output controller;

said output controller activates a disparity signal on inputs of said logic circuit for some controlled points if said output controller receive different data from said first and second control processor due to occurrence of some transient faults;

said disparity signal is activated as a result of an Exclusive NOR (XNOR) operation between output data that said output controller receives from said first and second central processors;

said output data is substitutes by the output data produced by neighboring output controller for some controlled points if said disparity signal is activated for said controlled points;

the system continues operate if said disparity occurs in only one output controller, the system performs a safe shutdown for the process, if said disparity occurs in output controllers in said first a second channels concurrently;

said logic circuit is in operative communication with said output controller and in operative communication with a voting network, which contains multiple switches in series; said switches in said first a second channels connected in parallel for each controlled point;

each logic circuit and each voting network receives said output data from said first and second central processor via said output controller, said logic circuit and voting network perform a certain logic operation with said output data to provide said 2-of-2 voting among output data that produced by said first and second central processor;

means in said first and second central processor to use an additional separate buses that provide operative communication with both first and second output controllers;

said means provide the system continues to be operational in the presence of two faults: in first control processor and in second output controller, or in second central processor and in first output controller;

the system continues to be operational in the presence of any single fault and may operate in the presence of some kind of two faults;

the system energizes controlled process in the fault free operation when both first and second central processor and associating components operating properly and de-energizes said process in the presence of two dangerous failures in the system.

5. A computer system integrating safety and control functionality comprising:

a computer system integrating safety section and a control section that provide the system safety and control functionality respectively;

a safety section includes at least one main chassis housing a first and a second channel, each channel comprising:

a first central processor and a second central processor that operate in parallel redundancy;

said first and second central processor are located in a main chassis, means in said first and second central processors for communicating with said control section and with an external devices over separated buses in redundant configuration;

said first and second central processors are in operative communication through a redundant bus for synchronizing their operation;

said first and second central processor has at least one ETHERNET port and at least one ETHERNET switch for operative communicating with one or multiple remote chassis via a first and a second input/output controller located on said remote chassis;

said remote chassis may be located far away from the main chassis to be nearer to controlled process; said communicating are cooper or fiber cables or can be wireless;

each said remote chassis includes:

a first and a second input/output controller that is in operative communication with said first central processor and with said second central processor, a first and a second input module that is in operative communication with said first and second input/output controller, said first input module and said second input module is coupled with said single sensor per controlled point for delivering an input data of the process to said first and second central processor respectively via the associated input/output controllers (IOC);

said first and second central processor uses said input data for synchronously execute an application program and transfer said output data as a result of said application program execution to said first and second IOC under normal system operation;

said IOC, in turn, transfers said output data to said output module that includes an output controller, said voter and improper sequence components, a logic circuit, and a voting network;

an improper sequence detector that verify absence or presence a fault in timetable and verify a consistency of program operations of said output controller; the output controller is in operative communication with the associated voter component and with the associated logic circuits in said first and second channel;

a diagnostic in said first central processor (FCP) and said second central processor (SCP) in each channel for monitoring condition of said output module, said diagnostic includes in each channel a voter component and includes an improper sequence detector (ISD) component;

said diagnostic allows the system for disabling said output module if at least two elements among the FCP, the SCP, and the ISD vote that said output controller fails;

said diagnostic having no single point of failure allows the system to operate with one working output controller in the event that neighboring output controller fails;

a logic circuit is in operative communication with said output controller and in operative communication with said voting network, which contains multiple switches in series; said switches in different voting networks connected in parallel for providing an output of the system for each controlled point;

said logic circuit and said voting network perform a certain logic operation with said output data to provide 2-of-2 voting among output data that said first and second IOC receive from said first and second central processor;

means in the first and second central processor for energizing the process in the fault free operation when two input/output controllers and all associating modules and components operating properly and de-energizing said process in the presence of two dangerous failures in the system;

said control section housing at least two process controllers arranged in back-up redundant configuration, said process controllers perform control functions without interrupts from said safety section until a critical parameters of controlled process are in the safe range;

said control section includes at least one main chassis housing a primary and a secondary process controller, that are in operative communication each to other through a first and a second interface and a redundant bus;

means in said first and secondary process controller for communicating with said safety section and with an external devices over separated buses;

said primary and secondary central processor has at least one ETHERNET port and at least one ETHERNET switch for operative communicating with one or multiple remote chassis via the associated input/output controller located on said remote chassis;

said remote chassis may be located far away from the main chassis to be nearer to controlled process; said communicating are cooper or fiber cables, or can be wireless;

each said remote chassis includes a multiple input and output modules that are in operative communicate with said first and second input/output controllers;

said primary and secondary central processor obtains an input data from said input modules via said input/output controllers and uses said input data for synchronously execute an application program;

means in said process controller to select one process controller as a primary process controller, while identify the neighboring process controller as a secondary process controller;

said first and second interface include a self-diagnostic and a mutual diagnostic for discovering possible faults occurrence in said primary and in said secondary process controller respectively and for disabling said first or second process controller when it fails;

method in hardware and software in each process controller to use said first and second interface for providing:

said process controller to obtain a primary status or a secondary status depends on location in said backplane;

select only said primary process controller for sending output data as result of said control program execution to the system control outputs, for allowing said primary process controller to hold said primary status and operating in a stand-alone mode in the event that said neighboring process controller fails;

said secondary process controller changes a secondary status to said primary status and performs control function in said stand-alone mode in the event that said primary process controller fails;

said faulty process controller can be online removing and replacing by a new process controller, status of said new process controller is automatically setting up as a new status after inserting said new process controller into a backplane, and then automatically changed from new status to secondary status during a current cycle of said control section operation;

said new process controller is then reprogramming by the neighboring processor that holds said primary status;

means in said primary and in secondary controller to switch said serial interface from said self-diagnostic to an mutual diagnostic by using a number of an electronic Single-Pole Double-Throw (SPDT) switches;

means in said secondary process controller to change status from secondary status to primary status and starts operating in said stand-alone mode if said primary process controller fails;

means in said primary process controller to keep primary status after going to said stand-alone mode in the event that secondary process controller fails; said first and second interface in said primary and in secondary process controller is for transmitting/receiving said self-diagnostic data and said status to said primary and secondary process controller respectively.

6. A redundant control system of claim 5 wherein:

said primary and secondary process controllers are identical;

means in said process controllers for defining said primary status or said secondary status after inserting said process controllers in said backplane and power up;

said backplane includes a first socket connector located on the left side of said backplane and includes a second socket connector located on the right side of said backplane;

selected pins of said first socket connector connected to plus terminal of a power supply to form a first identification word, while selected pins of said second socket connector connected to ground terminal of said power supply to form a second identification word;

a first and a second input port in each of said process controllers, said input port coupled with a plug connector for inserting each process controller either to left side or to right side of said backplane;

if one said process controller inserted to left side of said backplane it is coupled with a first socket connector, said one process controller reads a first identification word via said first input port and gets said primary status after power up;

if another process controller inserted to right side of said backplane it is coupled with a second socket connector said another process controller reads a second identification word via said second input port and gets said secondary status after power up;

said primary status and said secondary status of said process controllers are setting thereby initially after system power up, but can be changed during system operation;

said first and second interface is a serial peripheral interface (SPI) in said primary and in secondary process controller for transmitting/receiving said self-diagnostic data and status data to said primary and secondary process controller respectively;

means in said primary and in secondary process controller to switch said SPI from said self-diagnostic to an exchange said status data by using a number of an electronic Single-Pole Double-Throw (SPDT) switches;

further means in said primary and in secondary process controller for continuously indicate primary or secondary status of said controllers; said primary and secondary process controller can be remove and replace by new healthy process controller if primary or secondary process controller fails;

status of said new healthy process controller is automatically setting up as new start status after power up, and then automatically changed to secondary status not later than during of one cycle of said control section operation;

said SPI interfaces for discovering possible faults occurrence in the primary or in the secondary process controller respectively and disabling the primary or secondary process controller when it fails; said SPI interfaces can operate in full Duplex mode.

* * * * *